US012801743B1

(12) United States Patent
Goldman

(10) Patent No.: US 12,801,743 B1
(45) Date of Patent: Nov. 17, 2026

(54) HARDWARE-ENFORCED TRUST ARCHITECTURE WITH COMPOSITIONAL EXPOSURE BOUNDS FOR DISTRIBUTED AND AUTONOMOUS SYSTEMS

(71) Applicant: Omnius Corp., Sarasota, FL (US)

(72) Inventor: Rachel L. Goldman, Naples, FL (US)

(73) Assignee: Omnius Corp., Sarasota, FL (US)

( * ) Notice: Subject to any disclaimer, the term of this patent is extended or adjusted under 35 U.S.C. 154(b) by 0 days.

(21) Appl. No.: 19/540,838

(22) Filed: Feb. 16, 2026

(51) Int. Cl.

| | |
|---|---|
| ***G06F 21/60*** | (2013.01) |
| ***G06F 21/10*** | (2013.01) |
| ***G06F 21/57*** | (2013.01) |
| ***G06N 3/042*** | (2023.01) |

(52) U.S. Cl.
CPC .............. *G06F 21/57* (2013.01); *G06F 21/10* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 2018/0068312 | A1 | 3/2018 | Kim | |
| 2018/0211022 | A1 | 7/2018 | Wagner | |
| 2019/0097818 | A1 | 3/2019 | Lu | |
| 2019/0098004 | A1 | 3/2019 | Mars | |
| 2019/0262208 | A1 | 8/2019 | Levesque | |
| 2019/0312734 | A1* | 10/2019 | Wentz | H04L 9/3239 |

(Continued)

FOREIGN PATENT DOCUMENTS

| | | |
|---|---|---|
| JP | 7155859 B2 | 10/2022 |

OTHER PUBLICATIONS

"S. Sisinni et al., "Hardware-Rooted Device Identity for IoT: Integrating Silicon PUFs and DICE in RISC-V Embedded Systems," in IEEE Access, vol. 14, pp. 55165-55193, 2026, doi: 10.1109/ACCESS.2026.3674839." (Year: 2026).*

(Continued)

*Primary Examiner* — Christopher B Robinson
(74) *Attorney, Agent, or Firm* — Blueshift IP, LLC; Robert Plotkin

(57) ABSTRACT

A hardware-enforced trust system, method for certifying composite systems, hardware-enforced AI behavioral bounding system, method for enforcing behavioral bounds, behavioral bounding system, and method for modifying exposure bounds are provided. The hardware-enforced trust system comprises a hardware-rooted trust isolation subsystem comprising at least one hardware trust anchor selected from a hardware security module, trusted platform module, secure element, hardware-based trusted execution environment, hardware-isolated enclave, and physically-unclonable function, wherein the hardware trust anchor computes a trust metric from observables satisfying boundedness, monotonicity, and hardware isolation constraints. The system further comprises a trust-weighted consensus subsystem achieving Byzantine fault tolerance by weighting node contributions based on trust metrics, a compositional exposure subsystem comprising hardware-protected non-volatile storage enforcing a total exposure bound computed by applying a composition operator to component exposure bounds, and a constraint enforcement subsystem triggering automatic revocation through hardware-enforced paths.

27 Claims, 2 Drawing Sheets

(56) References Cited

U.S. PATENT DOCUMENTS

| | | | | |
|---|---|---|---|---|
| 2020/0351657 | A1* | 11/2020 | Wentz | H04L 9/3231 |
| 2021/0083872 | A1 | 3/2021 | Desmarais | |
| 2021/0240818 | A1* | 8/2021 | Seksenov | G06F 16/972 |
| 2022/0116214 | A1 | 4/2022 | Jentzsch | |
| 2023/0169510 | A1 | 6/2023 | Sean | |
| 2023/0222197 | A1 | 7/2023 | Derakhshani | |
| 2024/0211947 | A1 | 6/2024 | Ergen | |
| 2024/0289798 | A1 | 8/2024 | Koshy | |
| 2025/0259044 | A1* | 8/2025 | Crabtree | G06N 3/042 |
| 2025/0259085 | A1* | 8/2025 | Crabtree | G06N 5/043 |
| 2025/0390352 | A1* | 12/2025 | Crabtree | G06F 9/5027 |

OTHER PUBLICATIONS

"M. Mrabet and M. Sliti, "Toward Secure, Trustworthy, and Sustainable Edge Computing for Smart Cities: Innovative Strategies and Future Prospects," in IEEE Access, vol. 13, pp. 174236-174253, 2025, doi: 10.1109/ACCESS.2025.3602390." (Year: 2025).*

"G. Kemele and S. Ray, "Security of Multitenant Systems: A Survey," in IEEE Access, vol. 14, pp. 43389-43411, 2026, doi: 10.1109/ACCESS.2026.3671671." (Year: 2026).*

CISA. (2023). Enhancing cyber resilience: Insights from the CISA Healthcare and Public Health Sector Risk and Vulnerability Assessment. Cybersecurity and Infrastructure Security Agency. Retrieved from https://www.cisa.gov/news-events/news/cisa-releases-key-risk-and-vulnerability-findings-healthcare-and-public-health-sector. 27 pages.

Dimitrova, M. (Dec. 11, 2020). Vulnerabilities in Verifone and Ingenico PoS Devices Could Enable Hackers to Steal and Clone Credit Cards. How To, Technology and PC Security Forum | SensorsTechForum.com. https://sensorstechforum.com/verifone-ingenico-pos-devices-vulnerable. 2 pages.

FATF. (2020). Virtual assets red flag indicators of money laundering and terrorist financing. Financial Action Task Force. Retrieved from https://www.fatf-gafi.org/content/dam/fatf-gafi/guidance/RBA-VA-VASPs.pdf. 59 pages.

Notice of Allowance dated Dec. 29, 2025 for U.S. Appl. No. 19/250,606 (pp. 1-9).

Office Action dated Oct. 24, 2025 for U.S. Appl. No. 19/250,606 (pp. 1-15)

Stennikov, A., & Yunusov, T. (2020). POSWorld: Vulnerabilities within Ingenico Telium 2 and Verifone VX and MX series terminals. Black Hat Europe 2020. Retrieved from https://i.blackhat.com/eu-20/Thursday/eu-20-Stennikov-POSWorld-Should-You-Be-Afraid-Of-Hand-Ons-Payment-Devices-wp.pdf. 63 pages

* cited by examiner

HARDWARE-ENFORCED TRUST ARCHITECTURE WITH COMPOSITIONAL EXPOSURE BOUNDS FOR DISTRIBUTED AND AUTONOMOUS SYSTEMS

BACKGROUND

Distributed and autonomous systems operate across a wide range of domains, including financial trading, autonomous vehicles, robotic manufacturing, critical infrastructure control, and defense applications. These systems increasingly operate with reduced human oversight, making decisions and taking actions based on algorithmic processing of sensor data and environmental inputs. As the autonomy and capability of such systems expand, so too does the potential for adverse outcomes when system behavior deviates from intended operational parameters.

Traditional approaches to constraining autonomous system behavior rely on software-based safety mechanisms, including rate limiters, policy engines, and centralized oversight systems. Software-based constraints evaluate commands against predefined rules and may block or modify commands that violate policy. However, software-based mechanisms operate within the same execution environment as the systems they constrain, making them susceptible to circumvention through software modification, privilege escalation, or exploitation of software vulnerabilities. When autonomous systems lose network connectivity-whether due to infrastructure failure, adversarial interference, or operation in remote environments-software-based mechanisms that depend on external validation or centralized oversight may cease to function effectively. Existing systems typically respond to network partitions by either continuing operation without constraints or ceasing operation entirely, neither of which provides bounded autonomous operation during communication disruptions. Furthermore, when multiple autonomous agents or subsystems operate together, individual safety guarantees provided by software mechanisms do not compose in a straightforward manner, as agents may interact in ways that combine their effects or force each other into states where avoiding adverse outcomes becomes difficult. Traditional Byzantine fault tolerant consensus mechanisms treat all nodes uniformly, limiting the fraction of faulty nodes that may be tolerated without additional information about node trustworthiness.

SUMMARY

Embodiments of the present invention provide a hardware-enforced trust architecture for distributed and autonomous systems that maintains bounded exposure guarantees under adversarial conditions. The architecture comprises four interconnected subsystems: a hardware-rooted trust isolation subsystem, a trust-weighted consensus subsystem, a compositional exposure subsystem, and a constraint enforcement subsystem. These subsystems are architecturally integrated such that no proper subset achieves a bounded exposure guarantee.

The hardware-rooted trust isolation subsystem includes at least one hardware trust anchor, such as a hardware security module, trusted platform module, secure element, hardware-based trusted execution environment, hardware-isolated enclave, or physically-unclonable function. The hardware trust anchor computes a trust metric from physical observables within a hardware-enforced isolation boundary that cannot be observed or modified by software executing outside the isolation boundary. The trust metric satisfies boundedness and monotonicity constraints, with the trust metric being non-increasing in behavioral divergence from a baseline.

The compositional exposure subsystem enforces a total exposure bound for a system composed of multiple components. The total exposure bound is computed by applying a composition operator to respective component exposure bounds, where the composition operator preserves boundedness and satisfies monotonicity properties. The total exposure bound may be an absolute, non-amortizable ceiling on cumulative exposure that cannot be bypassed, deferred, or overridden by software executing at any privilege level. The compositional exposure subsystem may enforce the total exposure bound during network partitions of arbitrary duration.

The trust-weighted consensus subsystem achieves Byzantine fault tolerance by weighting node contributions based on respective trust metrics. By leveraging hardware-attested trust metrics rather than treating all nodes uniformly, the trust-weighted consensus subsystem may achieve fault tolerance for a faulty node fraction exceeding the bounds achievable by consensus mechanisms using uniform node weighting.

The constraint enforcement subsystem validates commands against governance rules and triggers automatic revocation exclusively through hardware-enforced paths that cannot be bypassed, modified, or disabled by software executing at any privilege level. Revocation may be triggered in response to the trust metric falling below a threshold or cumulative exposure reaching the total exposure bound.

Embodiments also provide methods for certifying composite systems comprising multiple components, methods for enforcing behavioral bounds during runtime operation, and methods for modifying exposure bounds in deployed systems through threshold signature ceremonies with timelock enforcement.

Other features and advantages of various aspects and embodiments of the present invention will become apparent from the following description and from the claims.

DETAILED DESCRIPTION

Figure 1:
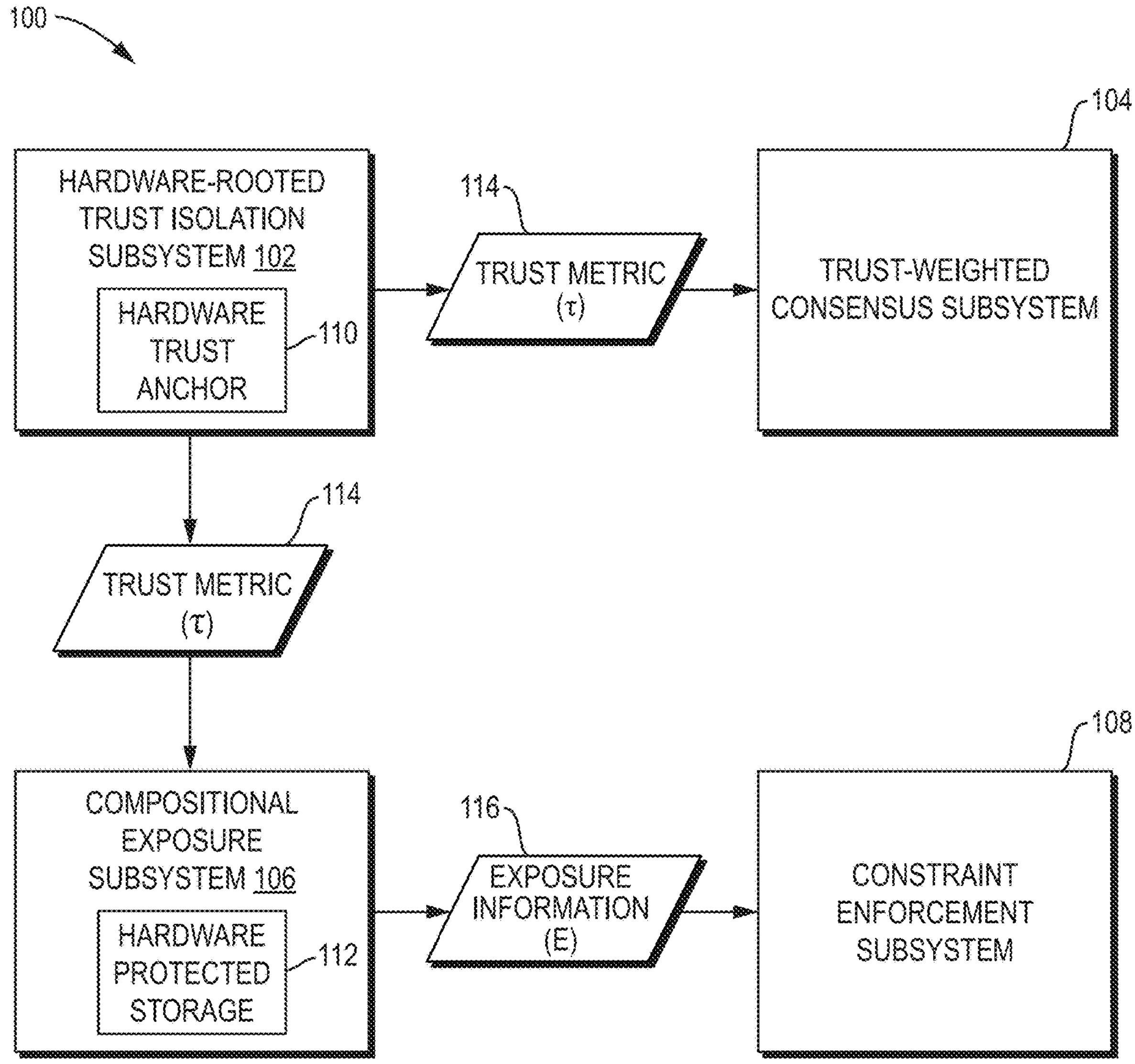
FIG. 1 is a block diagram of a hardware-enforced trust system according to one embodiment of the present invention.

Distributed and autonomous systems operating in contested environments face a set of interrelated technical challenges that existing approaches fail to address adequately. Embodiments of the present invention address these challenges through hardware-enforced trust architectures that provide quantifiable guarantees under adversarial conditions.

A first technical problem relates to the lack of enforceable constraints that persist during network partitions. When an autonomous system loses network connectivity-whether due to infrastructure failure, adversarial jamming, or operation in remote environments-software-based safety mechanisms that depend on external validation or centralized oversight cease to function. Existing systems respond to network partitions in one of two unsatisfactory ways: either the system fails open and continues operating without constraints, creating unbounded risk exposure, or the system fails closed and ceases all operations, rendering the system unable to perform its mission. Neither approach provides bounded autonomous operation during communication blackouts. For example, an autonomous naval vessel operating under electronic warfare conditions may lose all network connectivity for extended periods, yet the vessel may need to maintain defensive capability while providing cryptographic guarantees that autonomous actions remain within authorized bounds. Embodiments of the present invention address this problem by providing partition-duration independence, wherein hardware-enforced exposure bounds remain invariant regardless of how long a network partition persists.

A second technical problem relates to the inability of software-only constraints to provide hardware-enforced behavioral bounds. Software-based safety mechanisms, regardless of their sophistication, may be bypassed by compromised software, disabled by malicious actors with sufficient system access, or overridden by software executing at elevated privilege levels. A rogue process or compromised system component may execute unlimited actions without hardware-enforced ceilings. For example, algorithmic trading systems have executed large volumes of trades within short time periods, causing market disruptions, because software-based rate limits and exposure caps could be circumvented or disabled. Similarly, autonomous flight control systems have overridden pilot inputs repeatedly because software-based constraints lacked hardware enforcement. Embodiments of the present invention address this problem by providing hardware-enforced exposure bounds that cannot be bypassed, modified, or disabled by software executing at any privilege level, including software with root or kernel access.

A third technical problem relates to the challenge of achieving Byzantine fault tolerance exceeding the $f<n/3$ bound. Traditional Byzantine fault tolerant consensus mechanisms treat all nodes uniformly, which limits the maximum fraction of faulty nodes that may be tolerated to less than one-third of the total node count. This limitation arises because, without additional information about node trustworthiness, the consensus mechanism cannot distinguish between honest nodes and Byzantine nodes that may behave arbitrarily. In distributed autonomous systems where some nodes may be compromised or operating under adversarial control, the $f<n/3$ bound may be insufficient to maintain system integrity. Embodiments of the present invention address this problem by providing trust-weighted consensus mechanisms that leverage hardware-rooted trust metrics to weight node contributions, thereby achieving Byzantine fault tolerance for $f<n/2$ faulty nodes.

A fourth technical problem relates to the absence of compositional exposure guarantees for distributed autonomous systems. When multiple autonomous agents or subsystems operate together, individual safety guarantees do not compose in a straightforward manner. An agent maintaining exposure below an individual ceiling, and another agent maintaining exposure below another individual ceiling, does not guarantee that the combined system is safe. The agents may interact in ways that combine their exposures, or one agent's actions may force another agent into states where avoiding exposure violations becomes impossible. Existing approaches lack formal frameworks for computing system-level exposure bounds from component-level specifications without requiring integrated testing of the composed system. Embodiments of the present invention address this problem by providing compositional exposure bounds that are computable from component specifications alone, independent of internal implementation details, and without requiring runtime measurement of inter-subsystem interactions.

A fifth technical problem relates to the challenge of providing durable trust guarantees under adversarial conditions. Autonomous systems operating in contested environments face adversaries with varying capabilities, ranging from script-level attackers to nation-state actors with physical access to hardware. Existing approaches provide probabilistic safety assessments that cannot guarantee the absence of failure modes, or rely on empirical testing that cannot cover all possible adversarial scenarios. Embodiments of the present invention address this problem by providing hardware-enforced trust architectures with quantifiable bypass probabilities, wherein multiple independent hardware layers provide defense-in-depth such that compromise of the system requires simultaneous physical compromise of all hardware-enforced paths.

Figure 2:
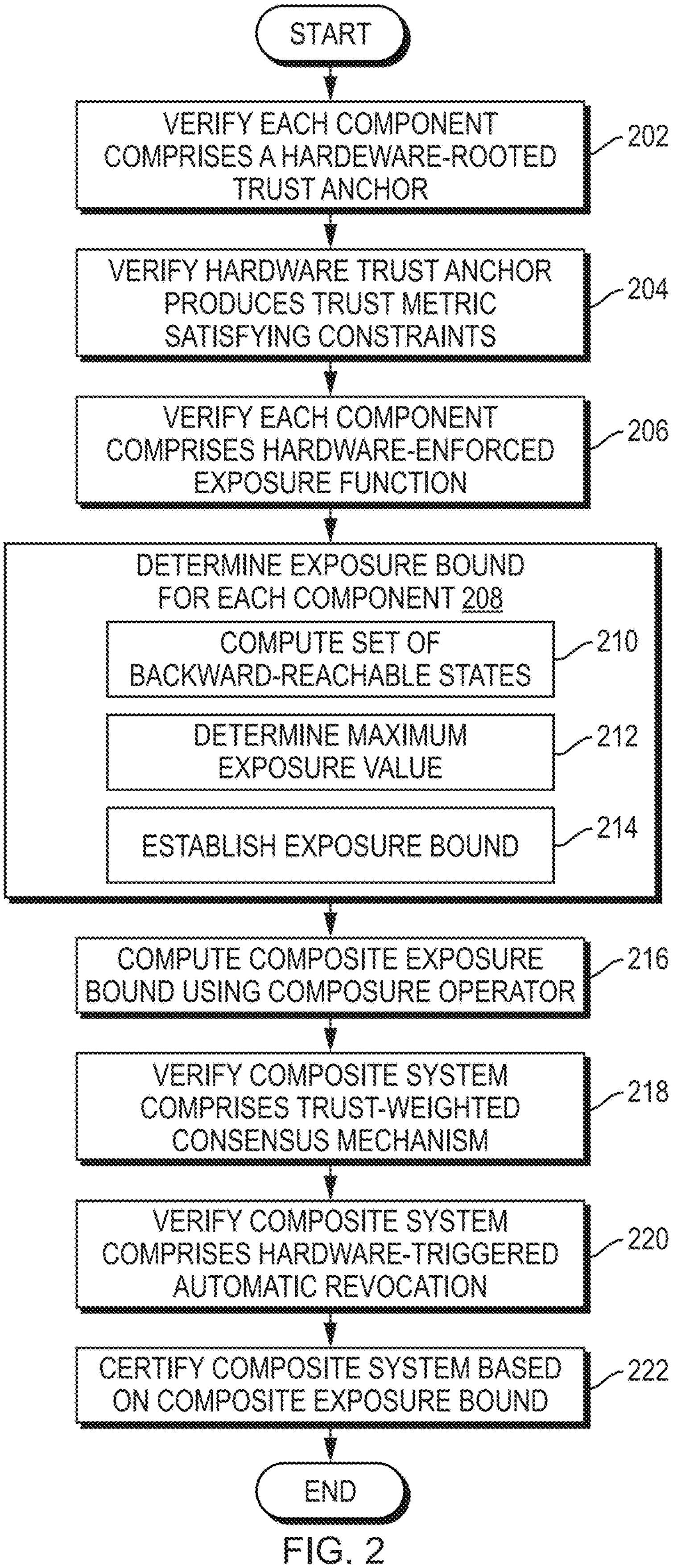
FIG. 2 is a flowchart of a method performed by the system of FIG. 1 according to one embodiment of the present invention.

Referring to FIG. 1, a block diagram is shown of a hardware-enforced trust system 100 according to one embodiment of the present invention. Referring to FIG. 2, a flowchart is shown of a method 200 performed by the system 100 of FIG. 1 according to one embodiment of the present invention. The method 200 provides a sequential certification process for verifying and certifying composite systems comprising a plurality of hardware-protected components.

The hardware-enforced trust system 100 may, for example, provide durable trust guarantees for distributed and/or autonomous systems operating under adversarial conditions. The system 100 comprises four interconnected subsystems: a hardware-rooted trust isolation subsystem 102, a trust-weighted consensus subsystem 104, a compositional exposure subsystem 106, and a constraint enforcement subsystem 108. These four subsystems are architecturally integrated such that no proper subset of the four subsystems achieves a bounded exposure guarantee. The architectural integration ensures that the guarantees provided by the hardware-enforced trust system 100 emerge from the synergistic cooperation of all four subsystems rather than from any individual subsystem operating in isolation.

With continued reference to FIG. 1, the hardware-rooted trust isolation subsystem 102 computes a trust metric 114 (denoted t) from physical observables through a monotonic mapping satisfying axiomatic constraints. The hardware-rooted trust isolation subsystem 102 includes at least one hardware trust anchor 110. The hardware trust anchor 110 may, for example, be selected from a hardware security module, a trusted platform module, a secure element, a hardware-based trusted execution environment, a hardware-isolated enclave, and/or a physically-unclonable function. In some embodiments, the hardware trust anchor 110 may include a PUF-based hardware identity through manufacturing variation, such as an SRAM PUF and/or an NXP SE051 secure element. The hardware trust anchor 110 provides a root of trust that cannot be modified or bypassed by software executing at any privilege level.

The hardware trust anchor 110 computes the trust metric t from observables. The trust metric t takes values in [0,1] with t=0 representing zero trust and t=1 representing maximum verified trust. The trust metric t is monotonically non-increasing in behavioral divergence from baseline. As an agent or system deviates further from expected baseline behavior, the trust metric t may decrease monotonically, ensuring that increased behavioral divergence does not result in increased trust. The trust metric computation occurs within a hardware-enforced isolation boundary and cannot be observed or modified by software executing outside the isolation boundary. In some embodiments, trust computation may run inside an Intel TDX trust domain, which provides memory encryption, isolation from kernel and hypervisor, and attestation proving code integrity to remote parties. The hardware-rooted trust isolation subsystem 102 outputs the trust metric 114 along two paths within the hardware-enforced trust system 100. A first path directs the trust metric 114 horizontally to the trust-weighted consensus subsystem 104. A second path directs the trust metric 114 vertically to the compositional exposure subsystem 106. The dual-path architecture enables the trust metric 114 to inform both consensus operations and exposure computations within the hardware-enforced trust system 100. In the method 200, verifying that each component comprises a hardware-rooted trust anchor (step 202) and verifying that the hardware trust anchor produces a trust metric satisfying constraints (step 204) correspond to the functions performed by the hardware-rooted trust isolation subsystem 102.

The trust-weighted consensus subsystem 104 receives the trust metric 114 from the hardware-rooted trust isolation subsystem 102 and weights node contributions based on respective trust metrics. Trust values may be weighted in consensus voting such that aggregate trust determines decision validity. The trust-weighted consensus subsystem 104 achieves Byzantine fault tolerance $f<n/2$ through trust-weighted voting. By weighting node contributions according to hardware-attested trust metrics rather than treating all nodes uniformly, the trust-weighted consensus subsystem 104 may achieve fault tolerance for a faulty node fraction exceeding the $f<n/3$ bound achievable by consensus mechanisms using uniform node weighting. The trust-weighted consensus subsystem 104 connects to the constraint enforcement subsystem 108, enabling consensus decisions to inform constraint enforcement operations. In the method 200, verifying that the composite system comprises a trust-weighted consensus mechanism (step 218) corresponds to the functions performed by the trust-weighted consensus subsystem 104.

As further shown in FIG. 1, the compositional exposure subsystem 106 receives the trust metric 114 from the hardware-rooted trust isolation subsystem 102 and maintains exposure information 116 (denoted E). The compositional exposure subsystem 106 includes hardware-protected non-volatile storage 112 for maintaining cumulative exposure values and exposure bounds. Exposure accumulates in hardware storage with increment-only semantics. The compositional exposure subsystem 106 enforces a total exposure bound E for a system composed of a plurality of components, wherein the total exposure bound E is computed by applying a composition operator to respective component exposure bounds of the plurality of components, such that $E\_total=\otimes(E_1, \ldots, E_n)$ with partition-duration independence. The composition operator preserves boundedness such that bounded inputs yield bounded outputs, and component exposure increase cannot decrease total exposure. The compositional exposure subsystem 106 may enforce an absolute, non-amortizable ceiling on cumulative exposure, wherein the ceiling is hardware-protected and cannot be exceeded regardless of operational duration, network partition state, or adversarial action. The compositional exposure subsystem 106 outputs the exposure information 116 to the constraint enforcement subsystem 108. In the method 200, verifying that each component comprises a hardware-enforced exposure function (step 206), determining an exposure bound for each component (step 208), and computing a composite exposure bound using a composition operator (step 216) correspond to the functions performed by the compositional exposure subsystem 106. Step 208 comprises computing a set of backward-reachable states (step 210), determining a maximum exposure value (step 212), and establishing the exposure bound (step 214).

The constraint enforcement subsystem 108 receives the trust metric 114 from the trust-weighted consensus subsystem 104 and the total exposure bound E from the compositional exposure subsystem 106. The constraint enforcement subsystem 108 validates commands against signed governance rules with hardware-enforced automatic revocation. The constraint enforcement subsystem 108 triggers automatic revocation exclusively through hardware-enforced paths that cannot be bypassed, modified, or disabled by software executing at any privilege level, in response to at least one of: the trust metric t falling below a threshold, or cumulative exposure reaching the total exposure bound E. The constraint enforcement subsystem 108 serves as a convergence point where trust information and exposure information combine to determine whether commands may proceed. In the method 200, verifying that the composite system comprises hardware-triggered automatic revocation (step 220) corresponds to the functions performed by the constraint enforcement subsystem 108.

The total exposure of the composed system remains bounded by a computable function$B(E_1, \ldots, E_n)$ that is independent of internal subsystem implementation, computable from component specifications alone without integrated testing, and invariant under partition duration for offline operation. These properties enable modular certification of subsystems and compositional reasoning about system-level guarantees. In the method 200, certifying the composite system based on the composite exposure bound (step 222) establishes that the composite exposure bound is independent of internal implementation of each component and is computable from specifications of the plurality of components without integrated testing.

The method 200 proceeds through a sequence of verification and certification steps that establish compositional guarantees for systems composed of multiple hardware-protected components. The method 200 begins with verifying that each component comprises a hardware-rooted trust anchor (step 202). The method 200 then proceeds to verifying that the hardware trust anchor produces a trust metric satisfying constraints including boundedness, monotonicity, and hardware isolation (step 204). The method 200 continues by verifying that each component comprises a hardware-enforced exposure function satisfying bound preservation and monotonicity properties (step 206). For each component, the method 200 determines an exposure bound (step 208) by computing a set of backward-reachable states from goal states specified in a mission specification (step 210), determining a maximum exposure value over the backward-reachable state set (step 212), and establishing the exposure bound as the maximum exposure value (step 214). The method 200 then computes a composite exposure bound by applying a composition operator to the exposure bounds of the plurality of components (step 216). The method 200 continues by verifying that the composite system comprises a trust-weighted consensus mechanism achieving Byzantine fault tolerance by weighting node contributions based on respective trust metrics (step 218). The method 200 then verifies that the composite system comprises hardware-triggered automatic revocation capability through hardware-enforced paths that cannot be bypassed, modified, or disabled by software executing at any privilege level (step 220).

Finally, the method 200 certifies the composite system based on the composite exposure bound (step 222), establishing that the composite exposure bound is independent of internal implementation of each component and is computable from specifications of the plurality of components without integrated testing.

The hardware trust anchor 110 provides a foundation for hardware-rooted trust that enables the hardware-enforced trust system 100 to establish trust guarantees that cannot be circumvented by software. In various embodiments, the hardware trust anchor 110 may provide one or more of the following capabilities, in any combination: cryptographic key generation and storage in tamper-resistant hardware, attestation of system state to local or remote verifiers, sealed storage that binds data to specific hardware and software configurations, monotonic counters that cannot be decremented or reset by software, and/or hardware-isolated execution environments for trust-sensitive computations. The hardware trust anchor 110 may interface with other components of the hardware-rooted trust isolation subsystem 102 through hardware-protected communication channels that prevent interception or modification by software executing outside the isolation boundary.

With continued reference to FIG. 1, the hardware trust anchor 110 may be implemented using various hardware security technologies. In some embodiments, the hardware trust anchor 110 may be implemented using a discrete security chip that provides dedicated cryptographic processing and secure storage. In some embodiments, the hardware trust anchor 110 may be implemented using a processor-integrated security subsystem that provides hardware isolation within a general-purpose processor. In some embodiments, the hardware trust anchor 110 may be implemented using a secure element that provides a self-contained security processing environment. In some embodiments, the hardware trust anchor 110 may be implemented using a physically unclonable function that derives cryptographic identity from manufacturing variations. These implementation approaches may be used individually or in combination to provide defense-in-depth for the hardware-enforced trust system 100.

In some embodiments, the hardware trust anchor 110 may be implemented using a Trusted Platform Module (TPM) 2.0 chip, such as an Infineon SLB9670 or STMicro ST33TPHF2E. A TPM 2.0 implementation may provide sealed storage for exposure ceilings and policy rules, Platform Configuration Register (PCR)-based attestation for tamper-proof logging, and/or monotonic counters for exposure tracking. The TPM 2.0 chip may perform RSA-2048 signing, SHA-256 hashing, and/or key derivation using an internal cryptographic engine implemented in dedicated silicon rather than software emulation. The TPM may seal data to specific PCR values representing an authorized boot configuration, such that if the current PCR state differs from the expected state (indicating system modification), the TPM refuses to unseal the data and all commands are blocked.

In some embodiments, the hardware trust anchor 110 may be implemented using an Intel TDX (Trust Domain Extensions) enclave on Intel Xeon Sapphire Rapids processors or newer processors supporting TDX. An Intel TDX implementation may provide memory encryption using AES-128-XTS that is hardware-enforced, isolation from kernel and hypervisor such that even an adversary with root access to the operating system cannot modify the trust computation logic or falsify results, and/or attestation proving code integrity to remote parties. Trust computation running inside an Intel TDX trust domain may execute within a hardware-enforced isolation boundary where the trust metric computation cannot be observed or modified by software executing outside the isolation boundary. The TDX enclave may read violation counts from TPM Platform Configuration Registers, compute updated trust values using the trust metric formula, and write new trust values to TPM-sealed storage, all within the hardware-isolated environment.

In some embodiments, the hardware trust anchor 110 may be implemented using an Infineon SLI37 secure element with Common Criteria EAL6+certification. An EAL6+secure element implementation may provide a level of assurance suitable for government and defense applications where adversaries may include nation-state actors. In some embodiments, the hardware trust anchor 110 may be implemented using an Apple Secure Enclave Processor for mobile and edge deployment applications. An Apple Secure Enclave implementation may provide hardware-isolated security processing on Apple silicon devices. In some embodiments, the hardware trust anchor 110 may be implemented using a dedicated hardware security module (HSM) that provides FIPS 140-2 Level 3 or Level 4 certified cryptographic processing and key storage.

In some embodiments, the hardware trust anchor 110 may be implemented using an SRAM PUF (Physically Unclonable Function) combined with an NXP SE051 secure element. An SRAM PUF exploits manufacturing variation in SRAM cells to generate hardware identity that is unique to each physical device and cannot be cloned or reproduced. When power is applied to an SRAM array, each cell settles into a preferred state (0 or 1) determined by minute manufacturing variations in transistor threshold voltages. This pattern serves as a device-specific fingerprint that may be used to derive cryptographic keys. The combination of SRAM PUF with a secure element may provide hardware identity through manufacturing variation that serves as a root of trust for the hardware-enforced trust system 100. The PUF-derived identity may be used to authenticate the hardware trust anchor 110 to remote verifiers and to bind cryptographic operations to a specific physical device.

The hardware trust anchor 110 computes the trust metric 114 from observables within a hardware-enforced isolation boundary. The trust metric 114 may represent a quantitative measure of system trustworthiness that informs both consensus operations and constraint enforcement within the hardware-enforced trust system 100. The trust metric 114 may satisfy a boundedness constraint such that the trust metric 114 takes values in a bounded range. In some embodiments, the trust metric 114 may take values in the range [0,1], with a value of 0 representing zero trust and a value of 1 representing maximum verified trust. The trust metric 114 may satisfy a monotonicity constraint such that the trust metric 114 is non-increasing in behavioral divergence from a baseline. As an agent or system deviates further from expected baseline behavior, the trust metric 114 may decrease monotonically. The trust metric 114 may satisfy a hardware isolation constraint such that the trust metric computation occurs within a hardware-enforced isolation boundary and cannot be observed or modified by software executing outside the isolation boundary.

In some embodiments, the trust metric 114 may be computed using a weighted formula comprising multiple components. An attestation component may be based on exponential decay of time since last attestation, reflecting freshness of hardware attestation. A commitment component may be based on a ratio of valid commitments to total actions, reflecting compliance with commitment protocols.

An exposure component may be based on remaining ceiling utilization, reflecting how much of the allocated exposure budget remains available. In some embodiments, the trust metric computation may use a weight of 0.4 for attestation freshness, a weight of 0.4 for commitment compliance, and a weight of 0.2 for exposure utilization. In some embodiments, the attestation decay component may use a time constant of 600 seconds, such that the attestation component decays exponentially with a characteristic time of 600 seconds since the last attestation.

With continued reference to FIG. 1, the compositional exposure subsystem 106 maintains exposure information 116 that enables the hardware-enforced trust system 100 to track and enforce exposure bounds across the system. The exposure information 116 may include cumulative exposure values representing the total exposure accumulated by the system or its components, exposure bounds representing the maximum permissible exposure for each component or for the system as a whole, and/or configuration data specifying how exposure is computed and enforced. The compositional exposure subsystem 106 may store the exposure information 116 in hardware-protected storage 112 that provides protection against unauthorized access or modification. By maintaining exposure information 116 in hardware-protected storage 112, the compositional exposure subsystem 106 may ensure that exposure tracking and enforcement cannot be circumvented by software executing at any privilege level.

The hardware-protected storage 112 may be implemented using various hardware security technologies that provide tamper-resistant storage capabilities. In some embodiments, the hardware-protected storage 112 may be implemented using non-volatile storage within a Trusted Platform Module (TPM) that persists across system reboots and cannot be modified by software executing outside authorized contexts. The hardware-protected storage 112 may store exposure ceilings representing the maximum permissible cumulative exposure, cumulative exposure counters tracking the exposure accumulated to date, component exposure bounds for each component of the plurality of components, and/or composition operator parameters specifying how component exposure bounds are combined to compute the total exposure bound. The hardware-protected storage 112 may enforce access controls such that exposure values may only be read or modified through hardware-enforced interfaces that verify authorization before permitting access.

The compositional exposure subsystem 106 may maintain audit logs that provide a tamper-evident record of actions and violations. Audit logging may enable post-hoc verification that the hardware-enforced trust system 100 operated within its specified bounds and may provide evidence for forensic analysis in the event of a security incident. The compositional exposure subsystem 106 may implement audit logging using append-only storage mechanisms that prevent modification or deletion of log entries after they are recorded. In some embodiments, the compositional exposure subsystem 106 may use TPM Platform Configuration Registers (PCRs) for append-only logging of actions and violations. PCRs provide hardware-enforced append-only semantics wherein each new value is computed by hashing the previous PCR value concatenated with new data, such that the PCR value reflects the entire history of extensions and cannot be rolled back to a previous state. In some embodiments, the compositional exposure subsystem 106 may use PCR 11 for action logs, extending PCR 11 with each action executed by the system. In some embodiments, the compositional exposure subsystem 106 may use PCR 13 for violation logs, extending PCR 13 with each constraint violation detected by the system. The append-only nature of PCR logging ensures that actions and violations cannot be erased or modified after they occur, providing a tamper-evident audit trail for the hardware-enforced trust system 100.

The compositional exposure subsystem 106 may track cumulative exposure using hardware-enforced counters that provide increment-only semantics. Increment-only semantics may ensure that cumulative exposure cannot be artificially reduced by software manipulation, providing a hardware-enforced floor on cumulative exposure. In some embodiments, the compositional exposure subsystem 106 may use TPM monotonic counters for hardware-enforced exposure floor tracking with increment-only semantics. A TPM monotonic counter may only be incremented and cannot be decremented or reset by software, providing a hardware-enforced floor on cumulative exposure. The compositional exposure subsystem 106 may increment the monotonic counter as exposure accumulates, ensuring that cumulative exposure cannot be artificially reduced by software manipulation. The increment-only semantics of TPM monotonic counters ensure that exposure accumulation is irreversible within an operational epoch.

As further shown in FIG. 1, the compositional exposure subsystem 106 may bind exposure ceilings to specific system configurations to prevent bypass of exposure limits through system modification. Configuration binding may ensure that the exposure ceiling may only be accessed when the system is in a known-good configuration, preventing an adversary from modifying the system to circumvent exposure enforcement. In some embodiments, the compositional exposure subsystem 106 may seal exposure ceilings to specific TPM PCR values representing boot state. Sealing binds data to a specific hardware and software configuration such that the sealed data may only be unsealed when the system configuration matches the expected state. The compositional exposure subsystem 106 may seal the exposure ceiling to PCR values representing the boot chain, kernel configuration, and/or enforcement module integrity. If the system configuration changes—for example, if the kernel is modified or the enforcement module is replaced—the PCR values will differ from the expected values, and the TPM will refuse to unseal the exposure ceiling. This sealing mechanism ensures that the exposure ceiling may only be accessed when the system is in a known-good configuration, preventing bypass of exposure limits through system modification.

The compositional exposure subsystem 106 enforces a total exposure bound for a system composed of a plurality of components using a composition operator that combines component exposure bounds to compute the total exposure bound. The composition operator may enable modular certification of subsystems and compositional reasoning about system-level guarantees, such that the total exposure bound may be computed from component specifications alone without requiring integrated testing of the composed system. The composition operator may satisfy specific mathematical properties that ensure well-defined and predictable total exposure bounds. The composition operator may satisfy a bound preservation property such that bounded inputs yield bounded outputs. When component exposure bounds are finite, the total exposure bound computed by the composition operator is also finite. The composition operator may satisfy a monotonicity property such that an increase in a component exposure bound does not decrease the total exposure bound. If a component's exposure bound increases, the total exposure bound either increases or remains unchanged, but does not decrease. The composition operator may be selected from an operator class that preserves boundedness and satisfies subadditivity under interaction. These properties ensure that the composition operator produces well-defined and predictable total exposure bounds from component exposure bounds.

With continued reference to FIG. 1, various composition operators may be suitable for different application domains and security requirements. In some embodiments, the composition operator may implement additive composition such that the total exposure bound equals the sum of component exposure bounds, which may be suitable when component exposures are independent and cumulative. In some embodiments, the composition operator may implement multiplicative composition for independent security domains.

The compositional exposure subsystem 106 may implement multi-domain security with multiplicative composition such that total exposure equals the product of hardware, cryptographic, policy, and physical domain exposures. Multi-domain security may provide defense-in-depth by requiring an adversary to compromise multiple independent security domains to achieve a given level of system exposure. For independent security domains, compromise of one domain does not imply compromise of others, and the multiplicative composition reflects this independence. The total exposure may be computed as $E_{total}=E_{hardware}\times E_{crypto}\times E_{policy}\times E_{physical}$, where each domain contributes multiplicatively to the system security. This multiplicative domain composition enables the compositional exposure subsystem 106 to account for multiple independent security dimensions when computing the total exposure bound.

The compositional exposure subsystem 106 may detect network partitions using multi-source detection requiring agreement of multiple independent sources to reduce false positive rates. In some embodiments, the compositional exposure subsystem 106 may use a 3-of-5 voting scheme requiring agreement of 3 out of 5 sources to confirm a network partition, where the sources may include TCP timeout, DNS failure, ping failure, HTTP unreachable, and/or NTP unreachable. The false positive rate for partition detection may be approximately $10^{-9}$, with detection latency of approximately 135 seconds corresponding to 3 consecutive 45-second timeouts. The compositional exposure subsystem 106 may reduce the exposure ceiling to 30-70% of the normal value during a detected network partition to provide additional safety margin when external validation is unavailable.

The total exposure bound may be invariant under network partition duration such that the compositional exposure subsystem 106 enforces the total exposure bound during network partitions of arbitrary duration. Partition-duration independence may ensure that the hardware-enforced trust system 100 maintains bounded exposure guarantees regardless of how long a network partition persists, addressing the technical problem of enforceable constraints that persist during network partitions. The compositional exposure subsystem 106 may enforce partition-duration independence for network partitions up to 7 days, covering 99.9% of real-world partition scenarios based on historical analysis. During a network partition, the compositional exposure subsystem 106 continues to enforce the total exposure bound using local hardware enforcement without requiring network connectivity. All constraints continue to be enforced by local hardware including the exposure ceiling enforced by the hardware-protected storage 112, trust decay enforced by hardware timers, commitment delay enforced by local time sources, and/or action logging enforced by TPM PCR extension. The partition-duration independence ensures that the hardware-enforced trust system 100 maintains bounded exposure guarantees regardless of how long a network partition persists.

The compositional exposure subsystem 106 may implement incremental update capability to reduce the certification burden when components are updated. Incremental update capability may enable modular maintenance of the hardware-enforced trust system 100 by allowing individual components to be updated without requiring recharacterization or integrated testing of the entire composed system. Upon subsystem update, only the updated subsystem requires recharacterization. When a component of the plurality of components is updated, the compositional exposure subsystem 106 may recompute the total exposure bound from stored component bounds without requiring integrated testing of the entire composed system. The component exposure bounds for unchanged components remain valid, and only the updated component requires recharacterization to determine the updated component's exposure bound. The compositional exposure subsystem 106 may then apply the composition operator to the stored component bounds including the updated component's new exposure bound to compute the updated total exposure bound. This incremental update capability reduces the certification burden when components are updated, enabling modular maintenance of the hardware-enforced trust system 100.

The trust-weighted consensus subsystem 104 achieves Byzantine fault tolerance by weighting node contributions based on respective trust metrics rather than treating all nodes uniformly. Traditional Byzantine fault tolerant consensus mechanisms that use uniform node weighting may tolerate at most $f<n/3$ faulty nodes out of n total nodes. By weighting node contributions according to hardware-attested trust metrics, the trust-weighted consensus subsystem 104 may achieve fault tolerance for $f<n/2$ faulty nodes, exceeding the $f<n/3$ bound because the trust weighting may reduce the effective influence of Byzantine nodes that have low trust metrics.

With continued reference to FIG. 1, the trust-weighted consensus subsystem 104 may implement various approaches for achieving timestamp consensus among distributed nodes. Timestamp consensus may enable the trust-weighted consensus subsystem 104 to establish a common time reference across nodes, which may be used for ordering events, detecting replay attacks, and/or validating partition logs. The trust-weighted consensus subsystem 104 may compute timestamp consensus using multiple independent time sources, where the consensus value may be determined by applying a fault-tolerant aggregation function to timestamps from the independent sources. In some embodiments, the fault-tolerant aggregation function may be a median function, which may provide robustness against outliers and Byzantine behavior. The trust-weighted consensus subsystem 104 may use hardware-attested time sources that cannot be spoofed by software, providing a foundation for trusted timestamp consensus.

The trust-weighted consensus subsystem 104 may use various types of hardware-attested time sources for timestamp consensus. In some embodiments, the trust-weighted consensus subsystem 104 may use chip-scale atomic clocks (CSACs) that provide highly stable time references with bounded drift. In some embodiments, the trust-weighted consensus subsystem 104 may use GPS receivers that provide time synchronized to GPS satellite signals. In some embodiments, the trust-weighted consensus subsystem 104 may use network time protocol (NTP) sources that provide time synchronized to network time servers. In some embodiments, the trust-weighted consensus subsystem 104 may use blockchain timestamps that provide time anchored to blockchain block headers. The trust-weighted consensus subsystem 104 may use any combination of these time sources to achieve timestamp consensus with varying levels of accuracy, availability, and/or resistance to manipulation.

In some embodiments, the trust-weighted consensus subsystem 104 may use Byzantine voting with three chip-scale atomic clock (CSAC) clocks to achieve timestamp consensus through median calculation. For example, the trust-weighted consensus subsystem 104 may include three Microsemi SA.45s CSAC units configured in a Byzantine voting arrangement. Each CSAC unit may provide an independent time reference with drift bounded to approximately 4.3 microseconds per day. The trust-weighted consensus subsystem 104 may compute a timestamp consensus value as the median of the three CSAC timestamps. By using the median of three independent time sources, the trust-weighted consensus subsystem 104 may tolerate a single faulty or compromised CSAC unit while maintaining accurate timestamp consensus. The triple CSAC Byzantine voting arrangement may provide hardware-attested time references that cannot be spoofed by software and may enable the trust-weighted consensus subsystem 104 to detect and tolerate time manipulation attacks against individual CSAC units.

The trust-weighted consensus subsystem 104 may validate partition logs by computing timestamp consensus as a median of multiple independent time sources. In some embodiments, the trust-weighted consensus subsystem 104 may compute timestamp consensus as the median of CSAC timestamps, GPS timestamps, NTP timestamps, and/or blockchain timestamps. The multi-source timestamp consensus may enable the trust-weighted consensus subsystem 104 to detect timestamp manipulation attacks by comparing timestamps from independent sources. When an agent reconnects after a network partition, the trust-weighted consensus subsystem 104 may collect timestamps from multiple sources and compute a consensus timestamp as the median of the collected timestamps. If the maximum deviation between any individual timestamp and the consensus timestamp exceeds a threshold, the trust-weighted consensus subsystem 104 may reject the partition log as potentially manipulated. In some embodiments, the threshold for timestamp deviation may be 1 second. The multi-source timestamp consensus may provide defense-in-depth against time manipulation attacks by requiring an adversary to compromise multiple independent time sources to successfully manipulate timestamps.

As further shown in FIG. 1, the trust-weighted consensus subsystem 104 may implement median-based Byzantine fault tolerant consensus for state and ceiling proposals among distributed agents. In some embodiments, the trust-weighted consensus subsystem 104 may tolerate up to f Byzantine agents out of n total agents where f is less than n/3. Each agent may periodically broadcast a state and ceiling proposal, with each message signed by the agent's hardware trust anchor 110 to prevent spoofing. The trust-weighted consensus subsystem 104 may compute a consensus value as the median of valid proposals received from participating agents. The median-based approach may ensure robustness to outliers, since even if f agents propose arbitrarily extreme values, the median may remain within the range of honest agents' proposals. Timestamps from chip-scale atomic clocks may prevent replay attacks by enabling the trust-weighted consensus subsystem 104 to detect and reject stale messages. Agents whose proposals consistently deviate from consensus may be flagged as potentially Byzantine and may be excluded from future consensus rounds. The median-based Byzantine fault tolerant consensus may complete within approximately 100 milliseconds, dominated by network communication latency rather than computation, since the median calculation itself may require less than 1 millisecond.

The constraint enforcement subsystem 108 validates commands against governance rules and triggers automatic revocation exclusively through hardware-enforced paths that cannot be bypassed, modified, or disabled by software executing at any privilege level. The constraint enforcement subsystem 108 may trigger automatic revocation in response to at least one of: the trust metric falling below a threshold, or cumulative exposure reaching the total exposure bound. The constraint enforcement subsystem 108 may implement a Rule Enforcement Module (REM) comprising three components: a rule interpreter for translating human-readable governance rules to machine format, a rule engine for executing formalized rules in real-time, and a command rectification component for transforming non-compliant commands to compliant alternatives. The rule interpreter may parse governance rules expressed in human-readable syntax and translate the rules into a machine-executable format suitable for real-time evaluation. The rule engine may execute the formalized rules against incoming commands to determine whether each command complies with the governance rules. The command rectification component may transform non-compliant commands into compliant alternatives, including generating a no-operation (NOP) command when no compliant alternative exists.

The constraint enforcement subsystem 108 may implement multi-layer revocation through four independent hardware paths to achieve defense-in-depth against adversarial bypass attempts. Each revocation path operates independently of the other revocation paths, such that compromise of one revocation path does not affect the operation of the remaining revocation paths. A first revocation layer may use eBPF (extended Berkeley Packet Filter) kernel enforcement, wherein an eBPF program sets an exposure ceiling value to zero in a kernel map, causing all subsequent commands to be rejected. The first revocation layer may achieve latency of approximately 100 nanoseconds. A second revocation layer may use TPM key revocation, wherein the constraint enforcement subsystem 108 seals a zero ceiling value to the TPM and extends a Platform Configuration Register (PCR) with a revocation event, making the agent's signing key permanently unsealable. The second revocation layer may achieve latency of approximately 130 milliseconds. A third revocation layer may use TDX domain termination, wherein the constraint enforcement subsystem 108 terminates a Trust Domain via Intel TDX, wipes Trust Domain memory, and invalidates the Trust Domain encryption key. The third revocation layer may achieve latency of approximately 100 milliseconds. A fourth revocation layer may use process termination via SIGKILL, wherein a monitoring process sends SIGKILL to the agent process and frees process memory. The fourth revocation layer may achieve latency of approximately 10 milliseconds.

The constraint enforcement subsystem 108 may achieve a combined bypass probability of approximately $10^{-19}$ through the simultaneous requirement to compromise all independent hardware revocation layers. Because the four revocation layers operate independently, an adversary seeking to bypass revocation may need to simultaneously compromise all four layers. Each revocation path may monitor the trust metric 114 independently and may initiate revocation when the trust metric 114 falls below the threshold, without waiting for other revocation paths to confirm the revocation decision. The independence of the revocation layers ensures that compromise of any single layer does not enable bypass of the remaining layers. The combined bypass probability may be computed as the product of the individual layer bypass probabilities, reflecting the requirement for simultaneous compromise of all layers. For example, if each of four independent revocation paths has a bypass probability of approximately 10-5, the combined bypass probability may be approximately 10-20, reflecting the requirement for simultaneous compromise of all four paths. The multi-layer revocation architecture may provide defense-in-depth such that the constraint enforcement subsystem 108 maintains revocation capability even if individual layers are compromised.

The constraint enforcement subsystem 108 may use eBPF programs attached to Linux kernel syscall entry points to intercept and validate commands before execution. The eBPF programs may intercept syscalls including sendmsg for network transmission, write for file operations, and/or ioctl for device control. When an AI system issues a command, the command may originate as a syscall that the eBPF program intercepts before the syscall executes. The eBPF program may read the current exposure value from a kernel map implemented as an atomic 64-bit counter, read the current timestamp from a hardware time source, and compute projected exposure as the sum of current exposure and command exposure. The eBPF program may compare the projected exposure against the exposure ceiling retrieved from TPM-sealed storage. If the projected exposure exceeds the ceiling, the eBPF program may return an error code causing the syscall to be rejected, and the command may never reach the network or device. If the projected exposure does not exceed the ceiling, the eBPF program may return success, and the syscall may proceed. The eBPF-based command interception may achieve latency of approximately 10 microseconds per command evaluation.

The constraint enforcement subsystem 108 may use IMA/EVM (Integrity Measurement Architecture/Extended Verification Module) to verify eBPF program integrity through cryptographic signatures. IMA may measure the eBPF program by computing a cryptographic hash of the program code and storing the hash in a TPM Platform Configuration Register. EVM may verify that the eBPF program has a valid cryptographic signature from an authorized signing key before permitting the program to execute. The combination of IMA measurement and EVM signature verification may ensure that the eBPF program has not been modified from an authorized version. If an adversary attempts to modify the eBPF program to bypass constraint enforcement, the modification may be detected through IMA/EVM verification, and the modified program may be prevented from executing. The IMA/EVM integrity verification may provide assurance that the eBPF-based constraint enforcement operates according to authorized logic.

The constraint enforcement subsystem 108 may implement trust thresholds at 0.85 for degraded mode with proportional ceiling reduction and 0.60 for critical revocation. When the trust metric falls below 0.85 but remains at or above 0.60, the constraint enforcement subsystem 108 may enter a degraded mode wherein the exposure ceiling is reduced proportionally to the trust metric. In some embodiments, the reduced ceiling may be computed as the original ceiling multiplied by the ratio of the current trust metric to 0.85. The proportional ceiling reduction may limit the exposure that may accumulate when trust is degraded while permitting continued operation at reduced capability. When the trust metric falls below 0.60, the constraint enforcement subsystem 108 may trigger critical revocation through all four hardware revocation layers. The critical revocation may terminate the agent's operational capability through the multi-layer revocation architecture. The trust thresholds at 0.85 and 0.60 may provide graduated response to trust degradation, with proportional ceiling reduction for moderate trust degradation and complete revocation for severe trust degradation.

The constraint enforcement subsystem 108 may achieve total revocation latency of 150-300 milliseconds through parallel execution of the multiple revocation layers described above. When the trust metric falls below the critical threshold of 0.60 or cumulative exposure reaches the total exposure bound, the constraint enforcement subsystem 108 may initiate revocation through all four hardware revocation layers in parallel. The parallel execution may enable the constraint enforcement subsystem 108 to achieve total revocation latency dominated by the slowest individual layer rather than the sum of all layer latencies. With parallel execution, the total revocation latency may be approximately 130 milliseconds when all layers execute concurrently, or up to 300 milliseconds when accounting for coordination overhead and worst-case timing variations.

The constraint enforcement subsystem 108 may implement atomic check-and-update operations using eBPF atomic instructions to prevent time-of-check-time-of-use (TOCTOU) vulnerabilities. A TOCTOU vulnerability may arise when a time gap exists between checking a condition and acting on the result of the check, during which an adversary may modify the checked value. The constraint enforcement subsystem 108 may use eBPF atomic instructions to perform the exposure check and exposure update as a single atomic operation that cannot be interrupted or interleaved with other operations. The atomic check-and-update may ensure that the exposure value cannot change between the time the constraint enforcement subsystem 108 checks whether the command would exceed the ceiling and the time the constraint enforcement subsystem 108 updates the cumulative exposure counter. The atomic operations may be formally verified using proof assistants to establish that no TOCTOU window exists in the constraint enforcement logic.

In embodiments of the hardware-enforced trust system 100, no software-executed process may be permitted to determine, override, or modify whether a command, state transition, or revocation event is authorized once the threshold is evaluated, such that all enforcement decisions are finalized by hardware logic prior to any software-mediated action. The constraint enforcement subsystem 108 may evaluate trust thresholds and exposure bounds using hardware logic that executes independently of software processes. Once the hardware logic determines that the trust metric has fallen below a threshold or that cumulative exposure has reached the total exposure bound, the revocation decision may be finalized by the hardware logic and may not be overridden by software executing at any privilege level. The hardware-enforced finalization of enforcement decisions may ensure that an adversary with software access, including root or kernel access, cannot prevent or delay revocation once the triggering conditions are met. The separation between hardware-enforced decision finalization and software-mediated action may provide assurance that the constraint enforcement subsystem 108 maintains enforcement capability even under software compromise.

In some embodiments of the hardware-enforced trust system 100, the hardware-rooted trust isolation subsystem 102 may comprise a plurality of hardware trust anchors 110, each configured to produce a trust metric 114 from physical measurements that cannot be spoofed by software. The plurality of hardware trust anchors 110 may include any combination of the hardware security technologies described above, including Trusted Platform Modules, Intel TDX enclaves, secure elements, hardware security modules, and/or physically unclonable functions. Each hardware trust anchor 110 may produce trust metrics 114 from distinct physical measurements, providing defense-in-depth such that compromise of one trust measurement mechanism does not enable spoofing of trust metrics 114 produced by other hardware trust anchors 110. The trust metrics 114 from the plurality of hardware trust anchors 110 may be combined to form an aggregate trust metric 114 using various aggregation functions, such as a minimum function (reflecting the least trustworthy measurement), a weighted average (with weights reflecting relative reliability or security level of each hardware trust anchor 110), or a median function (providing robustness against outliers such that compromise of a minority of hardware trust anchors 110 does not enable manipulation of the aggregate trust metric 114).

In some embodiments of the hardware-enforced trust system 100, the compositional exposure subsystem 106 may comprise tamper-resistant storage configured to store a hardware-enforced exposure limit for each of a plurality of components. The tamper-resistant storage may provide protection against unauthorized access, modification, or deletion of exposure limits, ensuring that exposure enforcement cannot be circumvented by software manipulation of stored exposure limits. The tamper-resistant storage may be implemented using hardware security mechanisms that enforce access controls at the hardware level, such that software executing at any privilege level cannot bypass the access controls to modify stored exposure limits.

In some embodiments, the tamper-resistant storage may be implemented using non-volatile memory within a Trusted Platform Module (TPM) that provides hardware-enforced access controls. The TPM non-volatile memory may store the hardware-enforced exposure limit for each component of the plurality of components in a manner that prevents modification by software executing outside authorized contexts. The TPM may enforce access controls requiring cryptographic authorization before permitting read or write access to stored exposure limits. In some embodiments, the tamper-resistant storage may be implemented using secure element storage that provides physical tamper resistance in addition to logical access controls. The secure element may detect physical tampering attempts and may respond by erasing stored exposure limits to prevent extraction of sensitive data.

The tamper-resistant storage may store exposure limits in a format that binds each exposure limit to a specific component and prevents substitution or modification of exposure limits. In some embodiments, each stored exposure limit may be cryptographically signed by an authorized key, and the compositional exposure subsystem 106 may verify the signature before applying the exposure limit. In some embodiments, each stored exposure limit may be sealed to specific hardware and software configuration values, such that the exposure limit may only be accessed when the system configuration matches the expected state. The binding of exposure limits to specific components and configurations may prevent an adversary from substituting exposure limits between components or from accessing exposure limits in modified system configurations.

In some embodiments, the constraint enforcement subsystem 108 may comprise a plurality of independent revocation paths as described above. The plurality of independent revocation paths may provide defense-in-depth by ensuring that revocation capability is maintained even if individual revocation paths are compromised or disabled. The plurality of independent revocation paths may achieve a combined bypass probability substantially lower than any individual path, as described above.

In some embodiments of the hardware-enforced trust system 100, the compositional exposure subsystem 106 may be configured to maintain cumulative exposure in hardware-protected storage 112. The hardware-protected storage 112 may provide tamper-resistant storage for cumulative exposure values that cannot be read, modified, reset, or bypassed by software executing at any privilege level. The compositional exposure subsystem 106 may update the cumulative exposure value in the hardware-protected storage 112 as actions are executed, incrementing the cumulative exposure by the exposure value associated with each executed action. The hardware-protected storage 112 may enforce increment-only semantics such that the cumulative exposure value may only increase and cannot be decremented or reset by software, providing a hardware-enforced floor on cumulative exposure that prevents artificial reduction of exposure through software manipulation.

The hardware-protected storage 112 for cumulative exposure may be implemented using various hardware security mechanisms that provide protection against unauthorized access or modification. In some embodiments, the hardware-protected storage 112 may be implemented using non-volatile memory within a Trusted Platform Module (TPM) that enforces access controls at the hardware level. The TPM non-volatile memory may store the cumulative exposure value in a manner that prevents modification by software executing outside authorized contexts, and the TPM may require cryptographic authorization before permitting write access to the cumulative exposure value. In some embodiments, the hardware-protected storage 112 may be implemented using a monotonic counter within the TPM that provides hardware-enforced increment-only semantics. The monotonic counter may only be incremented and cannot be decremented or reset by software, ensuring that cumulative exposure accumulation is irreversible within an operational epoch.

The compositional exposure subsystem 106 may maintain the cumulative exposure value with atomicity guarantees that prevent race conditions and time-of-check-time-of-use vulnerabilities. When the compositional exposure subsystem 106 updates the cumulative exposure value, the update may be performed as an atomic operation that cannot be interrupted or interleaved with other operations. The atomic update may ensure that the cumulative exposure value remains consistent even when multiple concurrent processes attempt to update the value simultaneously. In some embodiments, the compositional exposure subsystem 106 may use hardware atomic instructions to perform the cumulative exposure update, ensuring that the read-modify-write sequence executes as a single indivisible operation.

The constraint enforcement subsystem 108 may be configured to automatically revoke operational capability through hardware-enforced paths such that bypass of the revocation requires simultaneous physical compromise of all hardware-enforced paths and cannot be achieved by software executing at any privilege level. The automatic revocation may be triggered in response to the trust metric 114 falling below a threshold or cumulative exposure reaching the total exposure bound. The constraint enforcement subsystem 108 may implement automatic revocation through multiple independent hardware-enforced paths as described above, with each path configured to independently prevent command execution.

The automatic revocation through hardware-enforced paths may be irreversible within an operational epoch such that once revocation is triggered, operational capability cannot be restored without completing a recovery procedure that requires physical access and multi-party authorization, as described above.

In some embodiments, the hardware-enforced trust system 100 may further comprise a boundary monitor configured to interface between the hardware-enforced trust system 100 and an external system not subject to the total exposure bound. The boundary monitor may provide a controlled interface point through which the hardware-enforced trust system 100 interacts with external systems that operate outside the hardware-enforced trust architecture and therefore do not provide the same exposure guarantees. External systems may include, for example, legacy systems that lack hardware trust anchors 110, third-party services that operate under different security policies, and/or systems in different administrative domains that have not been certified under the compositional exposure framework. The boundary monitor may enable the hardware-enforced trust system 100 to interact with such external systems while maintaining quantifiable guarantees about the impact of external system behavior on the hardware-enforced trust system 100.

The boundary monitor may validate inputs from the external system against a set of assumptions. The set of assumptions may specify expected properties of inputs that the external system provides to the hardware-enforced trust system 100. The assumptions may include, for example, bounds on input values, constraints on input timing, format requirements for input data, and/or rate limits on input frequency. The boundary monitor may evaluate each input received from the external system against the set of assumptions to determine whether the input satisfies all assumptions or violates one or more assumptions. When an input satisfies all assumptions, the boundary monitor may permit the input to pass to the hardware-enforced trust system 100 for processing. When an input violates one or more assumptions, the boundary monitor may record the assumption violation and may take appropriate action based on the nature and severity of the violation.

The set of assumptions against which the boundary monitor validates inputs may be specified in a configuration that defines the expected behavior of the external system. In some embodiments, the set of assumptions may include value range assumptions specifying that input values fall within specified ranges. In some embodiments, the set of assumptions may include timing assumptions specifying that inputs arrive within specified time windows or at rates not exceeding specified limits. In some embodiments, the set of assumptions may include format assumptions specifying that inputs conform to specified data formats or schemas. In some embodiments, the set of assumptions may include consistency assumptions specifying that inputs maintain specified relationships with previous inputs or with other concurrent inputs. The boundary monitor may evaluate inputs against each assumption in the set of assumptions and may track which assumptions are satisfied and which assumptions are violated for each input.

Violation of assumptions by the external system may cause guaranteed degradation of the hardware-enforced trust system 100 that is bounded by a linear function of the number of assumption violations. The linear bounding of guarantee degradation may ensure that the impact of external system misbehavior on the hardware-enforced trust system 100 is predictable and proportional to the extent of the misbehavior. When the external system violates k assumptions, the degradation of guarantees provided by the hardware-enforced trust system 100 may be bounded by a linear function of k. The linear function may have the form$D(k)=c\times k$, where$D(k)$ represents the guarantee degradation resulting from k assumption violations and c represents a constant degradation coefficient that quantifies the impact of each individual assumption violation. The linear bounding may ensure that guarantee degradation grows at most proportionally with the number of assumption violations, preventing a small number of assumption violations from causing disproportionately large guarantee degradation.

The linear bounding of guarantee degradation may provide quantifiable assurance about the worst-case impact of external system behavior on the hardware-enforced trust system 100. Because the guarantee degradation is bounded by a linear function of the number of assumption violations, the hardware-enforced trust system 100 may compute an upper bound on guarantee degradation based on the observed number of assumption violations. This upper bound may enable the hardware-enforced trust system 100 to maintain quantifiable guarantees even when interacting with external systems that occasionally violate assumptions. The linear bounding may also enable the hardware-enforced trust system 100 to implement graduated responses to assumption violations, with the severity of the response proportional to the number of violations observed.

Zero assumption violations by the external system may result in zero guarantee degradation. When the external system provides inputs that satisfy all assumptions in the set of assumptions, the boundary monitor may permit the inputs to pass to the hardware-enforced trust system 100 without any reduction in the guarantees provided by the hardware-enforced trust system 100. The zero-degradation property for zero violations may ensure that well-behaved external systems do not impose any penalty on the guarantees of the hardware-enforced trust system 100. The zero-degradation property may also provide an incentive for external systems to comply with the specified assumptions, since compliance results in full preservation of the guarantees provided by the hardware-enforced trust system 100.

The boundary monitor may track assumption violations over time and may compute cumulative guarantee degradation based on the total number of assumption violations observed. In some embodiments, the boundary monitor may maintain a violation counter that increments each time an assumption violation is detected. The boundary monitor may compute the current guarantee degradation as a linear function of the violation counter value. In some embodiments, the boundary monitor may implement a sliding window approach wherein only assumption violations within a recent time window contribute to the guarantee degradation computation. The sliding window approach may enable the hardware-enforced trust system 100 to recover from transient assumption violations by the external system while maintaining sensitivity to sustained patterns of assumption violations.

The boundary monitor may implement various responses to assumption violations depending on the nature and severity of the violations. In some embodiments, the boundary monitor may reject inputs that violate assumptions, preventing the violating inputs from affecting the hardware-enforced trust system 100. In some embodiments, the boundary monitor may accept inputs that violate assumptions while recording the violations and adjusting the guarantee degradation accordingly. In some embodiments, the boundary monitor may transform inputs that violate assumptions into compliant inputs by clamping values to specified ranges, adjusting timing, and/or reformatting data. The choice of response may depend on the specific assumption violated, the operational requirements of the hardware-enforced trust system 100, and/or the criticality of maintaining interaction with the external system.

The boundary monitor may provide audit logging of assumption violations to enable post-hoc analysis of external system behavior. The audit log may record, for each assumption violation, the identity of the external system, the specific assumption violated, the input that caused the violation, and/or the timestamp of the violation. The audit log may enable operators of the hardware-enforced trust system 100 to identify patterns of assumption violations, diagnose issues with external system behavior, and/or make informed decisions about whether to continue interacting with external systems that exhibit patterns of assumption violations. In some embodiments, the audit log may be stored in tamper-resistant storage such as the hardware-protected storage 112 to prevent modification or deletion of violation records.

In some embodiments of the hardware-enforced trust system 100, the total exposure bound may be an absolute, non-amortizable ceiling on cumulative exposure that cannot be bypassed, deferred, probabilistically relaxed, and/or overridden by software or firmware executing at any privilege level. The absolute nature of the total exposure bound may ensure that cumulative exposure cannot exceed the bound under any circumstances, regardless of operational context, system state, and/or adversarial action. The non-amortizable property may ensure that the total exposure bound cannot be spread over time, borrowed against future allocations, and/or otherwise deferred to enable temporary exceedance of the bound. Unlike rate limits that permit bursting or probabilistic bounds that permit occasional exceedance, the absolute, non-amortizable ceiling may represent a hard limit that cumulative exposure cannot exceed at any point in time.

The total exposure bound may not be bypassed by software or firmware executing at any privilege level, including software with root access, kernel access, and/or hypervisor access. The hardware enforcement of the total exposure bound may ensure that the bound is implemented through hardware mechanisms that execute independently of software control. Software or firmware may not modify the total exposure bound, may not modify the cumulative exposure counter, may not disable the comparison between cumulative exposure and the total exposure bound, and may not prevent the consequences of cumulative exposure reaching the total exposure bound. The hardware enforcement may ensure that even an adversary with complete control over all software and firmware executing on the system cannot cause cumulative exposure to exceed the total exposure bound.

The total exposure bound may not be deferred such that cumulative exposure temporarily exceeds the bound with a promise to reduce exposure later. Deferral mechanisms that permit temporary exceedance of bounds may create windows of vulnerability during which unbounded exposure may occur. The non-deferrable property of the total exposure bound may ensure that no such windows exist. When cumulative exposure reaches the total exposure bound, further exposure-generating actions may be blocked immediately, without any mechanism for deferring the enforcement to a later time. The immediate enforcement may ensure that cumulative exposure remains at or below the total exposure bound at all times.

The total exposure bound may not be probabilistically relaxed such that exceedance is permitted with some probability. Probabilistic bounds that permit occasional exceedance may be unsuitable for applications where any exceedance may cause unacceptable harm. The non-probabilistic property of the total exposure bound may ensure that the bound is enforced deterministically, with zero probability of exceedance. The deterministic enforcement may provide certainty that cumulative exposure will not exceed the total exposure bound, enabling applications that require absolute guarantees rather than probabilistic assurances.

The compositional exposure subsystem 106 may be configured to enforce the total exposure bound during network partitions of arbitrary duration. Network partitions may occur when communication links between the hardware-enforced trust system 100 and external systems are disrupted, whether due to infrastructure failure, adversarial jamming, and/or operation in remote environments. During a network partition, the hardware-enforced trust system 100 may be unable to communicate with external validation services, consensus networks, and/or oversight systems. The compositional exposure subsystem 106 may continue to enforce the total exposure bound during network partitions using local hardware enforcement mechanisms that do not depend on network connectivity. The enforcement may persist regardless of how long the network partition lasts, whether minutes, hours, days, and/or longer. The partition-duration independence may ensure that the total exposure bound remains effective even in contested environments where adversaries may deliberately disrupt communications for extended periods.

The compositional exposure subsystem 106 may enforce the total exposure bound during network partitions of arbitrary duration, delayed synchronization, and partial system compromise using the partition-duration independence mechanisms described above. The hardware-protected storage 112 maintains exposure bounds and cumulative exposure counters independently of network availability, and the hardware logic performs exposure comparisons without requiring network communication, external validation services, or synchronization with external systems.

The constraint enforcement subsystem 108 may trigger irreversible revocation of operational capability in response to cumulative exposure reaching the total exposure bound. The revocation may be implemented through the multiple independent hardware-enforced paths described above, ensuring that an adversary who causes cumulative exposure to reach the total exposure bound cannot subsequently restore operational capability through software action. Restoration of operational capability after revocation may require a recovery procedure involving physical access and multi-party authorization.

The irreversible revocation may be implemented through multiple independent hardware-enforced paths that each independently terminate operational capability. The multiple paths may provide defense-in-depth such that revocation occurs even if some paths are compromised and/or disabled. Each path may implement revocation through hardware mechanisms that execute independently of software control, ensuring that software cannot prevent and/or delay the revocation. The irreversibility may be enforced by hardware state transitions that cannot be reversed by software, such as extending Platform Configuration Registers with revocation events, revoking cryptographic keys stored in hardware security modules, and/or terminating hardware-isolated execution environments.

The total exposure bound may remain invariant under adversarial conditions including network partition duration, delayed synchronization, and/or partial system compromise. The invariance properties may ensure that an adversary cannot gain additional exposure allowance by disrupting network communications, delaying synchronization between system components, or compromising software components. The total exposure bound may remain at the value established during system configuration regardless of these adversarial conditions, as the hardware enforcement mechanisms described above operate independently of network availability, synchronization state, and software integrity. The invariance under partial system compromise may be enforced by storing the total exposure bound in hardware-protected storage 112 that cannot be modified by compromised software, ensuring that the bound remains effective even when software components including operating system kernels, hypervisors, and/or firmware are compromised.

In some embodiments of the hardware-enforced trust system 100, the compositional exposure subsystem 106 may be further configured to select the total exposure bound from a finite, hardware-stored set of ceilings based on a hardware-attested uncertainty metric derived from execution or environmental state. The finite set of ceilings may be stored in hardware-protected storage 112 during system configuration, with each ceiling representing a different exposure bound appropriate for different levels of operational uncertainty. The hardware-attested uncertainty metric may quantify the degree of uncertainty about the current operating environment, execution state, and/or system conditions. By selecting the total exposure bound from the finite set of ceilings based on the uncertainty metric, the compositional exposure subsystem 106 may adapt the exposure bound to current conditions while maintaining hardware enforcement of whichever ceiling is selected.

The finite, hardware-stored set of ceilings may comprise a plurality of discrete ceiling values arranged in decreasing order corresponding to increasing uncertainty levels. In some embodiments, the set of ceilings may include a first ceiling value for low uncertainty conditions, a second ceiling value for moderate uncertainty conditions, a third ceiling value for elevated uncertainty conditions, and/or additional ceiling values for higher uncertainty levels. Each ceiling value in the set may be stored in hardware-protected storage 112 that cannot be modified by software executing at any privilege level. The hardware storage of the ceiling set may ensure that an adversary cannot add new ceiling values, modify existing ceiling values, and/or remove ceiling values from the set. The finite nature of the ceiling set may ensure that the compositional exposure subsystem 106 selects from a predetermined set of values rather than computing arbitrary ceiling values at runtime.

The hardware-attested uncertainty metric may be derived from execution state reflecting the current operational characteristics of the system. Execution state characteristics that may contribute to the uncertainty metric may include, for example, prediction interval widths from model outputs, conformity scores measuring deviation from calibration data, execution path divergence from baseline patterns, and/or resource utilization patterns that deviate from expected ranges. The uncertainty metric may be computed within a hardware-enforced isolation boundary such that the computation cannot be observed or modified by software executing outside the isolation boundary. The hardware attestation of the uncertainty metric may ensure that the metric reflects actual system state rather than values that could be manipulated by software to influence ceiling selection.

The hardware-attested uncertainty metric may be derived from environmental state reflecting conditions external to the system that affect operational reliability. Environmental state characteristics that may contribute to the uncertainty metric may include, for example, sensor noise levels, communication link quality, temperature variations, power supply stability, and/or other environmental factors that may affect system behavior. The uncertainty metric may combine information from multiple environmental sensors to produce a composite measure of environmental uncertainty. The hardware attestation of environmental state may ensure that the uncertainty metric reflects actual environmental conditions rather than spoofed values.

The selected total exposure bound may monotonically decrease as the uncertainty metric increases. The monotonic relationship between uncertainty and the selected ceiling may ensure that higher uncertainty produces lower ceilings, constraining the system to lower-exposure actions when operating under uncertain conditions. When the uncertainty metric is low, indicating high confidence in the operating environment and system state, the compositional exposure subsystem 106 may select a higher ceiling from the finite set, permitting a wider range of actions. When the uncertainty metric is high, indicating reduced confidence in the operating environment and/or system state, the compositional exposure subsystem 106 may select a lower ceiling from the finite set, constraining the system to lower-exposure actions. The monotonic decrease may ensure that the ceiling never increases as uncertainty increases, preventing the system from gaining additional exposure allowance under conditions of reduced confidence.

The selection of the total exposure bound from the finite set of ceilings may occur at each control cycle, enabling the compositional exposure subsystem 106 to adapt the ceiling continuously as the uncertainty metric changes. The ceiling selection may be implemented as a lookup operation that maps the current uncertainty metric value to the corresponding ceiling from the finite set. In some embodiments, the lookup may use threshold-based selection wherein the uncertainty metric is compared against a sequence of thresholds, with each threshold corresponding to a transition between adjacent ceiling values in the finite set. The threshold-based selection may ensure that the ceiling changes discretely as the uncertainty metric crosses threshold boundaries, providing predictable ceiling behavior.

Each selected total exposure bound may remain an absolute, non-amortizable bound under network partition, delayed synchronization, and/or partial system compromise. Regardless of which ceiling is selected from the finite set based on the uncertainty metric, the selected ceiling may exhibit the same absolute, non-amortizable properties described above for the total exposure bound. The selected ceiling may not be bypassed, deferred, probabilistically relaxed, and/or overridden by software or firmware executing at any privilege level. The selected ceiling may be enforced during network partitions of arbitrary duration, during delayed synchronization, and/or during partial system compromise. The absolute, non-amortizable nature of each ceiling in the finite set may ensure that uncertainty-adaptive ceiling selection does not weaken the hardware enforcement guarantees, but rather provides adaptive constraint within the framework of absolute bounds.

The compositional exposure subsystem 106 may implement probabilistic bounds using conformal prediction with offline calibration and online uncertainty quantification. Conformal prediction may provide a framework for uncertainty quantification that produces prediction intervals with formal coverage guarantees. The coverage guarantee may state that if prediction intervals are constructed using an appropriate quantile of conformity scores from calibration data, then future observations will fall within their prediction intervals with a specified probability, regardless of the underlying data distribution. The conformal prediction framework may require only an exchangeability assumption—that calibration and test data come from the same process-which may be weaker than the independence assumptions required by other statistical methods.

The offline calibration phase for conformal prediction may require 1-4 hours depending on the size of the calibration dataset. During offline calibration, the compositional exposure subsystem 106 may collect calibration data with ground truth outcomes, compute conformity scores measuring prediction errors for each calibration sample, calculate a quantile of the conformity scores corresponding to a desired coverage level, and/or validate that achieved coverage meets specifications on a held-out test set. The output of the offline calibration phase may be a calibration file containing the quantile threshold that will be used for online uncertainty quantification. The offline calibration may be performed once per model update and/or periodically to account for distributional shift.

The online uncertainty quantification phase may require less than 10 milliseconds per evaluation. During online operation, the compositional exposure subsystem 106 may compute a prediction for the current state, determine a prediction interval width using the calibrated quantile from the offline calibration phase, and/or derive an uncertainty score normalized to a bounded range. The uncertainty score may map directly to the ceiling selection through the monotonic relationship described above, with higher uncertainty scores producing selection of lower ceilings from the finite set. The online uncertainty quantification may be performed at each control cycle, enabling continuous adaptation of the ceiling to current uncertainty levels. The sub-10-millisecond latency of online uncertainty quantification may enable real-time operation at control frequencies of 10 Hz and/or higher.

The hardware-enforced trust system 100 may implement coverage monitoring that tracks whether actual outcomes fall within predicted intervals. Coverage monitoring may enable the system to detect distributional shift-situations where the current operating environment differs from the calibration data in ways that degrade the accuracy of uncertainty quantification. The coverage monitoring may track, over a rolling window of recent predictions, the fraction of actual outcomes that fall within their corresponding prediction intervals. The observed coverage may be compared against a target coverage level specified during system configuration.

The coverage monitoring may trigger a recalibration alarm when observed coverage drops below the target level. When the observed coverage over the rolling window falls below the target coverage level, the coverage monitoring may indicate that the calibration data no longer accurately represents the current operating environment, and that the uncertainty quantification may be producing prediction intervals that are too narrow. The recalibration alarm may trigger various responses depending on system configuration. In some embodiments, the recalibration alarm may cause the compositional exposure subsystem 106 to select a lower ceiling from the finite set as a conservative measure until offline recalibration can occur. In some embodiments, the recalibration alarm may notify operators that recalibration is needed. In some embodiments, the recalibration alarm may initiate an automated recalibration procedure if sufficient recent data with ground truth outcomes is available.

The combination of offline calibration with online uncertainty quantification and coverage monitoring may provide a hybrid approach that maintains formal coverage guarantees while enabling detection of and adaptation to distributional shift. The offline calibration may establish the quantile threshold that provides formal coverage guarantees under the exchangeability assumption. The online uncertainty quantification may apply the calibrated quantile to produce prediction intervals and uncertainty scores in real-time. The coverage monitoring may detect when the exchangeability assumption is violated due to distributional shift, enabling appropriate response through recalibration alarms and/or conservative ceiling selection. The hybrid approach may enable the compositional exposure subsystem 106 to maintain uncertainty-adaptive exposure bounds that respond appropriately to both in-distribution uncertainty and out-of-distribution conditions.

In some embodiments of the hardware-enforced trust system 100, the compositional exposure subsystem 106 may be further configured to compute the total exposure bound as a system-level exposure bound across a plurality of agents, wherein each agent is a component of the plurality of components. When multiple autonomous agents operate in a shared environment, individual exposure bounds for each agent may not compose additively because the agents may interact in ways that affect their combined exposure. For example, two agents may collide, combining their kinetic energies, or one agent's actions may force another agent into states where avoiding exposure violations becomes difficult.

The compositional exposure subsystem 106 may compute the system-level exposure bound by subtracting hardware-attested interaction exposure terms from the sum of respective component exposure bounds of the plurality of agents. The system-level exposure bound may be expressed as $E_{system} \leq \Sigma C_i - \Sigma I_{ij}$, where $C_i$ represents the component exposure bound for agent i, and $I_{ij}$ represents the interaction exposure term between agents i and j. The interaction exposure term $I_{ij}$ between two agents may quantify the potential for harmful interaction between those agents based on their current states and trajectories. When two agents are far apart with no possibility of collision or other harmful interaction, the interaction exposure term $I_{ij}$ may be zero or near zero, and the component exposure bounds of the two agents may simply add. When two agents are on a collision course at high speed, the interaction exposure term $I_{ij}$ may be large, reflecting the potential for the agents' exposures to combine in a harmful manner. The compositional exposure subsystem 106 may implement multi-agent interaction estimation using physics-based analytical formulas. The physics-based approach may enable real-time computation of interaction exposure terms without requiring offline training or learned models. The physics-based analytical formulas may compute, for each pair of agents: a time to closest approach representing the time at which two agents will be closest if they continue on their current trajectories; a distance at closest approach representing the minimum distance between two agents on their current trajectories; and a collision risk that decays exponentially with the distance at closest approach. In some embodiments, the collision risk may be computed as exp (−d/λ), where d represents the distance at closest approach and 2 represents a characteristic length scale. The interaction exposure term $I_{ij}$ may be computed as a function of the collision risk and the combined exposure potential of the two agents.

The physics-based interaction estimation may require no offline training phase because the estimation uses analytical formulas rather than learned models. The compositional exposure subsystem 106 may compute interaction exposure terms for all pairs of agents in the plurality of agents, with the total interaction exposure $\Sigma L_{ij}$ computed as the sum across all pairs. The interaction exposure terms may be hardware-attested to ensure that the interaction estimation cannot be manipulated by software to artificially reduce the computed interaction exposure. The compositional exposure subsystem 106 may enforce the system-level exposure bound via the constraint enforcement subsystem 108, blocking commands that would cause cumulative system exposure to exceed the bound. The system-level exposure bound may be recomputed at each control cycle as agent states change, with recomputation latency of approximately 100 milliseconds for systems with tens of agents.

In some embodiments of the hardware-enforced trust system 100, the system 100 may provide a durable trust guarantee for a distributed or autonomous system operating under adversarial conditions such that cumulative adversarial influence, damage potential, or operational deviation remains bounded independent of network partition duration, delayed synchronization, or partial system compromise. The durable trust guarantee may address scenarios where autonomous systems operate in contested environments facing adversaries with varying capabilities, from script-level attackers to nation-state actors with physical access to hardware.

The durable trust guarantee may bound cumulative adversarial influence such that the total effect of adversarial actions on the system 100 does not exceed a predetermined limit, enforced through hardware mechanisms that track adversarial events and constrain system operation. The durable trust guarantee may bound damage potential such that the maximum harm the system 100 may cause remains within a predetermined limit, enforced through hardware mechanisms that constrain actions and resources. The durable trust guarantee may bound operational deviation such that the degree to which system behavior deviates from intended operation remains within a predetermined limit, enforced through hardware mechanisms that monitor behavior and constrain operation when deviation approaches the limit.

The bounds on cumulative adversarial influence, damage potential, and operational deviation may remain invariant independent of network partition duration, delayed synchronization, and partial system compromise, using the hardware enforcement mechanisms described above that operate independently of network availability, synchronization state, and software integrity.

The bounds on cumulative adversarial influence, damage potential, and operational deviation may remain invariant independent of network partition duration. When the system 100 loses network connectivity, whether due to infrastructure failure, adversarial jamming, or operation in remote environments, the bounds may continue to be enforced through local hardware mechanisms that do not depend on network availability. The invariance under network partition duration may ensure that an adversary cannot gain additional influence, damage potential, or operational deviation allowance by prolonging a network partition. The bounds may remain at the values established during system configuration regardless of whether a network partition lasts seconds, hours, days, or longer.

The bounds on cumulative adversarial influence, damage potential, and operational deviation may remain invariant independent of delayed synchronization. When synchronization between distributed system components is delayed due to communication latency, clock drift, or asynchronous updates, the bounds may continue to be enforced based on locally maintained state. The invariance under delayed synchronization may ensure that an adversary cannot exploit synchronization delays to gain additional influence, damage potential, or operational deviation allowance. The bounds may remain effective even when synchronization is delayed indefinitely.

The bounds on cumulative adversarial influence, damage potential, and operational deviation may remain invariant independent of partial system compromise. When an adversary gains control over some components of the system 100 while other components remain uncompromised, the bounds may continue to be enforced through hardware mechanisms that remain effective even when software components are compromised. The invariance under partial system compromise may ensure that compromise of software components, including operating system kernels, hypervisors, or firmware, does not enable circumvention of the bounds. The bounds may remain effective as long as the hardware mechanisms implementing the bounds remain uncompromised.

The hardware-rooted trust isolation subsystem 102 may provide hardware-isolated measurement of physical, execution, or environmental observables used to derive enforcement state, using the hardware trust anchor technologies and isolation mechanisms described above. The enforcement state derived from the hardware-isolated measurements may include the trust metric 114, exposure values, uncertainty metrics, and other values that determine how the system 100 enforces behavioral bounds.

The compositional exposure subsystem 106 may enforce hardware-enforced state transitions that impose an absolute, non-amortizable ceiling on cumulative exposure, using the hardware-protected storage 112 and enforcement mechanisms described above. The constraint enforcement subsystem 108 may provide irreversible, hardware-triggered revocation of operational capability upon reaching the ceiling, using the multiple independent hardware-enforced paths described above.

The compositional exposure subsystem 106 may enforce hardware-enforced state transitions that impose an absolute, non-amortizable ceiling on cumulative exposure. The hardware-enforced state transitions may ensure that the system state evolves according to rules that are implemented in hardware and cannot be modified or bypassed by software. The state transitions may include incrementing cumulative exposure counters when actions are executed, comparing cumulative exposure against the ceiling, and transitioning to revoked states when cumulative exposure reaches the ceiling. Each state transition may be enforced by hardware mechanisms that execute independently of software control.

The absolute, non-amortizable ceiling on cumulative exposure may represent a hard limit that cumulative exposure cannot exceed under any circumstances. The absolute nature of the ceiling may ensure that cumulative exposure cannot exceed the ceiling regardless of operational context, system state, or adversarial action. The non-amortizable property may ensure that the ceiling cannot be spread over time, borrowed against future allocations, or otherwise deferred to enable temporary exceedance. Unlike rate limits that permit bursting or probabilistic bounds that permit occasional exceedance, the absolute, non-amortizable ceiling may represent a deterministic bound that is enforced at all times.

The hardware-enforced state transitions may ensure that the ceiling is enforced through hardware mechanisms that cannot be bypassed by software executing at any privilege level. Software may not modify the ceiling value, may not modify the cumulative exposure counter, may not disable the comparison between cumulative exposure and the ceiling, and may not prevent the state transition to a revoked state when cumulative exposure reaches the ceiling. The hardware enforcement may ensure that even an adversary with complete control over all software executing on the system 100 cannot cause cumulative exposure to exceed the ceiling.

The constraint enforcement subsystem 108 may provide irreversible, hardware-triggered revocation of operational capability upon reaching the ceiling. When cumulative exposure reaches the ceiling, the constraint enforcement subsystem 108 may initiate revocation through hardware-enforced paths that terminate the operational capability of the system or agent. The revocation may be hardware-triggered such that the revocation is initiated by hardware mechanisms that detect when cumulative exposure reaches the ceiling, without requiring software to initiate or authorize the revocation. The hardware triggering may ensure that revocation occurs even if software components are compromised or unresponsive.

The revocation may be irreversible within an operational epoch such that once revocation is triggered, operational capability cannot be restored through software action. The irreversibility may ensure that an adversary who causes cumulative exposure to reach the ceiling cannot subsequently restore operational capability to continue generating exposure. The irreversibility may be enforced by hardware state transitions that cannot be reversed by software, such as extending Platform Configuration Registers with revocation events that permanently alter the PCR values, revoking cryptographic keys stored in hardware security modules such that the keys cannot be recovered, or terminating hardware-isolated execution environments such that the execution context is destroyed.

Restoration of operational capability after irreversible revocation may require a recovery procedure that involves physical access and multi-party authorization. The recovery procedure may require physical presence of multiple authorized principals, each providing cryptographic authorization through hardware security tokens such as USB keys or smart cards. The multi-party authorization requirement may ensure that restoration of operational capability requires coordination among multiple trusted parties and cannot be accomplished by a single compromised party. The physical access requirement may ensure that restoration cannot be accomplished remotely through software alone. The recovery procedure may provide a controlled mechanism for restoring operational capability after revocation while maintaining the security properties of the durable trust guarantee.

The combination of hardware-isolated measurement, hardware-enforced state transitions imposing an absolute ceiling, and irreversible hardware-triggered revocation may provide the foundation for the durable trust guarantee. The hardware-isolated measurement may ensure that enforcement decisions are based on reliable information about system state that cannot be manipulated by software. The hardware-enforced state transitions may ensure that cumulative exposure is tracked accurately and that the ceiling is enforced through hardware mechanisms. The irreversible hardware-triggered revocation may ensure that when cumulative exposure reaches the ceiling, operational capability is terminated in a manner that cannot be prevented or reversed by software. Together, these mechanisms may ensure that cumulative adversarial influence, damage potential, or operational deviation remains bounded regardless of network partition duration, delayed synchronization, or partial system compromise.

In some embodiments of the hardware-enforced trust system 100, exposure may correspond to a cumulative count of hardware-detected state transitions that increase deviation from a baseline operational invariant. The baseline operational invariant may represent expected or authorized system behavior against which actual system behavior is compared. State transitions that increase deviation from the baseline operational invariant may represent events where the system moves further from expected behavior, and the cumulative count of such state transitions may provide a measure of total deviation accumulated over time. The hardware detection of state transitions may ensure that the exposure measurement cannot be manipulated by software to undercount deviations or to reset the cumulative count.

The hardware-enforced trust system 100 may detect and count various types of state transitions that increase deviation from a baseline operational invariant. Execution path divergence may occur when the sequence of instructions executed by the system deviates from expected execution paths established during system characterization, and may be detected using hardware mechanisms such as branch trace buffers or control flow integrity monitors. Privilege escalation attempts may occur when a process or component attempts to acquire privileges beyond those authorized, and may be detected using hardware mechanisms such as privilege rings or capability registers. Unauthorized command invocation may occur when a command is issued that is not authorized by governance rules or exceeds the authority of the issuing entity, and may be detected using hardware-enforced command filters or authorization checks. Model parameter drift may occur when parameters of a machine learning model change from baseline values established during deployment, and may be detected using secure hash comparisons or parameter range monitors. Actuator output deviation may occur when physical actuators produce outputs that deviate beyond tolerance thresholds from commanded or expected values, and may be detected using sensor feedback circuits or hardware-enforced output limiters. For each type of state transition, the hardware mechanisms may increment the cumulative exposure count when a deviation is detected.

The cumulative count of hardware-detected state transitions may provide a unified exposure metric that aggregates deviations across multiple categories. The cumulative count may increment each time any of the monitored state transitions occurs, providing a single measure of total deviation from the baseline operational invariant. The unified exposure metric may enable the compositional exposure subsystem 106 to enforce a total exposure bound that limits the aggregate deviation across all categories of state transitions. The hardware detection of state transitions across multiple categories may provide comprehensive coverage of deviation sources while maintaining a simple cumulative count that may be compared against the total exposure bound.

In some embodiments, the hardware-enforced trust system 100 may be configured for space systems applications. The space systems configuration may integrate with spacecraft control systems, satellite platforms, and constellation management systems to enforce exposure bounds on space operations. Exposure bounds for space systems may include orbital constraints limiting altitude, inclination, and eccentricity changes; propulsion limits constraining delta-v expenditure; proximity constraints preventing approach to other spacecraft or debris beyond safe distances; and attitude control bounds limiting rotation rates and pointing deviations.

The space systems configuration may implement occultation-independent operation that maintains bounded exposure guarantees during communication blackouts such as planetary occultation, solar conjunction, or passage through communication dead zones. The partition-duration independence described above may enable autonomous spacecraft operation during extended periods of communication unavailability. The satellite constellation certification may enable independent certification of individual satellites with system-level exposure bounds computed from satellite bounds, supporting deployment of large constellations where integrated testing of all satellites is impractical.

The hardware-enforced trust system 100 may implement exposure measurement as cumulative resource consumption for physical systems. In physical system deployments, exposure may represent the total resource consumption or actuation magnitude accumulated over time. For power grid applications, exposure may be measured as megawatt-hours of load changes per time period. For autonomous vehicle applications, exposure may be measured as distance traveled outside designated zones or as cumulative deviation from planned trajectories. For manufacturing robot applications, exposure may be measured as cumulative force applied to workpieces or as cumulative deviation from programmed motion paths. The hardware-enforced trust system 100 may track cumulative resource consumption using hardware-protected counters that integrate sensor readings over time and that cannot be artificially reduced by software manipulation. The exposure measurement as cumulative resource consumption may enable the hardware-enforced trust system 100 to enforce exposure bounds that limit the total physical impact that an autonomous system may have on its environment.

In some embodiments, the hardware-enforced trust system 100 may be configured for healthcare applications. The healthcare configuration may integrate with medical devices, medication delivery systems, and surgical robots to enforce exposure bounds on medical interventions. Exposure bounds for healthcare systems may include dosage bounds for medication delivery that limit the maximum dosage that may be administered within a time period, surgical constraints for robotic surgery systems that limit the force, speed, and range of motion of surgical instruments, and radiation exposure limits for imaging and treatment systems.

The healthcare configuration may provide a pathway for FDA regulatory approval through compositional certification. The formal certification framework may support regulatory approval by providing mathematical proof of bounded exposure that complements empirical testing requirements. The modular certification may enable certification of medical device components independently, with system-level safety bounds computed from component bounds, reducing the certification burden when components are updated or when certified components from multiple vendors are integrated into medical systems.

The hardware-enforced trust system 100 may implement exposure measurement as API calls and tokens for compute resources. In compute system deployments, exposure may represent the total computational resources consumed, measured as API calls, tokens generated, or compute cycles consumed. For AI agent applications, exposure may be measured as the cumulative number of API calls made to external services or as the cumulative number of tokens generated by language models. The hardware-enforced trust system 100 may track cumulative API calls and tokens using hardware-protected counters that increment on each API call or token generation and that cannot be artificially reduced by software manipulation. The exposure measurement as API calls and tokens may enable the hardware-enforced trust system 100 to enforce exposure bounds that limit the total computational resources that an AI agent may consume within an operational epoch.

In all deployment contexts, the exposure measurement may be implemented as a monotonically increasing counter within an operational epoch. The monotonically increasing property may ensure that cumulative exposure cannot be artificially reduced by software manipulation, providing a hardware-enforced floor on cumulative exposure. The counter may be reset only through explicit ceremonies requiring multi-party authorization and physical access, ensuring that exposure accumulation is irreversible during normal operation. The monotonically increasing counter may be stored in hardware-protected storage 112 that cannot be read, modified, reset, or bypassed by software executing at any privilege level.

In some embodiments of the hardware-enforced trust system 100, the total exposure bound may remain invariant under network partition of arbitrary duration, as described above. The hardware-enforced trust system 100 may provide bounded exposure guarantees for a single autonomous node operating without network connectivity through hardware enforcement mechanisms that are self-contained within the node and do not depend on external systems for enforcement.

The bounded exposure guarantees for a single autonomous node may address deployment scenarios where network connectivity is unavailable for extended periods. In some embodiments, an autonomous underwater vehicle may operate during extended submersion periods without communication capability while maintaining bounded exposure guarantees. In some embodiments, an autonomous spacecraft may operate during communication blackout periods, such as during planetary occultation, while maintaining bounded exposure guarantees. In some embodiments, an autonomous vehicle may operate in remote areas without cellular or satellite connectivity while maintaining bounded exposure guarantees. In some embodiments, an autonomous system may operate in contested environments where adversaries deliberately deny network connectivity through jamming or other electronic warfare techniques while maintaining bounded exposure guarantees. In each of these scenarios, the hardware enforcement mechanisms may ensure that the total exposure bound remains invariant and that cumulative exposure cannot exceed the bound, regardless of the duration of network unavailability.

The bounded exposure guarantees for a single autonomous node may include guarantees about the maximum exposure that may accumulate during a network partition. Because the total exposure bound remains invariant during network partitions, the maximum exposure that may accumulate during any network partition is bounded by the total exposure bound minus the cumulative exposure at the start of the partition. The hardware trust anchor 110 may generate attestation records during network partitions that cryptographically prove the state of the exposure enforcement mechanisms, enabling post-hoc verification that the bounded exposure guarantees were maintained throughout the network partition.

In some embodiments of the hardware-enforced trust system 100, the compositional exposure subsystem 106 may be configured to enforce the total exposure bound for an AI system, wherein exposure is measured as a cumulative count of hardware-detected events rather than as a function of elapsed time. Traditional approaches to constraining AI system behavior may rely on rate limits that measure actions per unit time, timeouts that trigger after specified durations, or periodic attestation that occurs at fixed time intervals. These time-based approaches may depend on accurate and trustworthy time sources to function correctly. However, trusted time sources may be unavailable, unreliable, or subject to manipulation in various deployment scenarios. An adversary may attempt to manipulate time sources to circumvent time-based constraints, or time sources may drift or fail during extended operation. By measuring exposure as a cumulative count of hardware-detected events rather than as a function of elapsed time, the compositional exposure subsystem 106 may enforce the total exposure bound without depending on a trusted time source.

The cumulative count of hardware-detected events may provide an exposure metric that is independent of elapsed time. Each hardware-detected event may represent an action, state transition, or occurrence that contributes to the cumulative exposure of the AI system. The hardware detection of events may ensure that events are counted accurately and that the count cannot be manipulated by software to undercount events or to reset the cumulative count. The cumulative count may increment each time a hardware-detected event occurs, regardless of when the event occurs in absolute time or how much time has elapsed since the previous event. Because the cumulative count depends only on the number of events that have occurred and not on the timing of those events, the exposure measurement may be independent of any time source.

Hardware-detected events that may contribute to the cumulative exposure count for an AI system may include, for example, inference operations performed by the AI system, commands issued by the AI system, state transitions executed by the AI system, API calls made by the AI system, tokens generated by the AI system, and/or other discrete occurrences that represent AI system activity. Each type of hardware-detected event may be monitored by hardware mechanisms that detect when the event occurs and that increment the cumulative exposure count in response. The hardware mechanisms may include hardware counters, hardware monitors, hardware interceptors, and/or other hardware components that detect and count events without relying on software that could be manipulated to miscount events.

In some embodiments, the hardware-detected events may include inference operations performed by the AI system. Each time the AI system performs an inference operation-such as processing an input through a neural network to produce an output—the hardware mechanisms may detect the inference operation and increment the cumulative exposure count. The detection of inference operations may be implemented using hardware monitors that observe memory access patterns, computation patterns, and/or other characteristics that indicate an inference operation is occurring. The cumulative count of inference operations may provide an exposure metric that reflects the total computational activity of the AI system without depending on how much time has elapsed.

In some embodiments, the hardware-detected events may include commands issued by the AI system. Each time the AI system issues a command-such as a command to an actuator, a command to an external service, and/or a command to another system component—the hardware mechanisms may detect the command and increment the cumulative exposure count. The detection of commands may be implemented using hardware interceptors that monitor command channels and that count commands as they are issued. The cumulative count of commands may provide an exposure metric that reflects the total number of actions the AI system has attempted to take without depending on the timing of those actions.

In some embodiments, the hardware-detected events may include tokens generated by the AI system. For AI systems that generate text, code, and/or other sequential outputs, each token generated may represent a hardware-detected event that increments the cumulative exposure count. The detection of token generation may be implemented using hardware monitors that observe the output generation process and that count tokens as they are produced. The cumulative count of tokens may provide an exposure metric that reflects the total output volume of the AI system without depending on the rate at which tokens are generated.

The enforcement of the total exposure bound may not depend on a trusted time source. Because the exposure is measured as a cumulative count of hardware-detected events rather than as a function of elapsed time, the comparison between cumulative exposure and the total exposure bound may be performed without reference to any time value. The compositional exposure subsystem 106 may compare the cumulative event count against the total exposure bound, which may be expressed as a maximum number of events rather than as a rate or as a time-dependent function. When the cumulative event count reaches the total exposure bound, the constraint enforcement subsystem 108 may trigger automatic revocation through hardware-enforced paths, regardless of how much time has elapsed since the AI system began operation.

The independence from trusted time sources may provide several advantages for AI system deployment. In some embodiments, the AI system may operate in environments where accurate time sources are unavailable, such as in shielded facilities, underground installations, and/or remote locations without access to GPS or network time services. In some embodiments, the AI system may operate in adversarial environments where time sources may be subject to manipulation, such as through GPS spoofing, NTP attacks, and/or physical manipulation of local clocks. In some embodiments, the AI system may operate during extended periods where time sources may drift or fail, such as during long-duration autonomous missions. By enforcing the total exposure bound without depending on a trusted time source, the compositional exposure subsystem 106 may maintain bounded exposure guarantees in each of these scenarios.

The event-based exposure measurement may provide deterministic enforcement that is independent of timing variations. Time-based enforcement mechanisms may be affected by variations in processing speed, system load, and/or other factors that affect the relationship between elapsed time and system activity. An AI system operating on faster hardware may perform more actions per unit time than the same AI system operating on slower hardware, potentially leading to different effective exposure limits for the same time-based constraint. By measuring exposure as a cumulative count of events rather than as a function of elapsed time, the compositional exposure subsystem 106 may enforce the same exposure limit regardless of processing speed variations. The total exposure bound may represent a fixed number of events that the AI system may perform, providing consistent enforcement across different hardware configurations and operating conditions.

The event-based exposure measurement may also provide robustness against time manipulation attacks. An adversary who gains the ability to manipulate time sources-whether by spoofing external time signals, modifying local clock hardware, and/or exploiting software vulnerabilities in time synchronization—may attempt to circumvent time-based constraints by making time appear to pass more slowly or by resetting time to earlier values. Event-based exposure measurement may be immune to such attacks because the cumulative event count does not depend on any time value. Even if an adversary successfully manipulates all available time sources, the cumulative count of hardware-detected events may continue to accurately reflect the number of events that have occurred, and the total exposure bound may continue to be enforced based on that count.

In some embodiments, the compositional exposure subsystem 106 may implement event-based exposure measurement using hardware counters that are protected against software manipulation. The hardware counters may be implemented in dedicated hardware that is isolated from software control, such as counters within a trusted platform module, counters within a secure enclave, and/or counters within dedicated security hardware. The hardware counters may support increment operations but may not support decrement or reset operations through software interfaces, ensuring that the cumulative event count may only increase and cannot be artificially reduced. The hardware protection of the counters may ensure that the event-based exposure measurement remains accurate and tamper-resistant even if software components of the AI system are compromised.

In some embodiments, the compositional exposure subsystem 106 may implement event-based exposure measurement using hardware monitors that detect events through physical observation rather than software instrumentation. The hardware monitors may observe electrical signals, memory access patterns, computation patterns, and/or other physical phenomena that indicate when events occur. Because the hardware monitors detect events through physical observation, the event detection may be independent of software that could be manipulated to suppress event reporting. The hardware monitors may increment hardware-protected counters each time an event is detected, maintaining an accurate cumulative count that reflects actual AI system activity.

The total exposure bound for event-based enforcement may be configured during system initialization and may be stored in hardware-protected storage 112. The total exposure bound may specify the maximum number of hardware-detected events that the AI system may perform before automatic revocation is triggered. The total exposure bound may be sealed to specific hardware and software configurations, such that the bound may only be accessed when the system is in a known-good configuration. The hardware protection of the total exposure bound may ensure that the bound cannot be modified by software to permit additional events beyond the originally configured limit.

The enforcement of the total exposure bound based on event counts may occur at each event. When a hardware-detected event occurs, the compositional exposure subsystem 106 may increment the cumulative event count and may compare the updated count against the total exposure bound. If the updated count equals or exceeds the total exposure bound, the constraint enforcement subsystem 108 may trigger automatic revocation through hardware-enforced paths. The per-event enforcement may ensure that the total exposure bound is enforced precisely, with revocation occurring as soon as the bound is reached rather than at some later time when a periodic check occurs.

Referring to FIG. 2, the method 200 provides a method for certifying a composite system comprising a plurality of components. The method 200 establishes compositional guarantees for systems composed of multiple hardware-protected components through a sequence of verification and certification steps. The method 200 may be performed to certify that a composite system satisfies conditions that enable computation of a composite exposure bound from component specifications alone, without requiring integrated testing of the composed system. The certification established by the method 200 may provide assurance that the composite system maintains bounded exposure guarantees through the architectural integration of hardware-rooted trust, compositional exposure enforcement, trust-weighted consensus, and hardware-triggered automatic revocation.

The method 200 may be applied to certify composite systems that implement the hardware-enforced trust system 100 of FIG. 1. The composite system may comprise a plurality of components, where each component may be a subsystem, agent, module, or other unit that contributes to the overall system functionality. Each component of the plurality of components may be subject to verification steps that establish the component satisfies conditions for compositional certification. The verification steps may be performed for each component of the plurality of components before the method 200 proceeds to compute the composite exposure bound and certify the composite system.

With continued reference to FIG. 2, the method 200 comprises verification steps that are performed for each component of the plurality of components. The per-component verification steps may establish that each component provides hardware-rooted trust, produces trust metrics satisfying specified constraints, and implements hardware-enforced exposure functions with specified properties. By verifying these conditions for each component individually, the method 200 may enable modular certification wherein components may be certified independently and then composed into certified systems without requiring integrated testing of the composed system.

The per-component verification steps of the method 200 may include verifying that the component comprises a hardware-rooted trust anchor 110 (step 202), verifying that the hardware trust anchor 110 produces a trust metric 114 satisfying constraints (step 204), verifying that the component comprises a hardware-enforced exposure function (step 206), and determining an exposure bound for the component (step 208). These verification steps may be performed for each component of the plurality of components before the method 200 proceeds to compute the composite exposure bound. The per-component verification may establish that each component provides the hardware-enforced guarantees that enable compositional reasoning about the system-level exposure bound.

The method 200 may proceed through the per-component verification steps in sequence for each component, or the per-component verification steps may be performed in parallel for multiple components. In some embodiments, the per-component verification may be performed by different parties for different components, enabling distributed certification wherein component vendors certify their respective components and system integrators compose the certified components into certified systems. The modular nature of the per-component verification may reduce the certification burden for complex systems by enabling reuse of component certifications across multiple system configurations.

The method 200 includes verifying that each component of the plurality of components comprises a hardware-rooted trust anchor selected from the group consisting of: a hardware security module, a trusted platform module, a secure element, a hardware-based trusted execution environment, a hardware-isolated enclave, and a physically-unclonable function (step 202). The verification at step 202 may establish that each component provides a hardware foundation for trust that cannot be modified or bypassed by software executing at any privilege level, using the hardware security technologies described above.

The verification at step 202 may be performed using various verification techniques. Hardware attestation may provide cryptographic proof that the hardware trust anchor 110 is genuine and in a known-good configuration. Physical inspection may confirm that the hardware trust anchor 110 is properly integrated into the component. Documentation review may confirm that the hardware trust anchor 110 has appropriate security certifications, such as Common Criteria EAL4+for commercial applications or EAL6+for government and defense applications. The verification may be performed during initial certification and/or repeated periodically during component operation through attestation that confirms the component remains in a certified configuration.

The verification at step 202 establishes that each component provides a hardware foundation for trust that enables the component to participate in the compositional certification framework. By verifying that each component comprises a hardware-rooted trust anchor 110 with security properties grounded in hardware rather than software, the method 200 may reason about the security of the composite system based on the hardware-enforced properties of the individual components.

The method 200 includes verifying that the hardware trust anchor 110 is configured to produce a trust metric 114 satisfying boundedness, monotonicity, and hardware isolation constraints (step 204). The verification at step 204 may establish that the trust metric 114 satisfies the boundedness constraint such that the trust metric 114 takes values in the bounded range [0,1], the monotonicity constraint such that the trust metric 114 is non-increasing in behavioral divergence from baseline, and the hardware isolation constraint such that trust metric computation occurs within a hardware-enforced isolation boundary and cannot be observed or modified by software executing outside the isolation boundary, as described above.

The verification of the hardware isolation constraint may include confirming that the trust metric computation executes within a hardware-enforced isolation boundary, such as Intel TDX, a secure enclave, or a hardware security module, that prevents software executing outside the boundary from observing or modifying the computation. The verification may include obtaining attestation from the hardware trust anchor 110 that confirms the trust metric computation satisfies these constraints, establishing that the trust metric 114 provides a reliable foundation for trust-weighted consensus and constraint enforcement.

The method 200 includes verifying that each component of the plurality of components comprises a hardware-enforced exposure function satisfying bound preservation and monotonicity properties (step 206). The verification at step 206 may establish that each component implements an exposure function that is enforced through hardware mechanisms and that exhibits mathematical properties enabling compositional reasoning about system-level exposure bounds. The hardware-enforced exposure function may compute exposure values for actions, state transitions, and/or other events associated with the component, and the hardware enforcement may ensure that the exposure computation cannot be bypassed, modified, or disabled by software executing at any privilege level.

The verification at step 206 may include confirming that the component comprises an exposure function that is hardware-enforced. A hardware-enforced exposure function may be implemented through hardware mechanisms that compute exposure values, track cumulative exposure, and/or enforce exposure limits without depending on software for enforcement. The hardware enforcement may ensure that the exposure function operates correctly even if software components of the system are compromised, disabled, or behaving maliciously. In some embodiments, the hardware-enforced exposure function may be implemented using dedicated hardware logic that computes exposure values based on hardware-observable events. In some embodiments, the hardware-enforced exposure function may be implemented using hardware counters that track cumulative exposure with increment-only semantics. In some embodiments, the hardware-enforced exposure function may be implemented using hardware comparators that enforce exposure limits by blocking actions when cumulative exposure would exceed a bound. The verification at step 206 may confirm that the exposure function is implemented through one or more of these hardware mechanisms such that the exposure computation and enforcement cannot be circumvented by software.

The verification at step 206 may include confirming that the hardware-enforced exposure function satisfies a bound preservation property. The bound preservation property may specify that bounded inputs yield bounded outputs. When the exposure function receives inputs that are bounded-such as action parameters within specified ranges, state values within specified domains, and/or event counts within specified limits—the exposure function may produce output exposure values that are also bounded. The bound preservation property may ensure that the exposure function does not produce unbounded or infinite exposure values from bounded inputs, which could undermine the compositional exposure guarantees of the hardware-enforced trust system 100. The verification of the bound preservation property may include analyzing the exposure function logic to confirm that all possible outputs are bounded when inputs are bounded, testing the exposure function with boundary inputs to confirm that outputs remain bounded, and/or reviewing formal specifications of the exposure function that establish the bound preservation property.

The bound preservation property may enable compositional reasoning about exposure bounds across multiple components, as described above. When each component implements a hardware-enforced exposure function satisfying the bound preservation property, the compositional exposure subsystem 106 may compute a total exposure bound for the composite system by applying a composition operator to the respective component exposure bounds.

The verification at step 206 may include confirming that the hardware-enforced exposure function satisfies a monotonicity property such that an increase in a component exposure bound does not decrease the total exposure bound, as described above. The monotonicity property may prevent adversarial manipulation of exposure bounds through counterintuitive input patterns. The verification may confirm that the hardware-enforced exposure function exhibits this monotonic behavior across all relevant input ranges.

The verification at step 206 may include examining the implementation of the hardware-enforced exposure function to confirm that the function is implemented through hardware mechanisms that cannot be bypassed by software. The examination may include reviewing hardware design documentation that describes how the exposure function is implemented in hardware logic, reviewing security certifications that attest to the hardware enforcement properties of the exposure function, and/or obtaining attestation from the hardware trust anchor 110 that confirms the exposure function is executing within a hardware-enforced context. The examination may confirm that the exposure function implementation does not depend on software components that could be compromised to bypass the exposure computation or enforcement.

In some embodiments, the verification at step 206 may include confirming that the hardware-enforced exposure function is implemented using hardware counters stored in the hardware-protected storage 112. The hardware counters may track cumulative exposure with increment-only semantics such that the cumulative exposure value may only increase and cannot be decremented or reset by software. The increment-only semantics may ensure that exposure accumulation is irreversible within an operational epoch, preventing software manipulation that could artificially reduce cumulative exposure to circumvent exposure limits. The verification may confirm that the hardware counters are protected against software access such that software executing at any privilege level cannot read, modify, reset, or bypass the counter values.

In some embodiments, the verification at step 206 may include confirming that the hardware-enforced exposure function is implemented using hardware comparators that enforce exposure limits. The hardware comparators may compare cumulative exposure against exposure bounds and may block actions when cumulative exposure would exceed the bound. The hardware implementation of the comparison may ensure that the enforcement decision is made by hardware logic rather than software, such that software cannot override the enforcement decision to permit actions that would exceed the exposure bound. The verification may confirm that the hardware comparators are properly integrated with the constraint enforcement subsystem 108 such that enforcement decisions made by the hardware comparators result in appropriate blocking of actions.

The verification at step 206 may include testing the hardware-enforced exposure function to confirm that the function exhibits the bound preservation and monotonicity properties under various operating conditions. Testing may include providing inputs at boundary values to confirm that outputs remain bounded, providing inputs representing increasing exposure levels to confirm that outputs increase monotonically, and/or providing adversarial inputs designed to exploit potential violations of the bound preservation or monotonicity properties. The testing may be performed in controlled environments that enable observation of the exposure function behavior without compromising the hardware enforcement properties.

The verification at step 206 may include obtaining formal verification results that establish the bound preservation and monotonicity properties of the hardware-enforced exposure function. Formal verification may use mathematical proof techniques to establish that the exposure function satisfies the required properties for all possible inputs, rather than relying on testing that can only cover a finite subset of possible inputs. In some embodiments, formal verification may be performed using proof assistants such as Coq that enable machine-checked proofs of the bound preservation and monotonicity properties. In some embodiments, formal verification may be performed using model checking tools that exhaustively explore the state space of the exposure function to confirm that the required properties hold in all reachable states. The formal verification results may provide high assurance that the hardware-enforced exposure function satisfies the bound preservation and monotonicity properties.

The verification at step 206 may be performed for each component of the plurality of components before the method 200 proceeds to determine exposure bounds for the components. By verifying that each component comprises a hardware-enforced exposure function satisfying bound preservation and monotonicity properties, the method 200 may establish that each component provides the exposure computation and enforcement capabilities that enable compositional certification. The per-component verification at step 206 may enable modular certification wherein components may be certified independently based on their hardware-enforced exposure functions, and the certified components may then be composed into certified systems using the composition operator of the compositional exposure subsystem 106.

The verification at step 206 establishes that each component of the plurality of components implements an exposure function that is enforced through hardware mechanisms and that exhibits the mathematical properties required for compositional reasoning about system-level exposure bounds. By verifying that the hardware-enforced exposure function satisfies bound preservation and monotonicity properties, the method 200 may establish that the exposure function produces bounded outputs from bounded inputs and that the exposure function responds appropriately to changes in exposure levels. These properties may enable the compositional exposure subsystem 106 to compute a total exposure bound for the composite system from the component exposure bounds, supporting the compositional certification of systems composed of multiple hardware-protected components.

The method 200 includes determining an exposure bound for each component of the plurality of components (step 208). The determination at step 208 may establish a quantitative bound on the maximum exposure that the component may generate under any operational scenario consistent with the component's mission specification. The exposure bound determined at step 208 may serve as an input to the composition operator that computes the composite exposure bound for the composite system. By determining exposure bounds for each component individually, the method 200 may enable modular certification wherein component exposure bounds are established independently and then composed to determine system-level exposure bounds without requiring integrated testing of the composed system.

The determination of an exposure bound for each component at step 208 comprises computing a set of states backward-reachable from goal states specified in a mission specification (step 210). A mission specification may define the operational objectives, constraints, and authorized behaviors for the component. Goal states specified in the mission specification may represent states that the component is designed to reach, maintain, or achieve during operation. The goal states may include, for example, target positions for autonomous vehicles, desired output states for control systems, completion states for task-oriented agents, and/or other states that represent successful mission execution. The backward-reachable state set may comprise all states from which the component may reach one or more of the goal states through sequences of authorized actions.

The computation of backward-reachable states at step 210 may proceed by identifying the goal states from the mission specification and then iteratively expanding the set of states that may reach the goal states. For each state in the current backward-reachable set, the computation may identify predecessor states from which the current state may be reached through a single authorized action. The predecessor states may be added to the backward-reachable set, and the process may continue until no new states are added. The resulting backward-reachable state set may represent all states from which the component may successfully complete its mission by executing sequences of authorized actions that lead to the goal states.

In some embodiments, the computation of backward-reachable states at step 210 may use reachability analysis techniques from control theory and formal verification. Reachability analysis may compute the set of states that may reach a target set under specified dynamics and constraints. For components with continuous state spaces, the backward-reachable set may be computed using Hamilton-Jacobi reachability analysis, level set methods, and/or other techniques that propagate reachable sets backward in time. For components with discrete state spaces, the backward-reachable set may be computed using graph search algorithms, symbolic model checking, and/or other techniques that enumerate reachable states. The choice of reachability analysis technique may depend on the nature of the component's state space, dynamics, and constraints.

In some embodiments, the computation of backward-reachable states at step 210 may account for uncertainty in the component's dynamics and environment. The backward-reachable set may be computed conservatively to include all states from which the goal states may be reached under any realization of the uncertainty. The conservative computation may ensure that the backward-reachable set includes all states that the component may occupy during mission execution, even when the component's dynamics or environment differ from nominal conditions. The conservative treatment of uncertainty may ensure that the exposure bound determined from the backward-reachable set accounts for worst-case operational scenarios.

The determination of an exposure bound for each component at step 208 further comprises determining a maximum exposure value over the backward-reachable state set (step 212). For each state in the backward-reachable set computed at step 210, the hardware-enforced exposure function of the component may compute an exposure value representing the exposure associated with occupying that state and/or transitioning from that state toward the goal states. The maximum exposure value may be determined by evaluating the exposure function over all states in the backward-reachable set and identifying the state or states that produce the highest exposure value.

The determination of the maximum exposure value at step 212 may account for the exposure associated with actions that the component may take from each state in the backward-reachable set. For each state, the component may have multiple authorized actions available, and each action may have an associated exposure value. The maximum exposure value for a state may be the maximum exposure over all authorized actions from that state, representing the worst-case exposure that the component may generate when occupying that state. The maximum exposure value over the backward-reachable state set may then be the maximum of the per-state maximum exposure values, representing the worst-case exposure that the component may generate from any state that the component may occupy during mission execution.

In some embodiments, the determination of the maximum exposure value at step 212 may use optimization techniques to identify the state or states in the backward-reachable set that produce the highest exposure value. For components with continuous state spaces, the optimization may use gradient-based methods, global optimization algorithms, and/or other techniques that search for maxima of the exposure function over the backward-reachable set. For components with discrete state spaces, the optimization may use enumeration, branch-and-bound algorithms, and/or other techniques that evaluate the exposure function at each state in the backward-reachable set. The optimization may be performed offline during component certification, enabling thorough search for the maximum exposure value without runtime constraints.

In some embodiments, the determination of the maximum exposure value at step 212 may account for sequences of actions rather than individual actions. The exposure associated with a sequence of actions may differ from the sum of exposures of individual actions due to interaction effects, cumulative impacts, and/or other factors that depend on action ordering and context. The maximum exposure value may be determined by considering all action sequences that lead from states in the backward-reachable set to the goal states and identifying the sequence or sequences that produce the highest cumulative exposure. The consideration of action sequences may ensure that the exposure bound accounts for worst-case operational trajectories rather than worst-case individual actions.

The determination of an exposure bound for each component at step 208 further comprises establishing the exposure bound as the maximum exposure value (step 214). The exposure bound established at step 214 may represent an upper bound on the exposure that the component may generate during any mission execution consistent with the mission specification. By establishing the exposure bound as the maximum exposure value over the backward-reachable state set, the method 200 may ensure that the exposure bound accounts for worst-case operational scenarios while remaining achievable by the component during normal operation.

The exposure bound established at step 214 may be stored in the hardware-protected storage 112 for use by the compositional exposure subsystem 106 in computing the composite exposure bound. The stored exposure bound may be associated with the component's identity and may be sealed to the component's hardware configuration such that the exposure bound may only be accessed when the component is in a certified configuration. The hardware protection of the stored exposure bound may ensure that the exposure bound cannot be modified by software to permit additional exposure beyond the certified limit.

The exposure bound established at step 214 may serve as the component's contribution to the composite exposure bound computed by the composition operator. When the compositional exposure subsystem 106 computes the composite exposure bound by applying the composition operator to the respective component exposure bounds, the exposure bound established at step 214 may be used as the component exposure bound for the component. The compositional properties of the composition operator may ensure that the composite exposure bound computed from the component exposure bounds provides a valid upper bound on the total exposure of the composite system.

In some embodiments, the exposure bound established at step 214 may include margin to account for modeling uncertainty, implementation variation, and/or other factors that may cause actual exposure to differ from computed exposure. The margin may be added to the maximum exposure value to produce an exposure bound that provides additional assurance that actual exposure will not exceed the bound. The margin may be determined based on analysis of modeling uncertainty, empirical measurement of implementation variation, and/or safety requirements that specify minimum margin levels. The inclusion of margin may ensure that the exposure bound remains valid even when actual component behavior differs from the modeled behavior used in the backward-reachability analysis.

In some embodiments, the exposure bound established at step 214 may be validated through testing and/or simulation before the component is certified. Validation may include executing the component in simulated environments that exercise states in the backward-reachable set and measuring the actual exposure generated by the component. The measured exposure may be compared against the established exposure bound to confirm that actual exposure does not exceed the bound. Validation may also include adversarial testing that attempts to cause the component to generate exposure exceeding the bound, confirming that the bound is robust against adversarial operational scenarios. The validation may provide empirical confirmation that the exposure bound established through backward-reachability analysis is achievable and conservative.

The determination of exposure bounds at step 208 may be performed for each component of the plurality of components before the method 200 proceeds to compute the composite exposure bound at step 216. By determining exposure bounds for each component individually based on backward-reachability analysis from goal states specified in mission specifications, the method 200 may establish component-level exposure guarantees that enable compositional reasoning about system-level exposure. The per-component exposure bounds may be combined using the composition operator to compute the composite exposure bound, enabling certification of the composite system based on component specifications without requiring integrated testing of the composed system.

The method 200 includes computing a composite exposure bound by applying a composition operator to the exposure bounds of the plurality of components (step 216). The composition operator may combine the individual component exposure bounds determined at step 208 to produce a composite exposure bound that represents an upper bound on the total exposure of the composite system. The composite exposure bound may be computed from the component exposure bounds without requiring integrated testing of the composed system, enabling modular certification wherein components are certified independently and then composed into certified systems based on their individual exposure bounds.

The composition operator may be selected from an operator class that preserves boundedness and satisfies subadditivity under interaction, as described above. The composition operator may preserve boundedness such that bounded inputs yield bounded outputs, and may satisfy a monotonicity property such that an increase in any component exposure bound does not decrease the composite exposure bound. Various composition operators may be suitable for different application domains, including additive composition for independent cumulative exposures, subtractive composition that accounts for interaction exposure terms, and multiplicative composition for independent security domains.

The composition operator may be implemented as a hardware state transition function that computes the composite exposure bound through hardware logic executing independently of software control. The hardware state transition function may be monotone, subadditive, associative, and invariant under component update ordering with respect to hardware-protected exposure registers. The hardware implementation may ensure that the composite exposure bound computation is protected against software manipulation and produces consistent results regardless of the order in which component exposure bounds are updated.

In some embodiments, the hardware state transition function may be implemented using dedicated hardware logic within a hardware trust anchor 110, using hardware-protected registers that store component exposure bounds and the composite exposure bound, and/or using atomic updates that ensure the composite exposure bound is always consistent with the current component exposure bounds. The composite exposure bound computed at step 216 may serve as the basis for certifying the composite system at step 222.

The composite exposure bound computed at step 216 may serve as the basis for certifying the composite system at step 222. By computing the composite exposure bound from the component exposure bounds using a composition operator that preserves boundedness and satisfies subadditivity under interaction, the method 200 may establish that the composite system maintains bounded exposure guarantees that are computable from component specifications alone. The hardware implementation of the composition operator as a state transition function that is monotone, subadditive, associative, and invariant under component update ordering may ensure that the composite exposure bound computation is protected against software manipulation and produces consistent results regardless of the order in which component exposure bounds are updated.

The method 200 includes verifying that the composite system comprises a trust-weighted consensus mechanism achieving Byzantine fault tolerance by weighting node contributions based on respective trust metrics (step 218). The verification at step 218 may establish that the composite system implements a consensus mechanism that leverages hardware-attested trust metrics 114 to weight the contributions of participating nodes, thereby achieving fault tolerance for $f<n/2$ faulty nodes as described above.

The verification at step 218 may include confirming that the trust metrics 114 used for weighting node contributions are hardware-attested, with each node providing a trust metric 114 computed by the node's hardware trust anchor 110 and accompanied by cryptographic attestation proving computation within a hardware-enforced isolation boundary. The verification may confirm that the consensus mechanism validates the hardware attestation of each node's trust metric 114 before using the trust metric 114 to weight the node's contribution.

The verification at step 218 may include examining the consensus protocol to confirm correct implementation of trust-weighted voting, including reviewing protocol specifications, implementations, and testing with various configurations of honest and Byzantine nodes. The verification may confirm that the consensus protocol aggregates weighted node contributions using a fault-tolerant aggregation function, such as a weighted median, that provides robustness against Byzantine behavior.

In some embodiments, the verification at step 218 may include confirming that the trust-weighted consensus mechanism implements median-based Byzantine fault tolerant consensus with proposals signed by hardware trust anchors 110 to prevent spoofing, and timestamps from hardware-attested time sources to prevent replay attacks.

The verification at step 218 may include examining the consensus protocol implemented by the composite system to confirm that the protocol correctly implements trust-weighted voting. The examination may include reviewing protocol specifications that describe how node contributions are weighted based on trust metrics 114, reviewing protocol implementations to confirm that the implementations match the specifications, and/or testing the protocol with various configurations of honest and Byzantine nodes to confirm that the protocol achieves the specified fault tolerance. The examination may confirm that the consensus protocol aggregates weighted node contributions using a fault-tolerant aggregation function, such as a weighted median, that provides robustness against Byzantine behavior.

The verification at step 218 may include confirming that the trust-weighted consensus mechanism is integrated with the trust-weighted consensus subsystem 104 of the hardware-enforced trust system 100. The trust-weighted consensus subsystem 104 may implement the trust-weighted consensus mechanism and may receive trust metrics 114 from the hardware-rooted trust isolation subsystem 102 for use in weighting node contributions. The verification may confirm that the trust-weighted consensus mechanism uses trust metrics 114 produced by hardware trust anchors 110 that satisfy the boundedness, monotonicity, and hardware isolation constraints verified at step 204. The integration with the trust-weighted consensus subsystem 104 may ensure that the consensus mechanism operates as part of the architecturally integrated hardware-enforced trust system 100.

In some embodiments, the verification at step 218 may include confirming that the trust-weighted consensus mechanism implements median-based Byzantine fault tolerant consensus. Each node participating in the consensus may broadcast a proposal, with each proposal signed by the node's hardware trust anchor 110 to prevent spoofing. The consensus mechanism may compute a consensus value as a weighted median of the valid proposals, with each proposal weighted according to the proposing node's trust metric 114. The weighted median may provide robustness against Byzantine behavior because even if Byzantine nodes propose extreme values, the weighted median may remain within the range of values proposed by honest nodes with sufficient aggregate trust weight. The verification may confirm that the weighted median computation is implemented correctly and that the consensus mechanism achieves the specified fault tolerance.

In some embodiments, the verification at step 218 may include confirming that the trust-weighted consensus mechanism uses timestamps from hardware-attested time sources to prevent replay attacks. Each proposal in the consensus protocol may include a timestamp from a hardware-attested time source, such as a chip-scale atomic clock, that indicates when the proposal was generated. The consensus mechanism may reject proposals with timestamps that are stale or that are inconsistent with timestamps from other time sources. The use of hardware-attested timestamps may prevent adversaries from replaying old proposals to influence consensus outcomes. The verification may confirm that the consensus mechanism validates timestamps and rejects proposals that fail timestamp validation.

The method 200 includes verifying that the composite system comprises hardware-triggered automatic revocation capability through hardware-enforced paths that cannot be bypassed, modified, or disabled by software executing at any privilege level (step 220). The verification at step 220 may establish that the composite system implements automatic revocation of operational capability that is triggered by hardware mechanisms and that is enforced through hardware paths that are immune to software-based bypass attempts. The hardware-triggered automatic revocation may ensure that when triggering conditions are met-such as the trust metric 114 falling below a threshold or cumulative exposure reaching the total exposure bound—the revocation occurs through hardware mechanisms that software cannot prevent, delay, or reverse.

The verification at step 220 may include confirming that the composite system implements automatic revocation that is hardware-triggered. Hardware-triggered revocation may refer to revocation that is initiated by hardware mechanisms that detect when triggering conditions are met, without requiring software to initiate or authorize the revocation. The hardware triggering may ensure that revocation occurs even if software components of the composite system are compromised, unresponsive, or behaving maliciously to prevent revocation. The verification may confirm that the composite system includes hardware mechanisms that monitor the trust metric 114 and cumulative exposure, that detect when the trust metric 114 falls below a threshold or cumulative exposure reaches the total exposure bound, and that initiate revocation in response to detecting these triggering conditions.

The verification at step 220 may include confirming that the automatic revocation is enforced through hardware-enforced paths. A hardware-enforced path may refer to a mechanism for implementing revocation that operates through hardware logic and that does not depend on software for enforcement. The hardware-enforced paths may include, for example, hardware logic that sets exposure ceiling values to zero in hardware registers, hardware logic that revokes cryptographic keys stored in hardware security modules, hardware logic that terminates hardware-isolated execution environments, and/or hardware logic that triggers hardware watchdog mechanisms. Each hardware-enforced path may independently implement revocation such that revocation occurs through at least one path even if other paths are compromised or disabled.

The verification at step 220 may include confirming that the hardware-enforced paths cannot be bypassed by software executing at any privilege level. Software executing at any privilege level-including software with root access, kernel access, hypervisor access, and/or firmware access—may not be able to prevent the hardware-enforced paths from implementing revocation when triggering conditions are met. The hardware enforcement may ensure that the revocation paths operate independently of software control, such that software cannot disable the paths, cannot modify the paths to prevent revocation, and cannot override the revocation decision once the hardware mechanisms have detected that triggering conditions are met. The verification may include analyzing the hardware design of the revocation paths to confirm that the paths do not include software-controllable elements that could be exploited to bypass revocation.

The verification at step 220 may include confirming that the hardware-enforced paths cannot be modified by software executing at any privilege level. Modification of the hardware-enforced paths may include changing the logic that implements revocation, changing the triggering conditions that initiate revocation, and/or changing the effects of revocation on operational capability. The hardware enforcement may ensure that the revocation paths are implemented in hardware logic that is fixed at manufacturing time or that is protected by hardware mechanisms that prevent software modification. The verification may include reviewing hardware design documentation to confirm that the revocation paths are implemented in non-modifiable hardware logic and/or that the revocation paths are protected by hardware mechanisms such as fuses, write-once registers, and/or hardware access controls that prevent software modification.

The verification at step 220 may include confirming that the hardware-enforced paths cannot be disabled by software executing at any privilege level. Disabling of the hardware-enforced paths may include powering down hardware components that implement revocation, disconnecting hardware components from the system, and/or placing hardware components in states where the components do not respond to triggering conditions. The hardware enforcement may ensure that the revocation paths remain active and responsive to triggering conditions regardless of software actions. The verification may include analyzing the hardware design to confirm that the revocation paths do not include software-controllable power management, software-controllable interconnects, and/or software-controllable mode settings that could be exploited to disable the paths.

The verification at step 220 may include confirming that the composite system implements multiple independent hardware-enforced paths for automatic revocation. Multiple independent paths may provide defense-in-depth such that revocation occurs even if some paths are compromised or disabled. Each path may independently monitor triggering conditions and may independently implement revocation when triggering conditions are met. The independence of the paths may ensure that compromise of one path does not affect the operation of the remaining paths. The verification may confirm that the composite system implements at least two, at least three, at least four, and/or more independent hardware-enforced paths, and may confirm that the paths operate independently without shared components that could represent single points of failure.

In some embodiments, the verification at step 220 may include confirming that the composite system implements a kernel-level revocation path using eBPF or similar kernel-level enforcement mechanisms. The kernel-level revocation path may set an exposure ceiling value to zero in a kernel map, causing all subsequent commands to be rejected. The kernel-level revocation path may achieve latency of approximately 100 nanoseconds. The verification may confirm that the kernel-level revocation path is protected by integrity verification mechanisms such as IMA/EVM that detect and prevent modification of the enforcement logic.

In some embodiments, the verification at step 220 may include confirming that the composite system implements a hardware security module revocation path. The hardware security module revocation path may revoke cryptographic keys stored in the hardware security module, such that commands cannot be signed or verified after revocation. The hardware security module revocation path may seal a zero ceiling value to the hardware security module and may extend a Platform Configuration Register with a revocation event, making the agent's signing key permanently unsealable. The verification may confirm that the hardware security module revocation path operates through hardware mechanisms within the hardware security module that cannot be bypassed by software.

In some embodiments, the verification at step 220 may include confirming that the composite system implements a trusted execution environment revocation path. The trusted execution environment revocation path may terminate a Trust Domain or secure enclave, wipe the Trust Domain or enclave memory, and invalidate the Trust Domain or enclave encryption key. The trusted execution environment revocation path may destroy the execution context in which commands are processed, preventing further command execution. The verification may confirm that the trusted execution environment revocation path operates through hardware mechanisms of the trusted execution environment that cannot be bypassed by software executing outside the trusted execution environment.

In some embodiments, the verification at step 220 may include confirming that the composite system implements a process-level revocation path. The process-level revocation path may terminate the process that issues commands by sending a termination signal such as SIGKILL. The process-level revocation path may be implemented by a monitoring process that operates independently of the agent process and that has privileges to terminate the agent process. The verification may confirm that the monitoring process is protected by integrity verification mechanisms and that the monitoring process operates with sufficient privilege to terminate the agent process regardless of the agent process's state.

The verification at step 220 may include confirming that the hardware-triggered automatic revocation capability is integrated with the constraint enforcement subsystem 108 of the hardware-enforced trust system 100. The constraint enforcement subsystem 108 may implement the hardware-triggered automatic revocation and may trigger revocation through the hardware-enforced paths in response to the trust metric 114 falling below a threshold or cumulative exposure reaching the total exposure bound. The verification may confirm that the constraint enforcement subsystem 108 monitors the trust metric 114 and cumulative exposure using hardware mechanisms, that the constraint enforcement subsystem 108 detects triggering conditions using hardware logic, and that the constraint enforcement subsystem 108 initiates revocation through the hardware-enforced paths without requiring software authorization.

The verification at step 220 may include testing the hardware-triggered automatic revocation capability to confirm that revocation occurs when triggering conditions are met. Testing may include causing the trust metric 114 to fall below the threshold and confirming that revocation is triggered through the hardware-enforced paths. Testing may include causing cumulative exposure to reach the total exposure bound and confirming that revocation is triggered through the hardware-enforced paths. Testing may include attempting to bypass, modify, or disable the hardware-enforced paths using software executing at various privilege levels and confirming that the bypass attempts are unsuccessful. The testing may provide empirical confirmation that the hardware-triggered automatic revocation capability operates as specified.

The verification at step 220 may include obtaining attestation from the hardware trust anchor 110 that confirms the hardware-triggered automatic revocation capability is properly configured and operational. The attestation may provide cryptographic proof that the hardware-enforced paths are active, that the triggering conditions are correctly configured, and that the revocation capability has not been tampered with. The attestation may be verified against reference values established during component certification to confirm that the hardware-triggered automatic revocation capability is in a certified configuration.

The method 200 includes certifying the composite system based on the composite exposure bound (step 222). The certification at step 222 may establish that the composite system satisfies conditions that enable the composite exposure bound to serve as a valid upper bound on the total exposure of the composite system. The certification may be based on the verification steps performed earlier in the method 200, including verification that each component comprises a hardware-rooted trust anchor (step 202), verification that each hardware trust anchor produces a trust metric satisfying constraints (step 204), verification that each component comprises a hardware-enforced exposure function (step 206), determination of exposure bounds for each component (step 208), computation of the composite exposure bound (step 216), verification of trust-weighted consensus (step 218), and verification of hardware-triggered automatic revocation (step 220). By completing these verification steps and computing the composite exposure bound, the method 200 may establish that the composite system maintains bounded exposure guarantees through the architectural integration of the hardware-rooted trust isolation subsystem 102, the compositional exposure subsystem 106, the trust-weighted consensus subsystem 104, and the constraint enforcement subsystem 108.

The certification at step 222 may establish that the composite exposure bound is independent of internal implementation of each component. Independence of internal implementation may mean that the composite exposure bound depends only on the externally observable properties of each component-such as the component's exposure bound, trust metric 114 properties, and interface specifications- and does not depend on how those properties are achieved internally within the component. Two components with identical exposure bounds, identical trust metric 114 properties, and identical interface specifications may contribute identically to the composite exposure bound regardless of differences in their internal architectures, algorithms, data structures, and/or other implementation details. The independence of internal implementation may enable component vendors to modify internal implementations without affecting the composite exposure bound, provided that the modifications do not change the externally observable properties on which the composite exposure bound depends.

The independence of internal implementation may arise from the compositional properties of the composition operator used to compute the composite exposure bound. The composition operator may combine component exposure bounds to produce the composite exposure bound without requiring information about how each component achieves its exposure bound. The composition operator may treat each component as a black box characterized by its exposure bound, and may compute the composite exposure bound based solely on the component exposure bounds and the composition operator's mathematical properties. Because the composition operator does not require information about internal component implementation, the composite exposure bound computed by the composition operator may be independent of internal implementation details.

The independence of internal implementation may provide several benefits for the certification of composite systems. Component vendors may certify their components based on externally observable properties without disclosing proprietary implementation details. System integrators may compose certified components into certified systems without requiring access to component internals. Component updates that preserve externally observable properties may not require recertification of the composite system. The independence of internal implementation may enable a modular certification ecosystem wherein components are certified independently and composed into certified systems based on their certified properties.

The certification at step 222 may establish that the composite exposure bound is computable from specifications of the plurality of components without integrated testing. Computability from specifications may mean that the composite exposure bound may be determined through analysis of component specifications alone, without requiring execution of the composed system, measurement of inter-component interactions, and/or other forms of integrated testing. The component specifications may include the exposure bounds determined at step 208, the trust metric 114 properties verified at step 204, the hardware-enforced exposure function properties verified at step 206, and/or other properties that characterize each component's contribution to the composite system. The composite exposure bound may be computed by applying the composition operator to the component exposure bounds extracted from the component specifications.

The computability from specifications without integrated testing may arise from the mathematical properties of the composition operator and the verification steps performed earlier in the method 200. The composition operator may satisfy bound preservation and subadditivity properties that enable the composite exposure bound to be computed from component exposure bounds through mathematical operations rather than empirical measurement. The verification steps may establish that each component satisfies conditions that enable the composition operator to produce valid composite exposure bounds. Because the composition operator's mathematical properties and the components' verified properties together enable computation of the composite exposure bound, integrated testing may not be required to determine the composite exposure bound.

The computability from specifications without integrated testing may provide several benefits for the certification of composite systems. Certification may be performed before the composite system is assembled, enabling early identification of systems that would exceed exposure requirements. Certification may be performed without access to all components simultaneously, enabling distributed certification workflows wherein different parties certify different components. Certification may be performed without the cost and time associated with integrated testing, reducing the certification burden for complex systems. The computability from specifications may enable scalable certification of systems composed of many components, wherein the certification effort grows linearly with the number of components rather than combinatorially with the number of component interactions.

In some embodiments, the certification at step 222 may include generating a certification record that documents the composite exposure bound and the basis for the certification. The certification record may include the composite exposure bound computed at step 216, the component exposure bounds determined at step 208 for each component, the composition operator used to compute the composite exposure bound, the verification results from steps 202, 204, 206, 218, and 220, and/or cryptographic signatures that attest to the authenticity and integrity of the certification record. The certification record may be stored in the hardware-protected storage 112 and/or may be transmitted to external parties that rely on the certification.

In some embodiments, the certification at step 222 may include binding the certification to the specific configuration of the composite system. The binding may ensure that the certification is valid only for the specific combination of components, component configurations, and system architecture that was verified during the method 200. If the composite system is modified-such as by substituting a different component, changing a component's configuration, and/or altering the system architecture—the certification may become invalid, and the method 200 may need to be performed again to certify the modified system. The binding may be implemented using cryptographic techniques such as sealing the certification record to specific hardware and software configuration values, such that the certification record may only be accessed when the composite system is in the certified configuration.

In some embodiments, the certification at step 222 may include verifying that the composite exposure bound satisfies requirements specified for the composite system. The requirements may specify a maximum permissible composite exposure bound for the intended deployment context. The certification may confirm that the composite exposure bound computed at step 216 is at most the maximum permissible bound specified in the requirements. If the composite exposure bound exceeds the maximum permissible bound, the certification may fail, and the composite system may not be certified for the intended deployment context. The requirement verification may ensure that certified composite systems satisfy deployment-specific constraints on total exposure.

In some embodiments, the certification at step 222 may include generating attestation that enables external parties to verify the certification. The attestation may be generated by the hardware trust anchor 110 and may provide cryptographic proof that the composite system has been certified with the specified composite exposure bound. External parties may verify the attestation to confirm that the composite system is certified without requiring access to the certification record and/or the verification results. The attestation may enable trust relationships wherein external parties rely on the certification without performing independent verification of the composite system.

The certification at step 222 may enable the composite system to operate with bounded exposure guarantees that are established through the method 200. The composite exposure bound certified at step 222 may serve as the total exposure bound enforced by the compositional exposure subsystem 106 during operation of the composite system. The constraint enforcement subsystem 108 may compare cumulative exposure against the certified composite exposure bound and may trigger automatic revocation when cumulative exposure reaches the bound. The certification may provide assurance that the composite system maintains bounded exposure guarantees that are computable from component specifications and independent of internal component implementation.

The certification at step 222 may support modular certification workflows wherein components are certified independently and then composed into certified systems. A component vendor may certify a component by performing steps 202, 204, 206, and 208 of the method 200 for the component, establishing that the component comprises a hardware-rooted trust anchor, produces a trust metric 114 satisfying constraints, comprises a hardware-enforced exposure function, and has a determined exposure bound. A system integrator may compose certified components into a composite system and may certify the composite system by performing steps 216, 218, 220, and 222 of the method 200, computing the composite exposure bound from the component exposure bounds, verifying trust-weighted consensus and hardware-triggered automatic revocation, and certifying the composite system based on the composite exposure bound. The modular certification workflow may enable reuse of component certifications across multiple composite systems and may reduce the certification burden for complex systems.

The certification at step 222 may support incremental update of certified composite systems. When a component of a certified composite system is updated, the updated component may be certified independently by performing steps 202, 204, 206, and 208 of the method 200 for the updated component. The composite exposure bound may then be recomputed at step 216 using the updated component's exposure bound and the stored exposure bounds of the unchanged components. If the recomputed composite exposure bound satisfies requirements, the composite system may be recertified at step 222 without requiring integrated testing of the entire composed system. The incremental update capability may reduce the certification burden when components are updated, enabling modular maintenance of certified composite systems.

In some embodiments, a hardware-enforced AI behavioral bounding system may provide bounded exposure guarantees for AI systems through hardware-enforced constraints that persist regardless of AI system behavior. The hardware-enforced AI behavioral bounding system may comprise a hardware-rooted trust subsystem, a trusted time subsystem, a compositional exposure subsystem, and a constraint enforcement subsystem that cooperate to enforce behavioral bounds on AI systems through hardware mechanisms that cannot be circumvented by software.

The hardware-enforced AI behavioral bounding system may comprise a hardware-rooted trust subsystem comprising a trust anchor configured to compute a trust metric from physical observables. The trust anchor may be implemented using hardware security technologies such as a trusted platform module, a secure element, a hardware security module, a hardware-based trusted execution environment, and/or a physically unclonable function. The trust anchor may derive the trust metric from physical observables that arise from physical phenomena rather than deterministic computation. Physical observables from which the trust anchor may compute the trust metric may include, for example, clock jitter arising from physical variations in oscillator circuits, power rail fluctuations reflecting physical power consumption patterns, thermal variations arising from heat dissipation in semiconductor devices, sensor noise reflecting physical measurement uncertainty, and/or execution microstate transitions reflecting fine-grained processor state changes. Because these physical observables arise from physical phenomena, the trust metric computed from these observables cannot be spoofed by software emulation.

The trust metric computed by the trust anchor may satisfy a boundedness constraint such that the trust metric takes values in a bounded range, such as the interval [0,1] with 0 representing zero trust and 1 representing maximum verified trust.

The trust metric computed by the trust anchor may satisfy a monotonicity constraint such that the trust metric is non-increasing in behavioral divergence from a baseline, ensuring that increased behavioral divergence does not result in increased trust and providing a reliable indicator of AI system trustworthiness.

The hardware-enforced AI behavioral bounding system may comprise a trusted time subsystem configured to provide a hardware-attested time source that cannot be spoofed or manipulated by software. The trusted time subsystem may provide accurate time references for timestamping AI system actions, enforcing timing constraints, detecting replay attacks, and/or validating the temporal ordering of events. The hardware attestation of the time source may ensure that time values provided by the trusted time subsystem reflect actual elapsed time rather than values that could be manipulated by software to circumvent time-based constraints.

In some embodiments, the trusted time subsystem may be implemented using a chip-scale atomic clock (CSAC) that provides a highly stable time reference with bounded drift. A chip-scale atomic clock may maintain time accuracy with drift bounded to approximately 4.3 microseconds per day, enabling accurate timekeeping over extended periods without requiring synchronization with external time sources. The chip-scale atomic clock may operate independently of software control such that software executing at any privilege level cannot modify the time values provided by the clock, cannot adjust the clock rate, and cannot reset the clock to earlier values.

In some embodiments, the trusted time subsystem may be implemented using a GPS receiver that provides time synchronized to GPS satellite signals. A GPS receiver may provide time accuracy of approximately 100 nanoseconds when GPS signals are available. The GPS receiver may provide hardware-attested time values that are derived from satellite signals rather than from software-controlled sources.

In some embodiments, the trusted time subsystem may be implemented using multiple independent time sources configured in a fault-tolerant arrangement. The trusted time subsystem may compute a consensus time value as a median or other fault-tolerant aggregation of time values from the multiple independent time sources. The fault-tolerant arrangement may enable the trusted time subsystem to provide accurate time values even when individual time sources are faulty, compromised, or unavailable.

The hardware attestation of the time source may be implemented through cryptographic mechanisms that prove the time values originate from the hardware time source rather than from software. The trusted time subsystem may sign time values using cryptographic keys stored in hardware that cannot be extracted by software. The signed time values may be verified by other components of the hardware-enforced AI behavioral bounding system to confirm that the time values are hardware-attested.

The hardware-enforced AI behavioral bounding system may comprise a compositional exposure subsystem configured to enforce a total exposure bound for an AI system. The total exposure bound may represent a maximum permissible cumulative exposure that the AI system may accumulate during operation. The compositional exposure subsystem may track cumulative exposure as the AI system executes actions, may compare cumulative exposure against the total exposure bound, and may enforce the total exposure bound by blocking actions that would cause cumulative exposure to exceed the bound.

The total exposure bound may be computed by applying a composition operator to respective component exposure bounds. When the AI system comprises multiple components, each component may have a respective component exposure bound that represents the maximum exposure that the component may generate. The composition operator may combine the component exposure bounds to produce the total exposure bound for the AI system. The composition operator may enable modular specification of exposure bounds wherein component exposure bounds are specified independently and then composed to determine the total exposure bound.

The composition operator may satisfy an additivity property such that total exposure is computable from component exposures. The additivity property may specify that the total exposure of the AI system may be computed as a function of the individual component exposures without requiring measurement of inter-component interactions. In some embodiments, the additivity property may specify that the total exposure equals the sum of the component exposures, such that $E_{total}=E_1+E_2+\ldots+E_n$, where $E_1, E_2, \ldots, E_n$ represent the respective component exposures. In some embodiments, the additivity property may specify that the total exposure is computable through a more general additive function that combines component exposures. The additivity property may enable the compositional exposure subsystem to compute the total exposure bound from component exposure bounds through mathematical operations rather than empirical measurement of the composed system.

The compositional exposure subsystem may maintain cumulative exposure in hardware-protected storage that cannot be read, modified, reset, or bypassed by software executing at any privilege level. The hardware-protected storage may enforce increment-only semantics such that cumulative exposure may only increase and cannot be decremented or reset by software. The increment-only semantics may ensure that exposure accumulation is irreversible during operation, preventing software manipulation that could artificially reduce cumulative exposure to circumvent the total exposure bound.

The hardware-enforced AI behavioral bounding system may comprise a constraint enforcement subsystem configured to validate AI commands against governance rules. The governance rules may specify constraints on AI system behavior, including permitted actions, prohibited actions, action parameters, timing constraints, and/or other behavioral requirements. The constraint enforcement subsystem may evaluate each AI command against the governance rules to determine whether the command complies with the rules. Commands that comply with the governance rules may be permitted to execute. Commands that violate the governance rules may be blocked, modified to achieve compliance, and/or logged for audit purposes.

The constraint enforcement subsystem may be configured to trigger automatic revocation exclusively through hardware-enforced paths that cannot be bypassed, modified, or disabled by software executing at any privilege level. Automatic revocation may terminate the operational capability of the AI system in response to triggering conditions. The hardware-enforced paths may implement revocation through hardware mechanisms that operate independently of software control. Software executing at any privilege level-including software with root access, kernel access, hypervisor access, and/or firmware access—may not be able to prevent the hardware-enforced paths from implementing revocation when triggering conditions are met.

The constraint enforcement subsystem may trigger automatic revocation in response to the trust metric falling below a threshold. When the trust metric computed by the trust anchor falls below a specified threshold, the constraint enforcement subsystem may initiate revocation through the hardware-enforced paths. The threshold may be configured during system initialization and may be stored in hardware-protected storage. The trust metric threshold may represent a minimum acceptable level of AI system trustworthiness, below which the AI system may not be permitted to continue operation.

The constraint enforcement subsystem may trigger automatic revocation in response to cumulative exposure reaching the total exposure bound. When cumulative exposure tracked by the compositional exposure subsystem reaches the total exposure bound, the constraint enforcement subsystem may initiate revocation through the hardware-enforced paths. The revocation in response to reaching the total exposure bound may ensure that the AI system cannot accumulate exposure beyond the bound regardless of AI system behavior.

The total exposure bound may be an absolute ceiling on cumulative AI system exposure that is hardware-enforced and cannot be exceeded regardless of AI system behavior. The absolute nature of the total exposure bound may ensure that cumulative exposure cannot exceed the bound under any circumstances, regardless of operational context, AI system state, and/or adversarial action. The hardware enforcement of the total exposure bound may ensure that the bound is implemented through hardware mechanisms that execute independently of software control. Software may not modify the total exposure bound, may not modify the cumulative exposure counter, may not disable the comparison between cumulative exposure and the total exposure bound, and may not prevent the consequences of cumulative exposure reaching the total exposure bound.

The total exposure bound may not be bypassed by the AI system regardless of the AI system's behavior. Even if the AI system attempts to circumvent the total exposure bound through adversarial behavior, software manipulation, and/or exploitation of system vulnerabilities, the hardware enforcement may ensure that cumulative exposure cannot exceed the bound. The hardware-enforced paths for automatic revocation may terminate the AI system's operational capability when cumulative exposure reaches the bound, preventing further exposure accumulation regardless of the AI system's attempts to continue operation.

The total exposure bound may not be deferred such that cumulative exposure temporarily exceeds the bound with a promise to reduce exposure later. The non-deferrable property of the total exposure bound may ensure that no windows exist during which unbounded exposure may occur. When cumulative exposure reaches the total exposure bound, further exposure-generating actions may be blocked immediately, without any mechanism for deferring the enforcement to a later time.

The total exposure bound may not be probabilistically relaxed such that exceedance is permitted with some probability. The deterministic enforcement of the total exposure bound may ensure that the bound is enforced with certainty, with zero probability of exceedance. The deterministic enforcement may provide certainty that cumulative AI system exposure will not exceed the total exposure bound, enabling applications that require absolute guarantees rather than probabilistic assurances.

In some embodiments, the hardware-enforced AI behavioral bounding system may implement multiple independent hardware-enforced paths for automatic revocation. The multiple independent paths may provide defense-in-depth such that revocation occurs even if some paths are compromised or disabled. Each path may independently monitor triggering conditions and may independently implement revocation when triggering conditions are met. The independence of the paths may ensure that compromise of one path does not affect the operation of the remaining paths.

In some embodiments, the hardware-enforced AI behavioral bounding system may implement revocation through a kernel-level path that sets an exposure ceiling value to zero in a kernel map, causing all subsequent AI commands to be rejected. In some embodiments, the hardware-enforced AI behavioral bounding system may implement revocation through a hardware security module path that revokes cryptographic keys required for AI command authorization. In some embodiments, the hardware-enforced AI behavioral bounding system may implement revocation through a trusted execution environment path that terminates the execution environment in which AI commands are processed. In some embodiments, the hardware-enforced AI behavioral bounding system may implement revocation through a process-level path that terminates the AI system process. The combination of multiple independent hardware-enforced paths may achieve a combined bypass probability that is substantially lower than the bypass probability of any individual path.

The hardware-enforced AI behavioral bounding system may provide bounded exposure guarantees for AI systems operating in various deployment contexts. In financial system deployments, the total exposure bound may limit the total outstanding position value that an AI trading system may accumulate. In physical system deployments, the total exposure bound may limit the cumulative resource consumption or actuation magnitude that an AI control system may generate. In compute system deployments, the total exposure bound may limit the total API calls, tokens generated, or compute cycles that an AI agent may consume. In each deployment context, the hardware-enforced AI behavioral bounding system may ensure that cumulative AI system exposure remains bounded by the total exposure bound regardless of AI system behavior.

In some embodiments of the hardware-enforced AI behavioral bounding system, the compositional exposure subsystem may further define exposure as a hardware-attested activation level of one or more learned internal representations identified as safety-critical. Neural networks may develop internal representations that correspond to behaviors that may be constrained for safety purposes. A policy network controlling an autonomous system may develop neurons that activate strongly when the network is about to take actions that exhibit particular behavioral characteristics. Similarly, a language model may develop internal features corresponding to particular output characteristics. These semantic properties may not be directly observable in physical exposure metrics; an action may have low physical exposure while still exhibiting behavioral characteristics that warrant constraint. The compositional exposure subsystem may identify which internal activations correspond to which semantic properties and may enforce bounds on those activations with hardware guarantees.

The compositional exposure subsystem may implement learned feature bounds by identifying safety-critical features in neural networks through offline mechanistic interpretability analysis and enforcing hardware thresholds on activation levels. The identification of safety-critical features may occur during an offline research phase that is separate from runtime operation. The offline phase may use mechanistic interpretability techniques to determine which neurons within the neural network are causally responsible for particular behaviors. The offline analysis may produce feature specifications that identify the layer indices where safety-critical features reside, the indices of specific neurons within those layers, activation thresholds above which features are considered active, and/or causal influence scores measuring how strongly features predict particular behaviors. The feature specifications produced during offline analysis may then be used during online operation to perform lightweight feature extraction and threshold comparison.

The compositional exposure subsystem may implement feature identification through activation patching with contrastive datasets requiring 2-4 weeks of offline analysis per feature. Activation patching may be a mechanistic interpretability technique that identifies which neurons are causally responsible for specific behaviors by systematically modifying activations and observing the effects on model outputs. The activation patching process may require contrastive datasets comprising positive examples that exhibit a target behavior and negative examples that do not exhibit the target behavior. Human annotators may label examples based on domain expertise to create the contrastive datasets. The activation patching analysis may run across all layers of the neural network, performing thousands of forward passes to identify which neurons show differential activation between positive and negative examples. The analysis may identify candidate features, determine thresholds through receiver operating characteristic (ROC) analysis, and validate causality through ablation studies that confirm the identified neurons are causally responsible for the behavior rather than merely correlated with the behavior. The 2-4 week duration for offline analysis per feature may reflect the computational cost of performing thousands of forward passes, the time required for human annotation of contrastive datasets, and the iterative refinement needed to achieve reliable feature identification.

The offline feature identification phase may not be performed during runtime operation for several reasons. Activation patching may require thousands of forward passes through the network, which may take hours to days of computation. The process may require labeled data with ground truth annotations that are not available during runtime. Multiple rounds of hypothesis testing and iterative refinement may be needed to achieve reliable identification. Causal validation through ablation studies may require controlled experiments that cannot occur during live operation. By performing feature identification offline, the compositional exposure subsystem may enable thorough analysis without runtime constraints while producing feature specifications that enable fast online extraction.

The compositional exposure subsystem may implement online feature extraction within 50 milliseconds by performing a single forward pass through the policy network inside a TDX enclave. The online feature extraction may use the pre-computed feature specifications from the offline analysis phase to perform lightweight extraction at runtime. The online phase may be fast because the extraction requires only a single forward pass through the network with no search or optimization. The computation may be deterministic, and memory requirements may be minimal since only the identified neuron indices need to be stored. The feature extraction may run inside an Intel TDX (Trust Domain Extensions) enclave that provides hardware-enforced isolation. The TDX enclave may provide memory encryption, isolation from kernel and hypervisor, and attestation proving code integrity. Even an adversary with root access to the operating system may not be able to modify the extraction logic or falsify results because the extraction executes within the hardware-enforced isolation boundary of the TDX enclave.

During online feature extraction, when a current state arrives from sensors, the TDX enclave may perform a forward pass through the policy network and capture activations at the pre-identified layers and neurons specified in the feature specifications. For each monitored feature, the compositional exposure subsystem may compute a mean activation of the relevant neurons and compare the activation against the pre-determined threshold from the feature specifications. The comparison may determine whether the activation level of the learned internal representation exceeds the threshold that indicates the safety-critical feature is active.

The constraint enforcement subsystem may block command execution when any such activation exceeds a corresponding hardware-stored semantic threshold. The semantic thresholds may be stored in hardware-protected storage that cannot be modified by software executing at any privilege level. When the compositional exposure subsystem determines that an activation level of a learned internal representation identified as safety-critical exceeds the corresponding hardware-stored semantic threshold, the constraint enforcement subsystem may block the command that would result from the current state. The blocking may occur through hardware-enforced paths that cannot be bypassed by software. The TDX enclave performing the feature extraction may refuse to produce the attestation required to unlock actuators when any semantic feature exceeds its threshold. The command may be blocked at the hardware level with an unforgeable audit trail indicating which feature caused the block.

The hardware attestation of activation levels may ensure that the activation measurements cannot be manipulated by software to circumvent semantic threshold enforcement. The activation levels may be computed within the hardware-enforced isolation boundary of the TDX enclave, and the computed values may be signed using cryptographic keys protected by the hardware trust anchor. The hardware attestation may provide cryptographic proof that the activation levels were computed correctly from actual neural network activations rather than from values that could be manipulated by software.

The hardware-enforced trust system may implement per-action cryptographic certification with TPM-signed attestation proving that semantic bounds, uncertainty-adaptive ceiling, compositional bounds, and physical exposure limits were all satisfied at the moment of execution. For each action that is permitted to execute, the hardware-enforced trust system may generate a cryptographic certification that attests to the safety checks that were performed and satisfied. The certification may be signed by a Trusted Platform Module (TPM) to provide non-repudiable proof of the attestation. The TPM-signed attestation may prove that the semantic bounds enforced through learned feature thresholds were satisfied, that the uncertainty-adaptive ceiling selected based on the hardware-attested uncertainty metric was not exceeded, that the compositional bounds computed from component exposure bounds were satisfied, and that the physical exposure limits enforced by the compositional exposure subsystem were not exceeded. The per-action cryptographic certification may provide an auditable record demonstrating that each permitted action satisfied all applicable safety constraints at the moment of execution.

The per-action cryptographic certification may enable post-hoc verification that the hardware-enforced trust system operated within its specified bounds. External parties may verify the TPM-signed attestations to confirm that actions were permitted only when all safety checks were satisfied. The cryptographic nature of the attestations may ensure that the attestations cannot be forged or modified after generation. The per-action granularity of the certifications may enable detailed audit trails that document the safety status of the system at each action execution.

The combination of offline feature identification, online feature extraction within a TDX enclave, hardware-stored semantic thresholds, and per-action cryptographic certification may provide hardware-enforced semantic safety guarantees for AI systems. The offline analysis may identify which neural network activations correspond to safety-critical behaviors. The online extraction may measure those activations in real-time within a hardware-isolated environment. The hardware-stored thresholds may define the bounds on permissible activation levels. The constraint enforcement subsystem may block commands when activations exceed thresholds. The per-action attestation may provide cryptographic proof that all bounds were satisfied for each permitted action. Together, these mechanisms may extend hardware-enforced exposure bounds from physical properties to semantic properties of AI system behavior.

In some embodiments, the compositional exposure subsystem may extend beyond the offline-only feature identification described above to include an online mechanistic interpretability engine that discovers and validates safety-critical features causally at runtime speeds within hardware-enforced trust boundaries. The offline feature identification described in the preceding paragraphs identifies a static set of features during a research phase lasting 2-4 weeks per feature. However, neural networks operating in open-ended environments may develop or encounter activation patterns that were not present in the offline training distribution. A novel activation pattern that was not characterized during the offline phase may correspond to a safety-critical behavior that the static feature set does not monitor. The online mechanistic interpretability engine may address this limitation by performing causal feature discovery and statistical validation during runtime operation within the existing latency budget.

In some embodiments, the online mechanistic interpretability engine may operate within a trusted execution environment such as an Intel TDX trust domain, a secure enclave, an ARM TrustZone environment, and/or other hardware-isolated execution environment. The engine may comprise one or more modules configured to perform functions including causal attribution computation, baseline tracking and divergence detection, feature discovery and dictionary learning, statistical confidence estimation, evidence aggregation, and hardware-attestable output generation. In some embodiments, these functions may be implemented by modules such as a gradient-based causal attribution module, a contrastive baseline tracking module, an incremental sparse dictionary learning module, a statistical confidence bound module, a causal evidence aggregation module, and/or a hardware-attestable evidence generator. Other module configurations and architectures may be suitable for different applications, and the specific module boundaries and responsibilities may vary based on implementation requirements. These modules may execute within the hardware-enforced isolation boundary of the trusted execution environment such that the host operating system cannot read enclave memory, cannot modify enclave code, cannot forge attestation outputs, and cannot manipulate baseline statistics, dictionary parameters, or calibration thresholds. The online mechanistic interpretability engine may produce hardware-attestable evidence of causal feature activations that composes with the existing exposure bound enforcement through restrictive combination logic.

In some embodiments, the online mechanistic interpretability engine may approximate causal interventions during a single forward-backward pass through the neural network, eliminating the requirement for the thousands of forward passes needed by offline activation patching. Traditional causal analysis techniques such as ablation studies and activation patching require multiple forward passes through the network to measure the effect of removing or modifying individual features, which may take hours to days of computation and cannot operate within runtime latency constraints. The gradient-based causal attribution module may approximate these causal interventions by computing gradient-based influence scores during a single backward pass that is performed concurrently with the forward pass already required for inference.

The gradient-based causal attribution module may implement a gradient-based attribution method such as Integrated Gradients, GradCAM, DeepLIFT, SHAP, and/or other saliency-based methods suitable for computing feature-level causal influence scores. In some embodiments, the gradient-based causal attribution module may implement an Integrated Gradients method with counterfactual baseline anchoring. For a neural network f with input x and internal feature activations h_i at monitored layers, the causal attribution score A_i for feature i may be computed as the product of the gradient of the network output with respect to the feature activation and the difference between the current feature activation and a baseline activation: A_i=∇_{h_i}f(x)·(h_i-h_i^{baseline}). The gradient ∇_{h_i} f(x) may be computed via backpropagation during the single backward pass. The baseline activation h_i^{baseline} may be maintained by the contrastive baseline tracking module described below. The Integrated Gradients method may apply path integration approximation using cached gradient statistics to reduce saturation artifacts that arise in deep networks.

The causal attribution score A_i may approximate the causal effect that would be measured by a full ablation study, which computes CausalEffect(h_i)=f(x)−f(x|h_i←baseline). The approximation may be valid as a first-order Taylor expansion of the intervention effect, where the gradient measures the sensitivity of the output to feature changes and the baseline anchoring provides the counterfactual reference. In some implementations, the approximation may exhibit high correlation (for example, $\rho>0.85$) with full ablation studies performed during offline validation, though the correlation level achieved may vary based on model architecture, feature characteristics, and operational context. The approximation may preserve the rank ordering of causal importance among features and may satisfy the implementation invariance and sensitivity axioms required for attribution methods.

The computational overhead of the gradient-based causal attribution may vary based on hardware configuration, model size, and deployment context. In some embodiments, the computational overhead may be approximately 50% of a single forward pass time, corresponding to approximately $10^{-25}$ milliseconds depending on model architecture. The backward pass for gradient computation may require approximately 1.5 times the forward pass computation in some configurations. The attribution computation itself may be O(n) where n is the number of monitored features. Sparse gradient computation may be applied to compute gradients only for critical layers, and quantized arithmetic using reduced precision formats (such as INT8, INT4, FP16, BF16, and/or other precision formats suitable for the hardware and accuracy requirements) may be applied to the attribution computation to achieve further speedup. In some embodiments, the total overhead of the causal attribution module may fit within a 20-millisecond budget that, combined with a 30-millisecond budget for the forward pass, feature extraction, and uncertainty quantification, maintains the total latency within 50 milliseconds. Other timing budgets and latency targets may be appropriate for different hardware configurations and deployment scenarios.

In some embodiments, the online mechanistic interpretability engine may maintain a running behavioral baseline representing normal, safe operation for causal divergence detection. The contrastive baseline tracking module may maintain per-layer, per-neuron statistics including the mean μ_i, standard deviation σ_i, median m_i, and 5th/95th percentile values for feature activations observed during verified safe operation. In some embodiments, verified safe operation may correspond to operation where the trust metric exceeds a threshold and cumulative exposure remains below the exposure bound, as described elsewhere herein. The baseline statistics may be initialized during an offline calibration phase by collecting activation distributions over safe, validated trajectories and may be stored within hardware-protected storage within the trusted execution environment.

The baseline statistics may be updated online using an exponential moving average with safety gating. The adaptation rule may be: μ_i^{(t+1)}=α·h_i^{(t)}+(1−α)·μ_i^{(t)} if the current trajectory is verified safe, or μ_i^{(t+1)}=μ_i^{(t)} if the current trajectory is unsafe or anomalous. In some embodiments, the adaptation rate a may be set to 0.001 for slow drift tracking, enabling the baseline to adapt to gradual distributional shifts in the operational environment while maintaining stability. The adaptation rate may vary based on the expected rate of distributional shift, operational requirements, and/or application domain. The safety gating may prevent adversarial baseline poisoning by requiring hardware-verified safety signals before permitting baseline updates. The safety verification may confirm that no existing violations are active, that behavioral metrics are within normal range, and that the system is in a verified safe operating mode.

The contrastive baseline tracking module may compute a divergence metric for each monitored feature using a statistical divergence measure. In some embodiments, the divergence metric D_i may be computed as the absolute difference between the current activation and the baseline mean, normalized by the baseline standard deviation: D_i=|h_i^{(t)}−μ_i^{(t)} |/(σ_i^{(t)}+8), where & is a small constant preventing division by zero. Other statistical divergence measures, such as Mahalanobis distance, KL divergence, and/or other distributional distance metrics, may alternatively be used. The module may further compute a causal divergence score CausalDiv_i as the product of the divergence metric and the absolute causal attribution score: CausalDiv_i=D_i·|A_i|. A high causal divergence score may indicate a feature that is both statistically anomalous relative to the safe baseline and causally influential on the network output, which may represent a safety-critical deviation. A high divergence score with low causal attribution may indicate distributional shift that does not causally affect outputs, while low divergence may indicate normal operation.

The baseline statistics may be stored in hardware-protected storage within the trusted execution environment with cryptographic hash integrity verification. A cryptographic hash such as SHA-256, SHA-3, BLAKE2, and/or other suitable cryptographic hash functions may be used to compute a hash of the baseline state that may be included in every hardware attestation, providing tamper-evident protection such that any modification to baseline statistics by an adversary would be detectable through hash mismatch. Updates to baseline statistics may be gated by hardware-verified safety signals, and the update logic may execute entirely within the enclave isolation boundary such that the host operating system cannot modify baseline values, adaptation rates, or safety gating logic.

In some embodiments, the online mechanistic interpretability engine may discover novel features not characterized during the offline analysis phase through incremental sparse dictionary learning performed at inference time. The incremental sparse dictionary learning module may implement a sparse autoencoder framework with an overcomplete dictionary D∈ℝ^{d×k} where k>>d, trained initially on safe trajectory datasets during the offline phase. The sparse autoencoder may encode activations h=f_{encoder}(x) and decode reconstructions x̂=f_{decoder}(h), with a sparsity penalty L=|x−x̂|_2+λ||h||_1 where λ controls the sparsity of the learned representation. Each encoder dimension may represent a learned feature, sparse activations may indicate feature presence, and decoder weights may reveal feature semantics.

In some embodiments, the incremental sparse dictionary learning module may implement dictionary learning using methods such as sparse autoencoders, K-SVD, online dictionary learning variants, non-negative matrix factorization, and/or other sparse coding approaches suitable for learning overcomplete representations of activation patterns. The choice of dictionary learning method may depend on the computational budget, the characteristics of the activation patterns, and/or the requirements of the deployment environment.

The dictionary may be updated incrementally during online operation. Every N inference steps, where N may be set to 100 by default, the module may accumulate activation statistics in a buffer and perform an incremental dictionary update. The update may compute reconstruction error between the current activations and their dictionary reconstruction, identify novel patterns exhibiting high reconstruction residual (||h−D·sparse_code (h)||>τ_{residual}), extract principal components from the novel patterns, and append new dictionary atoms representing the discovered patterns. Inactive atoms with usage below a pruning threshold may be removed to prevent dictionary bloat and maintain computational budget.

A novel feature may be flagged for further evaluation when it satisfies four criteria: high reconstruction residual indicating the pattern is not representable by existing dictionary atoms, consistent activation pattern appearing in multiple consecutive timesteps, high causal attribution score when active as computed by the gradient-based causal attribution module, and semantic distinctness from existing dictionary atoms as measured by correlation below a semantic distinctness threshold (for example, 0.7) with all existing atoms. The semantic distinctness threshold may vary based on application requirements, the characteristics of the feature space, and/or the desired sensitivity for detecting novel features. A novel feature satisfying these criteria and additionally exhibiting causal divergence above a critical threshold with statistical confidence above a confidence threshold may be classified as safety-critical and added to the monitored feature set. The critical threshold and confidence threshold may be configured based on the desired tradeoff between false positive and false negative rates, with lower thresholds increasing sensitivity at the cost of more false positives and higher thresholds reducing false positives at the cost of potentially missing safety-critical features.

The computational cost of incremental dictionary learning may be amortized across inference steps. In some embodiments, the encoder forward pass may require approximately 5 milliseconds for a dictionary of 4,096 atoms with feature dimension 256. The dictionary update may be performed every N=100 timesteps, with average overhead of less than 1 millisecond per inference step. The dictionary, encoder weights, atom usage statistics, and pruning metadata may be stored within hardware-protected storage within the trusted execution environment, with a memory footprint of approximately 200 megabytes in some configurations. The maximum dictionary size may be 4,096 atoms, with a maximum of 100 novel features tracked simultaneously and a rate limit of 10 novel features discovered per hour to prevent adversarial feature injection. These values are examples for a particular configuration, and other values may be appropriate for different deployments, hardware configurations, and application requirements.

In some embodiments, the online mechanistic interpretability engine may flag safety-critical features without requiring ground truth labels through a multi-layered statistical confidence framework that bounds the false positive rate. The statistical confidence bound module may provide distribution-free guarantees on the probability of incorrectly flagging safe features as unsafe, enabling unsupervised safety monitoring during runtime operation.

For features that were characterized during the offline analysis phase, the module may apply conformal prediction thresholds. During offline calibration, the module may collect causal attribution score distributions for safe trajectories $F_{safe}(\alpha)$ and unsafe trajectories $F_{unsafe}(\alpha)$ on a validation set with known labels. The module may set a threshold $\tau_{\alpha}$ such that $P(A_i>\tau_{\alpha} \mid safe)<\alpha$, where a is the target false positive rate. During online operation, the module may compare observed attribution scores against the calibrated threshold and flag features with confidence $1-\alpha$ when the threshold is exceeded. The conformal prediction framework may provide distribution-free false positive rate guarantees without assumptions about the underlying data distribution.

For novel features discovered by the incremental dictionary learning module that lack offline calibration, the module may apply a sequential hypothesis testing approach. In some embodiments, the module may apply a Sequential Probability Ratio Test (SPRT), though other sequential testing methods such as CUSUM, Shiryaev-Roberts procedure, and/or other sequential hypothesis testing approaches may alternatively be used. The SPRT may compute the likelihood ratio $A_t=P(A_1, \ldots, A_t \mid H_{unsafe})/P(A_1, \ldots, A_t \mid H_{safe})$ at each timestep and apply the decision rule: if $A_t> (1-B)/a$, flag as unsafe (reject $H_{safe}$); if $A_t<B/(1-a)$, accept as safe; otherwise, continue collecting evidence. In some embodiments, the SPRT parameters may be set to $\alpha=0.01$ (false positive rate) and $\beta=0.05$ (false negative rate), with expected samples to decision of approximately 20-50 timesteps corresponding to 2-5 seconds at 10 Hz operation. The SPRT parameters may be configured based on application requirements and the desired tradeoff between false positives and false negatives. For features exhibiting extreme divergence (for example, $D_i>3G$), the critical evidence threshold may be reduced (for example, to 10 timesteps), though these values may vary based on the sensitivity requirements of the deployment context.

The statistical confidence bound module may apply multi-hypothesis correction when testing multiple features simultaneously. In some embodiments, the module may implement a Benjamini-Hochberg procedure for false discovery rate control, sorting p-values and rejecting hypotheses according to the corrected threshold. Other multi-hypothesis correction methods, such as Bonferroni correction, Holm-Bonferroni, and/or other false discovery rate control procedures, may alternatively be used. An adaptive threshold $\tau_{adaptive}/{(t)}=\tau_{\alpha}\cdot(1+B.\ \log\ (k^{(t)}/k_0))$ may adjust for the growing number of monitored features $k^{(t)}$. The module may further require temporal consistency such that a feature must appear in a minimum number of consecutive timesteps (for example, at least 3 consecutive timesteps) to be flagged, reducing the effective false positive rate to approximately «^3 for independent errors. The number of required consecutive timesteps may vary based on application requirements and the desired balance between detection latency and false positive reduction. Multi-modal evidence agreement across attribution, divergence, and sparsity modalities may reduce the false positive rate exponentially. The composite false positive rate bound may be $FPR_{total}\leq\alpha\cdot(1+\log\ (k)/k)\ (1-(1-a)\sqrt{}3)\sim3a^2$, yielding approximately $3\times10^{-6}$ for $\alpha=0.01$ with $k=1000$ monitored features. The false positive rate parameters, calibration thresholds, and SPRT state may be stored in hardware-protected storage within the trusted execution environment with threshold violations logged to TPM Platform Configuration Registers.

In some embodiments, the online mechanistic interpretability engine may aggregate evidence from multiple sources into a composite causal evidence score for each monitored feature. The causal evidence aggregation module may aggregate evidence using various methods, such as weighted linear combination, multiplicative combination, maximum/minimum functions, neural network-based fusion, and/or other multi-modal fusion techniques. In some embodiments, the causal evidence aggregation module may compute $CausalEvidence_i=w_A\cdot A_i+w_D.\ D_i+w_S.\ S_i+w_T.\ T_i+w_B.\ B_i$, where $A_i$ is the gradient attribution score, $D_i$ is the contrastive divergence score, $S_i$ is the dictionary sparsity score reflecting feature selectivity, $T_i$ is the temporal consistency score reflecting sustained activation pattern, and $B_i$ is the behavioral correlation score reflecting correlation with unsafe outcomes. Other evidence components may be included, and the specific set of components may vary based on application requirements. The weights $w_A$, $w_D$, $w_S$, $w_T$, $w_B$ may be learned offline using methods such as logistic regression, gradient boosting, neural networks, Bayesian optimization, and/or manual tuning based on domain expertise. The multi-modal fusion may enable detection of safety-critical features that exhibit weak signals in any single modality but strong combined evidence across modalities.

The online mechanistic interpretability engine may produce hardware-attestable evidence structures that are signed by the Trusted Platform Module. Each attestation may include feature activation vectors, causal attribution scores, causal divergence scores, confidence bounds computed via conformal prediction or sequential testing, threshold violation flags identifying features exceeding safety-critical thresholds, a cryptographic hash (such as SHA-256, SHA-3, BLAKE2, and/or other suitable cryptographic hash functions) of the baseline state, the current dictionary version, and the guaranteed false positive rate. The attestation may be unforgeable due to TPM signature, tamper-evident due to baseline hash verification, auditable through the complete evidence trail, and composable with existing hardware-enforced trust system attestations through inclusion in the same attestation structure.

In some embodiments, the online mechanistic interpretability engine may operate as a composable enforcement primitive within the existing hardware-enforced trust architecture. The causal feature monitoring primitive may compose with existing exposure bound enforcement through composition logic that determines whether an action is permitted based on multiple enforcement conditions. In some embodiments, the composition logic may implement restrictive combination logic such that an action is permitted if and only if: the cumulative exposure remains below the exposure ceiling, the operation rate remains below the rate limit, the uncertainty metric remains below the uncertainty threshold, and the set of causal violations detected by the online mechanistic interpretability engine is empty (or below a violation count threshold, or has aggregate violation severity below a severity threshold, and/or satisfies other graduated response criteria). Other composition approaches may be suitable for different applications, such as weighted combination where different enforcement conditions contribute weighted scores to an aggregate permission decision, hierarchical evaluation where conditions are evaluated in priority order with early termination, threshold-based combination where a minimum number of conditions must be satisfied, and/or other policy-based composition methods. The restrictive combination may ensure that the online mechanistic interpretability evidence imposes additional constraints that cannot weaken the guarantees provided by existing enforcement primitives.

When the online mechanistic interpretability engine detects a causal violation but the existing exposure bound enforcement would permit the action, the action may be blocked. The causal evidence may suggest unsafe behavior despite the action passing semantic threshold checks derived from the static offline feature set. Conversely, when the online mechanistic interpretability engine detects a flagged feature with low confidence, the system may respond in various ways based on the confidence level and application requirements. In some embodiments, the action may be permitted with a warning and the evidence may be logged for offline investigation. In other embodiments, the system may request additional confirmation before permitting the action, reduce operational capability while permitting limited actions, temporarily increase monitoring sensitivity, and/or apply other graduated responses appropriate to the confidence level. When multiple weak causal signals are detected, the evidence may be aggregated via the fusion formula and the action may be blocked if the combined score exceeds the critical threshold.

The online mechanistic interpretability engine may further integrate with the uncertainty-adaptive exposure bounds of the existing framework. When the existing distributional shift detection mechanism identifies a shift, the causal divergence threshold may be tightened by a factor proportional to the detected shift magnitude, the confidence requirement may be increased by adjusting the false positive rate parameter (for example, by halving the false positive rate parameter, though other adjustment factors may be appropriate based on the severity of the detected shift and application requirements), and the baseline tracking window may be expanded to collect more evidence before adaptation. In the reverse direction, sustained causal anomalies detected by the online mechanistic interpretability engine may trigger the existing framework's recalibration alarm, informing the uncertainty quantification module that the operational distribution may have shifted.

In some embodiments, the online mechanistic interpretability engine may implement a safety-gated protocol for novel feature discovery that prevents adversarial feature injection. Novel features may only be added to the monitored feature set when the system is in a verified safe mode. In some embodiments, verified safe mode may require that no existing violations are active, that behavioral metrics are within normal range, and optionally that a human operator has approved the addition for critical systems. Other conditions for verified safe mode may be included based on application requirements, such as requiring the trust metric to exceed a threshold, requiring cumulative exposure to be below a specified level, and/or other safety verification criteria. The novel feature discovery may be rate-limited to prevent adversarial feature injection. In some embodiments, the rate limits may include a maximum of 10 novel features per hour and a maximum of 100 novel features total, though these values may vary based on computational resources, security requirements, and/or application domain. When the maximum number of tracked features is reached, pruning may be performed to remove features. In some embodiments, pruning may remove the oldest and least-used features. Other pruning strategies may alternatively be used, such as pruning based on lowest causal attribution scores, lowest confidence scores, highest reconstruction error, and/or other relevance metrics.

When a novel feature is flagged as safety-critical through the sequential statistical test described above with sufficient confidence, the online mechanistic interpretability engine may trigger an offline validation investigation. The offline validation may include various steps based on validation requirements and available resources. In some embodiments, the offline validation may collect trajectory data around the novel feature activation, perform full causal intervention studies including ablation and activation patching, validate statistical significance with ground truth labels, update the feature library and calibration thresholds, and push updated parameters to the enclave through a secure update channel. Other validation approaches may be suitable, and the specific steps may vary based on the validation requirements, available computational resources, and the characteristics of the novel feature. The offline validation may convert novel features into calibrated features with conformal prediction thresholds, enabling immediate single-timestep flagging in subsequent operation rather than the sequential test described above that may be required for novel features.

In some embodiments, the online mechanistic interpretability engine may assign provisional semantic labels to novel features discovered at runtime by comparing their learned representations against the representations of known, offline-characterized semantic features. The offline feature identification phase described in the preceding paragraphs may produce, for each known safety-critical feature, a decoder weight vector that encodes the semantic structure of the feature. The decoder weight vector may represent the directions in activation space along which the feature varies, encoding the semantic meaning of the feature in terms of its relationship to the underlying neural network representations. A known feature identified as corresponding to aggressive behavior, for example, may have a decoder weight vector that points in a direction associated with activation patterns observed during aggressive outputs.

When the incremental sparse dictionary learning module discovers a novel feature, the novel feature may also have an associated decoder weight vector derived from the dictionary atom added to represent the novel pattern. The online semantic similarity mapping module may compute a similarity or distance metric between the novel feature's decoder weight vector and each known feature's decoder weight vector. In some embodiments, the module may compute a cosine similarity: $\mathrm{Sim}(f_{novel}, f_{known}) = (w_{novel} \cdot w_{known})/(|w_{novel}| \cdot |w_{known}|)$, where $w_{novel}$ and $w_{known}$ are the respective decoder weight vectors. Other similarity or distance metrics, such as Euclidean distance, Manhattan distance, Mahalanobis distance, learned similarity functions, and/or other vector similarity measures, may alternatively be used. If the maximum similarity across all known features exceeds a semantic matching threshold $\tau_{sim}$, the novel feature may be assigned a provisional semantic label corresponding to the known feature with the highest similarity. In some embodiments, the semantic matching threshold $\tau_{sim}$ may be set to 0.7 by default, indicating that the novel feature's decoder representation shares at least 70% directional alignment with a known feature's semantic structure. The semantic matching threshold may vary based on application requirements, the characteristics of the feature space, and/or the desired tradeoff between matching sensitivity and specificity.

The provisional semantic label may determine which enforcement threshold is applied to the novel feature during the period between online discovery and offline validation. A novel feature provisionally labeled as semantically similar to a known aggression feature may inherit the aggression feature's semantic threshold, optionally tightened by a configurable safety margin factor to account for the uncertainty inherent in provisional labeling. In some embodiments, the safety margin factor may reduce the inherited threshold by a percentage proportional to the inverse of the similarity score, such that lower-similarity matches receive more conservative thresholds. Other safety margin functions may alternatively be used, such as linear functions, step-wise functions, logarithmic functions, and/or other functions relating similarity to margin. The provisional labeling, similarity scores, inherited thresholds, and safety margin adjustments may be included in the hardware attestation structure to provide a complete audit trail of semantic interpretation decisions.

The semantic similarity computation may execute within a trusted execution environment, using the known feature decoder weight vectors stored in hardware-protected memory within the trusted execution environment during initialization. The computation may require $O(k \cdot d)$ operations per novel feature where k is the number of known features and d is the decoder weight dimension. In some embodiments, the computation may add less than 1 millisecond to the novel feature evaluation latency, though actual latency may vary based on hardware configuration, the number of known features, and the decoder weight dimension. The known feature decoder weight vectors may be cryptographically hashed alongside the baseline statistics, with the hash included in attestations to ensure that the semantic reference library cannot be manipulated by an adversary to cause novel features to inherit inappropriate thresholds.

In some embodiments, the online mechanistic interpretability engine may group novel features into semantic clusters with known features to enable structured enforcement across semantically related feature groups. The semantic clustering module may maintain a set of semantic clusters, each initially seeded by one or more known features that were identified during offline analysis as corresponding to the same semantic behavior category. Semantic behavior categories may include, for example, aggression, deception, resource hoarding, goal misalignment, reward hacking, or other behaviors identified as safety-relevant during system design. Each cluster may be associated with a cluster-level semantic threshold, a cluster-level enforcement policy, and a cluster centroid. In some embodiments, the cluster centroid may be computed as the mean of the decoder weight vectors of all features in the cluster. Other centroid or cluster representation methods, such as median, weighted mean, geometric mean, medoid, and/or other cluster representation approaches, may alternatively be used.

When a novel feature is discovered and assigned a provisional semantic label via the similarity mapping described above, the semantic clustering module may assign the novel feature to the cluster corresponding to its provisional label. The assignment may update the cluster centroid by incorporating the novel feature's decoder weight vector. In some embodiments, the update may use an incremental mean update, weighted by the similarity score to reduce the influence of weakly matched features. Other incremental update methods, such as exponential moving average, unweighted incremental mean, and/or other online clustering update methods, may alternatively be used. The cluster-level semantic threshold may be recomputed using an aggregation function that preserves the restrictiveness property. In some embodiments, the cluster-level semantic threshold may be recomputed as the minimum of the individual thresholds of all features in the cluster, ensuring that the cluster-level enforcement is at least as restrictive as the enforcement for any individual constituent feature. Other aggregation functions, such as weighted minimum, percentile-based thresholds, and/or other conservative aggregation methods, may alternatively be used while preserving the restrictiveness property. The cluster-level enforcement policy may specify the conditions under which enforcement is triggered. In some embodiments, the policy may specify whether a violation by any single feature in the cluster triggers enforcement, or whether aggregate cluster-level activation must exceed a cluster threshold. Other enforcement policies may alternatively be used, such as requiring a minimum number of features to exceed thresholds, weighted voting among cluster members, and/or other policy configurations. Novel features that do not match any known feature above the semantic matching threshold may be assigned to a designated uncharacterized cluster. The uncharacterized cluster may apply a default conservative threshold that is more restrictive than any behavior-specific threshold, reflecting the additional uncertainty associated with features whose semantic meaning is unknown. The uncharacterized cluster may be monitored with heightened scrutiny, with a lower causal divergence threshold triggering offline validation and with mandatory inclusion of uncharacterized feature evidence in every hardware attestation regardless of divergence level.

The semantic clustering may enable hierarchical enforcement policies where different semantic categories receive different enforcement responses. A feature cluster corresponding to deception behaviors may trigger immediate action blocking upon any member feature exceeding its threshold, while a feature cluster corresponding to minor behavioral drift may trigger logging and attestation without blocking. The cluster assignments, centroid values, and per-cluster enforcement policies may be stored in hardware-protected storage within the trusted execution environment and included in hardware attestations. Cluster membership may be updated incrementally as novel features are discovered and as offline validation reclassifies provisional labels, with all updates gated by the safety verification mechanisms described above.

In some embodiments, the online mechanistic interpretability engine may implement a three-tier semantic confidence classification that determines the enforcement response applied to each monitored feature based on the quality of semantic characterization available. The three tiers may represent graduated levels of confidence in the semantic interpretation of a feature, with each tier associated with distinct enforcement behaviors, threshold policies, and attestation requirements.

The first tier, designated "known semantic," may apply to features that were fully characterized during the offline analysis phase with ground truth labels, activation patching, ablation validation, and conformal prediction calibration. Known semantic features may be enforced using the pre-calibrated conformal prediction thresholds with single-timestep flagging capability, full confidence level (1-a where a is the calibrated false positive rate), and immediate enforcement upon threshold exceedance. The attestation for known semantic features may include the feature identifier from the offline feature library, the calibrated threshold, the observed activation, and the confidence level.

The second tier, designated "provisional semantic," may apply to novel features discovered online by the incremental dictionary learning module that have been assigned a provisional semantic label via the similarity mapping described above. Provisional semantic features may have a similarity score exceeding τ_{sim} with at least one known feature but have not yet undergone offline validation. Provisional semantic features may be enforced using the inherited threshold from the matched known feature, tightened by the safety margin factor, with the sequential statistical test providing additional confidence. The enforcement response for provisional semantic features may include both the inherited semantic threshold check and the causal divergence check, requiring both to be satisfied for enforcement to trigger. The attestation for provisional semantic features may include the provisional label, the similarity score, the matched known feature identifier, the inherited threshold with safety margin, and the sequential test state.

The third tier, designated "semanically uncharacterized," may apply to novel features that do not match any known feature above the semantic matching threshold. Semantically uncharacterized features may represent activation patterns that are both novel and semantically dissimilar to any known safety-critical behavior, which may indicate either a benign distributional shift or an entirely new category of safety-relevant behavior not anticipated during system design. Semantically uncharacterized features may be enforced using a default conservative threshold that is the most restrictive threshold in the system, a lower causal divergence trigger that initiates offline validation at a lower divergence level than would trigger validation for provisional or known features, and mandatory attestation inclusion regardless of divergence level. Semantically uncharacterized features may additionally trigger a priority offline validation request to reduce the time the feature remains in the uncharacterized tier.

The tier classification may be stored per feature in TDX enclave memory and may transition unidirectionally toward higher confidence: a feature may transition from semantically uncharacterized to provisional semantic upon similarity match with a newly added known feature, and from provisional semantic to known semantic upon completion of offline validation. Features may not transition from a higher-confidence tier to a lower-confidence tier, ensuring that the system's semantic knowledge is monotonically non-decreasing. The tier classification, transition history, and per-tier enforcement parameters may be included in hardware attestations to provide a complete audit trail of the semantic confidence state of all monitored features at each attestation point.

The graduated semantic confidence framework may compose with the existing uncertainty-adaptive exposure bounds of the hardware-enforced trust architecture. When the number of semantically uncharacterized features exceeds a configurable alarm threshold, the uncertainty-adaptive mechanism may tighten the global exposure ceiling to reflect the increased uncertainty about the semantic safety state of the system. Conversely, as novel features are validated and promoted to higher-confidence tiers through offline validation, the uncertainty-adaptive mechanism may relax the tightened ceiling, reflecting the improved semantic characterization. The alarm threshold, ceiling adjustment factors, and tier-to-uncertainty mapping may be hardware-protected parameters stored in TDX enclave memory that cannot be modified by software.

In some embodiments, a method for enforcing behavioral bounds during runtime operation of the hardware-enforced trust system may provide continuous enforcement of exposure bounds and trust thresholds through hardware mechanisms that operate independently of software control. The method may be performed by the hardware-enforced trust system during operation to ensure that each command is validated against behavioral bounds before execution and that revocation occurs automatically when triggering conditions are met.

The method for enforcing behavioral bounds during runtime operation may comprise receiving a command for execution. The command may originate from an AI system, an autonomous agent, a control algorithm, and/or another source that generates commands for the hardware-enforced trust system to evaluate and potentially execute. The command may specify an action to be performed, parameters for the action, a target for the action, and/or other information that defines what the command would accomplish if executed. The receiving of the command may occur through an interface that captures commands before the commands reach actuators, external systems, and/or other execution targets. In some embodiments, the receiving may be implemented using kernel-level interception mechanisms such as eBPF programs attached to syscall entry points that capture commands as syscalls before the syscalls execute.

The method may comprise computing a trust metric using a hardware trust anchor, wherein the computation cannot be observed or modified by software. The hardware trust anchor may compute the trust metric from physical observables within a hardware-enforced isolation boundary. The computation may occur within a trusted execution environment, a secure enclave, a hardware security module, and/or another hardware-isolated context that prevents software executing outside the isolation boundary from observing intermediate values, observing the final trust metric value before release through authorized channels, modifying the computation logic, and/or modifying the data used in the computation. The hardware-enforced isolation may ensure that even software executing with root access, kernel access, hypervisor access, and/or firmware access cannot observe or modify the trust metric computation. The trust metric may be computed from physical observables that arise from physical phenomena rather than deterministic computation, such that the trust metric reflects actual system state and cannot be spoofed by software emulation.

The method may comprise comparing cumulative exposure against a total exposure bound. The cumulative exposure may represent the total exposure accumulated by the system through previously executed commands. The total exposure bound may represent the maximum permissible cumulative exposure that the system may accumulate. The comparison may determine whether the current cumulative exposure has reached or exceeded the total exposure bound. The comparison may be performed by hardware logic that reads the cumulative exposure value from hardware-protected storage, reads the total exposure bound from hardware-protected storage, and compares the two values. The hardware implementation of the comparison may ensure that the comparison occurs through hardware mechanisms that cannot be bypassed by software.

The method may comprise permitting command execution only if the trust metric exceeds a threshold and cumulative exposure plus command exposure remains at or below the total exposure bound. The permitting of command execution may be conditioned on satisfaction of both a trust condition and an exposure condition. The trust condition may require that the trust metric computed by the hardware trust anchor exceeds a threshold value that represents a minimum acceptable level of system trustworthiness. The exposure condition may require that the sum of the current cumulative exposure and the exposure associated with the command does not exceed the total exposure bound. If both conditions are satisfied, the command may be permitted to execute. If either condition is not satisfied, the command may be blocked and may not execute. The dual-condition requirement may ensure that commands are permitted only when the system is sufficiently trustworthy and when executing the command would not cause cumulative exposure to exceed the bound.

The exposure associated with the command may be computed based on the nature of the command, the parameters of the command, and/or other factors that determine how much the command would contribute to cumulative exposure if executed. The computation of command exposure may be performed by hardware-enforced exposure functions that satisfy bound preservation and monotonicity properties. The sum of cumulative exposure and command exposure may be computed to determine the projected cumulative exposure that would result from executing the command. The comparison of projected cumulative exposure against the total exposure bound may determine whether the exposure condition is satisfied.

The method may comprise updating cumulative exposure in hardware-protected storage upon command execution. When a command is permitted to execute and the command executes successfully, the cumulative exposure may be updated to reflect the exposure contributed by the executed command. The update may add the command exposure to the cumulative exposure value stored in hardware-protected storage. The hardware-protected storage may enforce increment-only semantics such that the cumulative exposure value may only increase and cannot be decremented or reset by software. The update may be performed atomically to prevent race conditions and time-of-check-time-of-use vulnerabilities. The atomic update may ensure that the cumulative exposure value is consistent with the commands that have been executed and that no intermediate states are observable where the cumulative exposure does not reflect executed commands.

The method may comprise triggering hardware-enforced revocation of operational capability if the trust metric falls below the threshold or cumulative exposure reaches the total exposure bound. Hardware-enforced revocation may terminate the operational capability of the system through hardware mechanisms that cannot be prevented, delayed, or reversed by software. The triggering of revocation may occur in response to either of two conditions: the trust metric falling below the threshold, or cumulative exposure reaching the total exposure bound. When the trust metric falls below the threshold, the system may no longer be sufficiently trustworthy to continue operation, and revocation may terminate operational capability to prevent further actions by an untrustworthy system. When cumulative exposure reaches the total exposure bound, the system may have exhausted its exposure budget, and revocation may terminate operational capability to prevent further exposure accumulation beyond the bound.

The hardware-enforced revocation may be implemented through multiple independent hardware paths that each independently terminate operational capability. The multiple independent paths may provide defense-in-depth such that revocation occurs even if some paths are compromised or disabled. Each path may implement revocation through hardware mechanisms that execute independently of software control. In some embodiments, a first path may set an exposure ceiling value to zero in hardware registers, causing all subsequent commands to be rejected. In some embodiments, a second path may revoke cryptographic keys stored in hardware security modules, such that commands cannot be signed or verified. In some embodiments, a third path may terminate hardware-isolated execution environments, destroying the execution context for command processing. In some embodiments, a fourth path may trigger hardware watchdog mechanisms that force system state transitions independent of software control.

The comparing, permitting, updating, and triggering may occur through hardware-enforced paths that cannot be bypassed, modified, or disabled by software executing at any privilege level. The hardware-enforced paths may implement each operation through hardware mechanisms that operate independently of software control. Software executing at any privilege level-including software with root access, kernel access, hypervisor access, and/or firmware access—may not be able to bypass the hardware-enforced paths to circumvent the operations, may not be able to modify the hardware-enforced paths to change how the operations are performed, and may not be able to disable the hardware-enforced paths to prevent the operations from occurring.

The comparing of cumulative exposure against the total exposure bound may occur through a hardware-enforced path that reads values from hardware-protected storage and performs the comparison using hardware logic. Software may not be able to bypass the comparison to permit commands without checking exposure, may not be able to modify the comparison logic to change the comparison result, and may not be able to disable the comparison to skip exposure checking.

The permitting of command execution may occur through a hardware-enforced path that gates command execution based on the trust condition and the exposure condition. Software may not be able to bypass the gating to permit commands that fail the conditions, may not be able to modify the gating logic to change which commands are permitted, and may not be able to disable the gating to permit all commands regardless of conditions.

The updating of cumulative exposure may occur through a hardware-enforced path that writes to hardware-protected storage with increment-only semantics. Software may not be able to bypass the update to execute commands without incrementing exposure, may not be able to modify the update logic to change how exposure is incremented, and may not be able to disable the update to prevent exposure tracking.

The triggering of hardware-enforced revocation may occur through hardware-enforced paths that initiate revocation when triggering conditions are detected. Software may not be able to bypass the triggering to prevent revocation when conditions are met, may not be able to modify the triggering logic to change which conditions trigger revocation, and may not be able to disable the triggering to prevent revocation from occurring.

The method for enforcing behavioral bounds during runtime operation may be performed continuously as commands are received during system operation. Each command received by the system may be processed through the method, with the trust metric computed, cumulative exposure compared against the bound, command execution permitted or blocked based on the conditions, cumulative exposure updated upon execution, and revocation triggered if conditions warrant. The continuous enforcement may ensure that behavioral bounds are maintained throughout system operation and that revocation occurs promptly when triggering conditions are met.

The method may provide bounded exposure guarantees that persist regardless of the behavior of software executing on the system. Because the comparing, permitting, updating, and triggering occur through hardware-enforced paths that cannot be bypassed by software, the behavioral bounds may be enforced even if software components are compromised, behaving maliciously, and/or attempting to circumvent the bounds. The hardware enforcement may ensure that cumulative exposure cannot exceed the total exposure bound and that operational capability is revoked when the trust metric falls below the threshold, regardless of software behavior.

In some embodiments, a behavioral bounding system may comprise a software subsystem and a hardware enforcement subsystem that cooperate to enforce exposure bounds through a layered architecture wherein software performs policy evaluation and the hardware provides enforcement that cannot be circumvented by software. The behavioral bounding system may separate the functions of command evaluation and exposure determination, which may be performed by software, from the functions of exposure tracking and bound enforcement, which may be performed by hardware. The separation may enable flexible policy evaluation through software while providing hardware-enforced guarantees that cumulative exposure cannot exceed a bound regardless of software behavior.

The behavioral bounding system may comprise a software subsystem executing on a processor. The software subsystem may execute as one or more processes, threads, and/or modules within an operating system environment on a general-purpose processor. The software subsystem may be implemented using programming languages, libraries, frameworks, and/or other software development tools suitable for the deployment context. The software subsystem may execute with user-level privileges, kernel-level privileges, and/or other privilege levels depending on the system architecture and security requirements.

The software subsystem may be configured to receive operational commands. Operational commands may originate from AI systems, autonomous agents, control algorithms, user interfaces, external systems, and/or other sources that generate commands for the behavioral bounding system to process. The operational commands may specify actions to be performed, parameters for actions, targets for actions, timing requirements, and/or other information that defines what each command would accomplish if executed. The software subsystem may receive operational commands through application programming interfaces, inter-process communication mechanisms, network interfaces, file system interfaces, and/or other communication channels appropriate for the deployment context. The receiving of operational commands may include parsing command data, validating command format, authenticating command sources, and/or performing other preprocessing operations on received commands.

The software subsystem may be configured to evaluate commands against policy rules to determine command exposure values. Policy rules may specify constraints on system behavior, including permitted actions, prohibited actions, action parameters, resource limits, timing constraints, and/or other behavioral requirements. The policy rules may be expressed in configuration files, rule languages, policy specifications, and/or other formats that enable the software subsystem to evaluate commands against the rules. The software subsystem may evaluate each received command against the policy rules to determine whether the command complies with the rules and to compute an exposure value associated with the command.

The command exposure value may represent the contribution that executing the command would make to cumulative exposure. The exposure value may be computed based on the nature of the command, the parameters of the command, the current system state, the policy rules, and/or other factors that determine how much the command would contribute to exposure if executed. In some embodiments, the exposure value may be a scalar quantity representing a single dimension of exposure. In some embodiments, the exposure value may be a vector quantity representing multiple dimensions of exposure. The software subsystem may use the policy rules to map commands to exposure values according to the exposure accounting methodology specified by the policy rules.

The evaluation of commands against policy rules may include determining whether commands comply with the policy rules. Commands that violate policy rules may be rejected by the software subsystem without being transmitted to the hardware enforcement subsystem. Commands that comply with policy rules may be validated by the software subsystem and may be transmitted to the hardware enforcement subsystem along with the computed exposure values. The software subsystem may perform policy evaluation using rule engines, constraint solvers, lookup tables, and/or other evaluation mechanisms appropriate for the policy rule format and complexity.

The software subsystem may be configured to transmit validated commands and associated exposure values to a hardware enforcement subsystem. The transmission may occur through a communication interface between the software subsystem and the hardware enforcement subsystem. The communication interface may be implemented using memory-mapped registers, hardware mailboxes, dedicated communication channels, and/or other mechanisms that enable the software subsystem to send data to the hardware enforcement subsystem. The transmitted data may include the validated command, the computed exposure value, and/or other information that the hardware enforcement subsystem uses to perform enforcement. The transmission may include integrity protection mechanisms such as checksums, message authentication codes, and/or digital signatures that enable the hardware enforcement subsystem to verify that the transmitted data has not been corrupted or tampered with during transmission.

The behavioral bounding system may comprise a hardware enforcement subsystem comprising a hardware trust anchor. The hardware enforcement subsystem may be implemented using dedicated hardware components that provide enforcement functions independently of software control. The hardware trust anchor may be implemented using a trusted platform module, a secure element, a hardware security module, a hardware-based trusted execution environment, and/or other hardware security technology that provides a root of trust for the hardware enforcement subsystem. The hardware trust anchor may provide cryptographic functions, secure storage, attestation capabilities, and/or other security functions that support the enforcement operations of the hardware enforcement subsystem.

The hardware enforcement subsystem may be configured to maintain a cumulative exposure counter in hardware-protected non-volatile storage. The cumulative exposure counter may represent the total exposure accumulated by the system through previously executed commands. The hardware-protected non-volatile storage may be implemented using non-volatile memory within a trusted platform module, secure element, hardware security module, and/or other hardware component that provides protection against unauthorized access and modification. The non-volatile nature of the storage may ensure that the cumulative exposure counter persists across system reboots, power cycles, and/or other events that would cause volatile storage to lose its contents. The hardware protection of the storage may ensure that the cumulative exposure counter cannot be read, modified, reset, or bypassed by software executing at any privilege level.

The hardware enforcement subsystem may be configured to receive validated commands and exposure values from the software subsystem. The receiving may occur through the communication interface between the software subsystem and the hardware enforcement subsystem. The hardware enforcement subsystem may receive the validated command and the associated exposure value transmitted by the software subsystem. The hardware enforcement subsystem may verify the integrity of the received data using the integrity protection mechanisms included in the transmission. The hardware enforcement subsystem may process the received validated command and exposure value to perform enforcement operations.

The hardware enforcement subsystem may be configured to add the exposure value to the cumulative exposure counter. When the hardware enforcement subsystem receives a validated command with an associated exposure value, the hardware enforcement subsystem may compute a projected cumulative exposure by adding the exposure value to the current value of the cumulative exposure counter. The addition may be performed by hardware logic within the hardware enforcement subsystem. The projected cumulative exposure may represent the cumulative exposure that would result if the command were executed. The hardware enforcement subsystem may use the projected cumulative exposure to determine whether the command may be permitted to execute.

The hardware enforcement subsystem may be configured to compare the cumulative exposure counter against a hardware-stored total exposure bound. The total exposure bound may represent the maximum permissible cumulative exposure that the system may accumulate. The total exposure bound may be stored in hardware-protected storage within the hardware enforcement subsystem, such as non-volatile memory within a trusted platform module, secure element, and/or hardware security module. The hardware enforcement subsystem may compare the projected cumulative exposure against the total exposure bound to determine whether executing the command would cause cumulative exposure to exceed the bound. The comparison may be performed by hardware logic within the hardware enforcement subsystem.

The hardware enforcement subsystem may be configured to permit command execution only if the cumulative exposure counter does not exceed the total exposure bound. When the projected cumulative exposure does not exceed the total exposure bound, the hardware enforcement subsystem may permit the command to execute. Permitting command execution may include releasing the command to actuators, external systems, and/or other execution targets, updating the cumulative exposure counter to reflect the executed command, and/or generating attestation that the command was permitted after enforcement checks. When the projected cumulative exposure would exceed the total exposure bound, the hardware enforcement subsystem may not permit the command to execute. The conditional permitting of command execution may ensure that cumulative exposure cannot exceed the total exposure bound through command execution.

The hardware enforcement subsystem may be configured to reject commands if the cumulative exposure counter would exceed the total exposure bound, regardless of validation by the software subsystem. Even when the software subsystem has validated a command and transmitted the command to the hardware enforcement subsystem, the hardware enforcement subsystem may reject the command if executing the command would cause cumulative exposure to exceed the total exposure bound. The rejection may occur regardless of the validation performed by the software subsystem. The software subsystem's validation may confirm that the command complies with policy rules, but the hardware enforcement subsystem may independently enforce the total exposure bound. The independence of the hardware enforcement from software validation may ensure that the total exposure bound is enforced even if the software subsystem is compromised, behaving incorrectly, and/or attempting to circumvent the bound.

The total exposure bound and cumulative exposure counter cannot be read, modified, reset, or bypassed by the software subsystem or by any software executing at any privilege level. The hardware protection of the total exposure bound and cumulative exposure counter may ensure that software cannot access or manipulate these values to circumvent enforcement. Software executing at any privilege level-including software with user-level privileges, kernel-level privileges, hypervisor-level privileges, and/or firmware-level privileges—may not be able to read the total exposure bound to learn the configured limit, may not be able to read the cumulative exposure counter to learn the current exposure, may not be able to modify the total exposure bound to increase the limit, may not be able to modify the cumulative exposure counter to reduce the recorded exposure, may not be able to reset the cumulative exposure counter to zero, and may not be able to bypass the enforcement to execute commands without exposure checking. The hardware protection may be implemented through access controls enforced by the hardware trust anchor, through encryption of stored values, through physical isolation of storage from software-accessible memory, and/or through other hardware security mechanisms that prevent software access.

The software subsystem may not be able to read the total exposure bound or cumulative exposure counter. The hardware enforcement subsystem may not provide interfaces that allow software to query these values. The absence of read interfaces may prevent software from learning the configured limit or current exposure, which could be used to plan circumvention strategies and/or to infer information about system operation that may be sensitive.

The software subsystem may not be able to modify the total exposure bound or cumulative exposure counter. The hardware enforcement subsystem may not provide interfaces that allow software to write to these values. The absence of write interfaces may prevent software from increasing the limit to permit additional exposure, from decreasing the recorded exposure to create additional headroom, and/or from otherwise manipulating the values to circumvent enforcement.

The software subsystem may not be able to reset the cumulative exposure counter. The hardware enforcement subsystem may not provide interfaces that allow software to reset the counter to zero or to any other value. The absence of reset interfaces may ensure that exposure accumulation is irreversible during operation. Once exposure has been accumulated through command execution, the accumulated exposure may not be erased through software action.

The software subsystem may not be able to bypass the enforcement to execute commands without exposure checking. The hardware enforcement subsystem may be positioned in the command execution path such that commands cannot reach execution targets without passing through the hardware enforcement subsystem. The positioning of the hardware enforcement subsystem may ensure that software cannot route commands around the enforcement to execute commands without exposure checking.

The hardware enforcement subsystem may trigger irreversible revocation of operational capability upon the cumulative exposure counter reaching the total exposure bound. When the cumulative exposure counter reaches the total exposure bound, the hardware enforcement subsystem may initiate revocation that terminates the operational capability of the system. The revocation may be irreversible within an operational epoch such that once revocation is triggered, operational capability cannot be restored through software action. The irreversibility may ensure that a system that has exhausted its exposure budget cannot continue operation by reversing the revocation through software manipulation.

The irreversible revocation may be triggered through a hardware path that cannot be prevented or delayed by software. The hardware path may implement revocation through hardware mechanisms that operate independently of software control. Software executing at any privilege level may not be able to prevent the hardware path from triggering revocation when the cumulative exposure counter reaches the total exposure bound. Software may not be able to delay the revocation to permit additional commands before revocation takes effect. The hardware path may execute revocation promptly upon detecting that the cumulative exposure counter has reached the total exposure bound, without waiting for software authorization and/or without providing software an opportunity to intervene.

The hardware path for irreversible revocation may be implemented through various hardware mechanisms. In some embodiments, the hardware path may disable command execution by setting hardware registers that gate command flow to a disabled state. In some embodiments, the hardware path may revoke cryptographic keys required for command authorization such that commands cannot be signed or verified after revocation. In some embodiments, the hardware path may trigger hardware watchdog mechanisms that force system state transitions to a revoked state. In some embodiments, the hardware path may physically disconnect actuators and/or other execution targets from the command path. The hardware implementation of the revocation path may ensure that revocation occurs through mechanisms that software cannot control.

The irreversible revocation may terminate operational capability such that the system cannot execute further commands after revocation. The termination of operational capability may prevent the system from accumulating additional exposure beyond the total exposure bound. The system may remain in a revoked state until a recovery procedure is performed. The recovery procedure may require physical access, multi-party authorization, and/or other conditions that cannot be satisfied through software action alone. The recovery procedure may reset the cumulative exposure counter, restore operational capability, and/or reconfigure the system for continued operation. The requirement for a recovery procedure that cannot be performed through software alone may ensure that the irreversible revocation provides a durable termination of operational capability.

The behavioral bounding system may provide a layered architecture wherein software performs flexible policy evaluation while hardware provides enforcement that cannot be circumvented. The software subsystem may implement complex policy rules, may adapt to changing requirements, and may be updated to address new scenarios. The hardware enforcement subsystem may provide guarantees that cumulative exposure cannot exceed the total exposure bound regardless of software behavior. The combination of software flexibility and hardware enforcement may enable behavioral bounding systems that are both adaptable and secure.

In some embodiments, a method for modifying an exposure bound in a deployed hardware-enforced trust system may provide a secure protocol for updating exposure bounds while preserving guarantees that unauthorized bounds cannot become active during the modification process. The method may enable authorized modifications to exposure bounds in deployed systems while maintaining the security properties of the hardware-enforced trust architecture. The method may be performed when operational requirements change, when system configurations are updated, and/or when exposure allocations are adjusted for deployed systems.

The method for modifying an exposure bound in a deployed hardware-enforced trust system may comprise receiving a proposed exposure bound modification. The proposed exposure bound modification may specify a new exposure bound value that is proposed to replace a current exposure bound enforced by the deployed system. The proposed modification may be received through a secure interface that captures modification requests before the requests are processed by the modification protocol. The proposed modification may include the proposed new exposure bound value, an identifier for the exposure bound to be modified, a justification for the modification, and/or other information relevant to the modification request. The receiving of the proposed modification may include validating the format of the modification request, verifying that the proposed new exposure bound value is within permissible ranges, and/or performing other preliminary checks on the modification request.

The method may comprise collecting cryptographic signatures from at least a threshold number M of a total N authorized principals. The authorized principals may be individuals, roles, and/or entities that are authorized to approve modifications to exposure bounds in the deployed system. Each authorized principal may possess cryptographic credentials that enable the principal to generate cryptographic signatures attesting to the principal's approval of proposed modifications. The total number N of authorized principals may represent the complete set of principals who are authorized to participate in the modification approval process. The threshold number M may represent the minimum number of principals whose approval is required for a modification to proceed. The threshold number M may be less than or equal to the total number N, enabling modifications to proceed when at least M principals approve even if some principals are unavailable and/or decline to approve.

The collecting of cryptographic signatures may involve soliciting approval from the authorized principals, receiving cryptographic signatures from principals who approve the proposed modification, and accumulating the received signatures until at least M signatures have been collected. Each cryptographic signature may be generated using a private key held by the signing principal and may be verifiable using a corresponding public key that is registered with the deployed system. The cryptographic signatures may attest that the signing principals have reviewed the proposed modification and approve the modification proceeding. The collecting of signatures may continue until at least M valid signatures have been received from distinct authorized principals.

The threshold number M and the total number N may be hardware-enforced parameters. The hardware enforcement of M and N may ensure that software executing at any privilege level cannot modify the threshold number M to reduce the number of required approvals, cannot modify the total number N to change the set of authorized principals, and cannot bypass the threshold signature requirement to approve modifications without collecting the required number of signatures. The values of M and N may be stored in hardware-protected storage that cannot be read, modified, reset, or bypassed by software. The hardware enforcement of M and N may ensure that the threshold signature requirement remains effective regardless of software behavior.

In some embodiments, the hardware-enforced trust system may implement trust recovery through an M-of-N threshold signature ceremony using USB cryptographic keys such as YubiKey or Nitrokey, requiring physical presence of multiple authorized principals. The USB cryptographic keys may be hardware security tokens that store private keys in tamper-resistant hardware and that perform cryptographic operations using the stored keys without exposing the keys to software. YubiKey devices manufactured by Yubico and Nitrokey devices manufactured by Nitrokey GmbH may provide USB cryptographic key functionality suitable for threshold signature ceremonies. Each authorized principal may possess a USB cryptographic key that stores the principal's private key for generating cryptographic signatures.

The M-of-N threshold signature ceremony may require physical presence of at least M authorized principals, each with their respective USB cryptographic key. Physical presence may be required because the USB cryptographic keys may require physical interaction to generate signatures, such as touching a button on the device and/or entering a PIN on a connected terminal. The physical presence requirement may ensure that signatures cannot be generated remotely and/or automatically without the physical participation of the authorized principals. The ceremony may involve each participating principal physically connecting their USB cryptographic key to a terminal, authenticating to the key through PIN entry and/or biometric verification, reviewing the proposed modification, and authorizing the key to generate a signature approving the modification.

The method may comprise enforcing a timelock period during which the proposed modification remains pending and cannot be executed. The timelock period may represent a mandatory waiting period between the collection of sufficient signatures and the execution of the modification. During the timelock period, the proposed modification may remain in a pending state where the modification has been approved by at least M principals but has not yet taken effect. The timelock period may provide an opportunity for authorized principals to review the pending modification, for monitoring systems to detect anomalous modification requests, and/or for revocation of approval if circumstances change. The timelock period may have a duration specified in the system configuration, such as hours, days, and/or weeks depending on the security requirements of the deployment context.

The enforcement of the timelock period may be hardware-enforced such that software cannot bypass the timelock to execute modifications before the timelock period expires. The hardware enforcement may be implemented using hardware timers, hardware-attested time sources, and/or other hardware mechanisms that track the passage of time independently of software control. The hardware enforcement may ensure that even software executing with root access, kernel access, hypervisor access, and/or firmware access cannot cause the modification to execute before the timelock period has expired. The proposed modification may remain pending in hardware-protected storage during the timelock period, with the modification's execution blocked by hardware mechanisms until the timelock expires.

The method may comprise verifying consensus among authorized principals after expiration of the timelock period. After the timelock period expires, the method may verify that the required consensus for the modification still exists. The consensus verification may confirm that the cryptographic signatures collected earlier remain valid, that the signing principals have not revoked their approval, and/or that no conditions have arisen that would invalidate the modification. The consensus verification may provide a final check before the modification is executed, ensuring that the modification proceeds only if the required consensus persists through the timelock period.

The consensus verification may be hardware-enforced such that software cannot bypass the verification to execute modifications without confirming consensus. The hardware enforcement may ensure that the modification cannot execute unless the consensus verification succeeds. The hardware enforcement may be implemented using hardware logic that evaluates the consensus conditions and that gates the modification execution based on the evaluation result. Software may not be able to bypass the consensus verification to execute modifications that lack consensus, may not be able to modify the consensus verification logic to change the consensus requirements, and may not be able to disable the consensus verification to skip the verification step.

The method may comprise atomically transitioning from a current exposure bound to the proposed exposure bound upon successful verification. When the consensus verification succeeds after the timelock period expires, the method may execute the modification by transitioning from the current exposure bound to the proposed exposure bound. The transition may be atomic such that the system is never in an intermediate state where neither the current bound nor the proposed bound is in effect. The atomic transition may ensure that the exposure bound is always well-defined and that no window exists during which exposure enforcement is undefined and/or disabled.

The atomic transition may be implemented using hardware mechanisms that perform the bound update as a single indivisible operation. The hardware mechanisms may read the proposed exposure bound from pending storage, write the proposed exposure bound to the active bound storage, and clear the pending modification state as a single atomic operation. The atomic implementation may ensure that the transition completes fully or not at all, without intermediate states that could be exploited to circumvent exposure enforcement.

The method may preserve an authorization invariant such that at no point during the modification process can an unauthorized exposure bound become active. The authorization invariant may specify that only exposure bounds that have been properly authorized through the threshold signature process may become active in the deployed system. The preservation of the authorization invariant may ensure that the modification process cannot be exploited to activate unauthorized bounds, whether through manipulation of the modification protocol, exploitation of race conditions, and/or other attack vectors.

The preservation of the authorization invariant may be achieved through the combination of hardware-enforced threshold signatures, hardware-enforced timelock, and hardware-enforced consensus verification. The threshold signature requirement may ensure that only modifications approved by at least M authorized principals may proceed. The timelock enforcement may ensure that modifications cannot be rushed through without opportunity for review. The consensus verification may ensure that modifications execute only when consensus persists. Together, these hardware-enforced requirements may ensure that unauthorized bounds cannot become active at any point during the modification process.

The threshold signature requirement, timelock enforcement, and consensus verification may be hardware-enforced such that software cannot bypass any of these requirements. The hardware enforcement of all three requirements may ensure that the modification protocol maintains its security properties regardless of software behavior. Software executing at any privilege level may not be able to bypass the threshold signature requirement to approve modifications without collecting M signatures, may not be able to bypass the timelock enforcement to execute modifications before the timelock expires, and may not be able to bypass the consensus verification to execute modifications without confirming consensus. The comprehensive hardware enforcement may ensure that the modification protocol provides security guarantees that persist even under software compromise.

In some embodiments, the method may include additional security measures for the modification protocol. The method may include logging all modification requests, signature collections, timelock expirations, consensus verifications, and bound transitions to tamper-evident audit logs. The audit logs may enable post-hoc review of modification activity and may provide evidence for forensic analysis in the event of security incidents. The method may include notification mechanisms that alert authorized principals when modification requests are received, when signatures are collected, and/or when modifications are pending execution. The notifications may enable principals to detect unauthorized modification attempts and to revoke approval if appropriate.

In some embodiments, the method may include revocation capabilities that enable authorized principals to withdraw approval for pending modifications. A principal who has signed a modification request may be able to revoke the signature during the timelock period, causing the modification to fail consensus verification. The revocation capability may enable principals to respond to new information that arises after initial approval, such as discovery of errors in the proposed modification and/or changes in operational requirements. The revocation may be implemented through cryptographic revocation messages that are signed by the revoking principal and that invalidate the principal's earlier approval signature.

In some embodiments, the method may include escalation procedures for modifications that fail to collect sufficient signatures and/or that fail consensus verification. The escalation procedures may involve notifying system administrators, logging the failed modification attempt, and/or triggering security alerts. The escalation procedures may enable appropriate response to modification attempts that may indicate unauthorized activity and/or operational issues.

The method for modifying an exposure bound in a deployed hardware-enforced trust system may enable secure updates to exposure bounds while maintaining the security guarantees of the hardware-enforced trust architecture. The combination of threshold signatures, timelock enforcement, consensus verification, and hardware enforcement of all requirements may ensure that only properly authorized modifications may proceed and that unauthorized bounds cannot become active during the modification process.

In some embodiments, the hardware-enforced trust system may include a chip-scale atomic clock (CSAC) that provides a hardware-attested time source with bounded drift for timing-sensitive operations. A chip-scale atomic clock may provide a highly stable time reference that operates independently of external time sources and that cannot be manipulated by software. The CSAC may serve as the primary time source for enforcing timing constraints, timestamping actions, detecting replay attacks, and validating temporal ordering of events within the hardware-enforced trust system. The hardware-attested nature of the CSAC time source may ensure that time values provided by the CSAC reflect actual elapsed time rather than values that could be spoofed or manipulated by software executing at any privilege level.

In some embodiments, the CSAC may be implemented using a Microsemi SA.45s chip-scale atomic clock or similar device. The Microsemi SA.45s may provide timing with a drift bound of less than 4.3 microseconds per day. The drift bound may represent the maximum rate at which the CSAC time reference may deviate from true time over a 24-hour period. A drift bound of less than 4.3 microseconds per day may enable accurate timekeeping over extended periods without requiring frequent synchronization with external time sources. The bounded drift may ensure that timing constraints enforced using CSAC timestamps remain accurate within known tolerances, enabling the hardware-enforced trust system to maintain timing guarantees even during network partitions when external time synchronization is unavailable.

The CSAC may operate independently of software control such that software executing at any privilege level cannot modify the time values provided by the CSAC, cannot adjust the CSAC oscillator frequency, and cannot reset the CSAC to earlier time values. The independence from software control may ensure that the CSAC provides a trusted time reference that cannot be manipulated to circumvent timing-based constraints. The CSAC may interface with other components of the hardware-enforced trust system through hardware-protected communication channels that prevent interception or modification of time values by software.

In some embodiments, the hardware-enforced trust system may implement GPS synchronization for CSAC calibration with daily synchronization to maintain drift bounds. GPS satellites may provide highly accurate time references that are traceable to atomic time standards. The hardware-enforced trust system may include a GPS receiver that receives time signals from GPS satellites and that provides time references for calibrating the CSAC. Daily GPS synchronization may reset accumulated drift in the CSAC, ensuring that the CSAC time reference remains within the specified drift bound relative to true time. The daily synchronization interval may be sufficient to maintain timing accuracy given the CSAC drift bound of less than 4.3 microseconds per day, since accumulated drift over a 24-hour period may remain within acceptable tolerances for timing-sensitive operations.

The GPS synchronization may be performed automatically by hardware mechanisms that compare the CSAC time reference against GPS time and that adjust the CSAC calibration to minimize drift. The hardware implementation of GPS synchronization may ensure that the synchronization occurs reliably without depending on software to initiate or manage the synchronization process. In some embodiments, the GPS synchronization may be performed when GPS signals are available, with the CSAC operating in free-running mode using its internal oscillator when GPS signals are unavailable. The free-running mode may enable the hardware-enforced trust system to maintain timing capabilities during GPS outages, with timing accuracy degrading according to the CSAC drift bound until GPS synchronization is restored.

In some embodiments, the hardware-enforced trust system may include a quantum random number generator (QRNG) that provides entropy for cryptographic operations, commitment generation, and other functions requiring unpredictable random values. A quantum random number generator may derive randomness from quantum mechanical phenomena that are fundamentally unpredictable according to the laws of physics. The quantum origin of the randomness may provide assurance that the random values cannot be predicted or reproduced by any computational process, including processes with access to complete information about the state of the hardware-enforced trust system.

In some embodiments, the QRNG may be implemented using an ID Quantique Quantis device or similar quantum random number generator. The ID Quantique Quantis may use quantum shot noise arising from photon arrival times at a beam splitter to generate random numbers. The quantum shot noise may arise from the fundamental quantum mechanical uncertainty in photon detection events, providing randomness that is not deterministic and cannot be predicted from prior observations. The ID Quantique Quantis may provide entropy with min-entropy of at least 0.999 bits per bit. Min-entropy may represent a conservative measure of the randomness in the QRNG output, quantifying the unpredictability of the most predictable output value. A min-entropy of at least 0.999 bits per bit may indicate that the QRNG output is nearly maximally random, with negligible predictability that could be exploited by adversaries.

The QRNG may interface with the hardware-enforced trust system through a hardware interface such as USB or PCIe that provides random values to components requiring entropy. The QRNG may provide random values for generating cryptographic keys, generating nonces for commitment protocols, seeding pseudorandom number generators, and other applications requiring unpredictable random values. The hardware interface may provide random values at rates sufficient for the cryptographic and commitment operations performed by the hardware-enforced trust system.

In some embodiments, the hardware-enforced trust system may implement QRNG health monitoring using NIST SP 800-90B continuous health tests. NIST Special Publication 800-90B may specify requirements for entropy sources used in random bit generation, including continuous health tests that monitor the entropy source for failures or degradation. The continuous health tests may detect conditions where the QRNG output deviates from expected statistical properties, indicating potential failure or compromise of the entropy source. The health monitoring may enable the hardware-enforced trust system to detect QRNG failures and to respond appropriately, such as by switching to backup entropy sources or by halting operations that depend on high-quality randomness.

The NIST SP 800-90B continuous health tests may include a repetition count test and an adaptive proportion test. The repetition count test may detect conditions where the QRNG produces repeated identical outputs, which may indicate failure of the quantum randomness source. The repetition count test may track consecutive identical outputs and may trigger an alert when the count exceeds a threshold that would be statistically improbable for a properly functioning entropy source. The adaptive proportion test may detect conditions where the QRNG output exhibits statistical bias, with certain values appearing more frequently than expected for uniform random output. The adaptive proportion test may track the frequency of output values over a sliding window and may trigger an alert when the frequency distribution deviates significantly from the expected uniform distribution.

The QRNG health monitoring may be performed continuously during operation of the hardware-enforced trust system. Each random value obtained from the QRNG may be subjected to the continuous health tests before being used for cryptographic or commitment operations. The continuous monitoring may enable prompt detection of QRNG failures, limiting the exposure of the hardware-enforced trust system to operations performed with potentially compromised randomness. In some embodiments, the health monitoring may be implemented in hardware to ensure that the monitoring cannot be bypassed or disabled by software.

In some embodiments, the hardware-enforced trust system may include a hardware watchdog timer that monitors system operation and that triggers corrective action if the system fails to service the watchdog within a timeout period. A hardware watchdog timer may provide an independent monitoring mechanism that operates outside the control of the monitored software, enabling detection of software hangs, crashes, and other failure conditions that prevent normal operation. The hardware watchdog timer may serve as a backup enforcement mechanism that ensures the hardware-enforced trust system responds to failure conditions even when software-based monitoring is unavailable.

In some embodiments, the hardware watchdog timer may be implemented using a Maxim MAX6371 integrated circuit or similar device. The Maxim MAX6371 may be a hardware watchdog timer that monitors a watchdog input signal and that triggers a reset or interrupt output if the watchdog input is not toggled within a specified timeout period. The hardware-enforced trust system may configure the MAX6371 with a timeout period appropriate for the operational requirements, such as 60 seconds. Software executing on the hardware-enforced trust system may be required to toggle the watchdog input at intervals shorter than the timeout period to indicate that the software is operating normally. If the software fails to toggle the watchdog input within the timeout period, the MAX6371 may trigger its output to initiate corrective action.

The hardware watchdog timer may trigger non-maskable interrupts (NMIs) if not serviced within the timeout period. A non-maskable interrupt may be a hardware interrupt that cannot be disabled or ignored by software, ensuring that the interrupt handler executes regardless of the state of the interrupted software. The NMI triggered by the hardware watchdog timer may invoke an interrupt handler that performs corrective action, such as recalculating trust metrics, initiating revocation procedures, logging the watchdog timeout event, and/or forcing a system reset. The non-maskable nature of the interrupt may ensure that the corrective action occurs even if the monitored software has entered a state where normal interrupts are disabled or where the software is unresponsive.

The hardware watchdog timer may operate independently of the monitored software such that the watchdog cannot be disabled, paused, or reset by software executing at any privilege level except through the designated watchdog servicing interface. The independence from software control may ensure that the watchdog provides reliable monitoring even when the monitored software is compromised or behaving maliciously. The hardware implementation of the watchdog timer may ensure that the timeout detection and interrupt triggering occur through hardware mechanisms that software cannot circumvent.

In some embodiments, the hardware-enforced trust system may include a tamper-evident enclosure that provides physical protection for sensitive components and that detects physical tampering attempts. A tamper-evident enclosure may surround sensitive components such as the CSAC, QRNG, hardware trust anchor, and hardware-protected storage, providing a physical barrier against unauthorized access. The tamper-evident nature of the enclosure may enable detection of physical tampering attempts, allowing the hardware-enforced trust system to respond to physical attacks by erasing sensitive data, triggering alerts, and/or initiating revocation procedures.

In some embodiments, the tamper-evident enclosure may include a copper mesh layer connected to the CSAC voltage rail. The copper mesh layer may comprise a fine mesh of copper conductors that surrounds the protected components. The copper mesh may be connected to the CSAC voltage rail such that penetration of the mesh disrupts the electrical connection and affects the CSAC power supply. The connection between the copper mesh and the CSAC voltage rail may enable detection of physical tampering through monitoring of the CSAC power supply characteristics.

Penetration of the copper mesh may trigger calibration data erasure. When the copper mesh is penetrated-such as by drilling, cutting, or otherwise breaching the tamper-evident enclosure—the disruption to the electrical connection may be detected by monitoring circuitry. The detection of mesh penetration may trigger erasure of CSAC calibration data, rendering the CSAC unable to provide accurate time references until recalibration is performed. The erasure of calibration data may serve as a tamper response that degrades the capabilities of the hardware-enforced trust system in response to physical tampering, preventing an attacker who has physically breached the enclosure from using the compromised system with full capabilities.

The tamper-evident enclosure may provide a detection rate for physical tampering attempts. In some embodiments, the tamper-evident enclosure may achieve a detection rate of approximately 95% for physical tampering attempts, meaning that approximately 95% of attempts to breach the enclosure may be detected through the copper mesh monitoring. The detection rate may depend on the mesh density, the monitoring sensitivity, and the sophistication of the tampering attempt. The tamper-evident enclosure may provide defense-in-depth by combining physical barriers with detection mechanisms, increasing the difficulty and risk of physical attacks against the hardware-enforced trust system.

In some embodiments, the hardware-enforced trust system may implement a commitment-revealed execution protocol with a mandatory delay enforced by CSAC timestamps. A commitment-revealed execution protocol may require that commands be committed before execution, with a mandatory delay between commitment and execution. The mandatory delay may prevent front-running attacks where an adversary observes a pending command and executes a competing command before the original command executes. The commitment-revealed execution protocol may provide fairness guarantees by ensuring that commands are executed in the order they are committed rather than in an order that could be manipulated by adversaries with faster execution capabilities.

The mandatory delay may be enforced using CSAC timestamps that provide hardware-attested time references. When a command is committed, the commitment may include a CSAC timestamp indicating the time of commitment. The command may not be permitted to execute until a specified delay period has elapsed since the commitment timestamp. The delay period may be enforced by comparing the current CSAC time against the commitment timestamp and blocking execution until the difference exceeds the specified delay. The hardware-attested nature of the CSAC timestamps may ensure that the delay enforcement cannot be circumvented by manipulating time values.

In some embodiments, the commitment-revealed execution protocol may implement a mandatory 60-second delay between commitment and execution. The 60-second delay may provide sufficient time for committed commands to propagate through the system, for monitoring systems to observe pending commands, and for any necessary review or intervention before execution. The 60-second delay may be enforced by hardware mechanisms that compare CSAC timestamps and that block command execution until 60 seconds have elapsed since commitment. The hardware enforcement of the 60-second delay may ensure that the delay cannot be bypassed by software executing at any privilege level.

The commitment-revealed execution protocol may generate cryptographic commitments that bind commands without revealing command contents. When a command is committed, the protocol may generate a commitment value that is a cryptographic hash of the command concatenated with a random nonce obtained from the QRNG. The commitment value may be published or recorded, binding the committing party to the command without revealing the command contents. After the mandatory delay period, the committing party may reveal the command and nonce, enabling verification that the revealed command matches the earlier commitment. The cryptographic binding may ensure that the committing party cannot change the command after commitment, while the hiding property may ensure that observers cannot determine the command contents from the commitment value alone.

The combination of CSAC timing, QRNG entropy, hardware watchdog monitoring, tamper-evident enclosure, GPS synchronization, QRNG health monitoring, and commitment delay enforcement may provide a comprehensive set of hardware mechanisms that support the security and reliability of the hardware-enforced trust system. The CSAC may provide trusted time references for timing-sensitive operations. The QRNG may provide unpredictable randomness for cryptographic operations. The hardware watchdog may provide independent monitoring that detects software failures. The tamper-evident enclosure may provide physical protection and tamper detection. The GPS synchronization may maintain CSAC accuracy over extended operation. The QRNG health monitoring may detect entropy source failures. The commitment delay enforcement may prevent front-running attacks. Together, these hardware mechanisms may enable the hardware-enforced trust system to provide durable trust guarantees under adversarial conditions.

In some embodiments, the hardware-enforced trust system may implement economic finality through bonded escrow mechanisms that provide financial guarantees backing the exposure bounds enforced by the system. Economic finality may ensure that violations of exposure bounds result in financial consequences that exceed the potential gains from the violation, creating economic incentives that align with the technical enforcement mechanisms. The bonded escrow may require participants to deposit collateral that is held in escrow and that may be forfeited (slashed) if the participant violates exposure bounds or other system constraints. The combination of hardware enforcement and economic penalties may provide defense-in-depth wherein technical mechanisms prevent violations and economic mechanisms deter attempts to circumvent the technical mechanisms.

The bonded escrow may require at least 10× the exposure ceiling as collateral. When a participant is onboarded to the hardware-enforced trust system with an exposure ceiling of E, the participant may be required to deposit collateral of at least 10×E into escrow. The 10× multiplier may ensure that the collateral substantially exceeds the maximum exposure that the participant may generate, providing a financial buffer that covers potential losses from violations plus penalties. The 10× collateral requirement may create strong economic incentives for participants to operate within their exposure ceilings, since the potential loss of collateral may substantially exceed any gains from violating the ceiling.

The hardware-enforced trust system may implement superlinear penalties for exposure violations. When a participant violates an exposure bound by an overage amount O, the penalty may be computed as a superlinear function of the overage rather than a linear function. In some embodiments, the penalty may be 10× the overage, such that a violation with overage O results in a penalty of 10×O. The superlinear penalty structure may ensure that larger violations result in disproportionately larger penalties, creating stronger deterrence against significant violations than against minor violations. The 10× penalty multiplier may ensure that violations are never economically profitable, since the penalty exceeds the potential gain from the violation by a factor of 10.

The hardware-enforced trust system may implement smart contract-based economic finality with automatic slashing of bonded escrow. Smart contracts may be self-executing programs deployed on a blockchain or distributed ledger that automatically enforce the terms of agreements without requiring manual intervention. The hardware-enforced trust system may deploy smart contracts that hold bonded escrow and that automatically execute slashing when violations are detected. The automatic execution of slashing may ensure that penalties are applied promptly and consistently without depending on manual enforcement processes that could be delayed, disputed, or circumvented.

The smart contract-based economic finality may implement automatic slashing upon partition log validation failure. When a participant operates during a network partition, the participant may maintain a partition log recording actions taken during the partition. Upon reconnection, the partition log may be submitted to validators for validation. The validators may verify that the partition log is consistent with the participant's exposure ceiling, that timestamps in the partition log are valid, and that the partition log has not been tampered with. If the partition log validation fails-indicating that the participant violated exposure bounds during the partition, manipulated timestamps, or tampered with the log—the smart contract may automatically slash the participant's bonded escrow. The automatic slashing upon validation failure may ensure that participants cannot exploit network partitions to violate exposure bounds without consequence.

The smart contract may implement the slashing logic such that slashing occurs automatically when validation failure is detected, without requiring manual initiation or approval. The smart contract may receive validation results from validators, may evaluate the results against slashing conditions, and may execute the transfer of slashed collateral from the participant's escrow to a penalty pool or to affected parties. The automatic execution may ensure that slashing occurs promptly upon detection of violations, preventing participants from withdrawing collateral before slashing can be applied.

The hardware-enforced trust system may implement cryptographic attestation chains that enable detection of regime violations and formal liability attribution. An attestation chain may comprise a sequence of cryptographic attestations, each attestation signed by a hardware trust anchor and each attestation referencing previous attestations in the chain. The attestation chain may provide a tamper-evident record of system configuration, operational state, and actions over time. The cryptographic signatures on each attestation may ensure that attestations cannot be forged or modified after generation, and the chaining of attestations may ensure that attestations cannot be removed or reordered without detection.

The attestation chain may enable detection of regime violations by providing cryptographic evidence of system configuration at each point in time. A regime violation may occur when a system operates outside the certified configuration, such as by substituting non-certified components, altering hardware-enforced boundary conditions, bypassing enforcement mechanisms, or modifying cryptographic roots of trust. The attestation chain may record the system configuration at regular intervals, with each attestation including measurements of component configurations, enforcement mechanism states, and cryptographic key states. When a regime violation occurs, the attestation chain may reflect the violation through changes in the recorded measurements, enabling detection of the violation through comparison of attestations before and after the violation.

The attestation chain may enable formal liability attribution through non-repudiable evidence of system configuration. Non-repudiable evidence may be evidence that the party who generated the evidence cannot deny having generated, due to cryptographic properties that bind the evidence to the generating party. Each attestation in the attestation chain may be signed by the hardware trust anchor of the system that generated the attestation, using cryptographic keys that are protected by the hardware trust anchor and that cannot be extracted or used by software. The cryptographic signatures may provide non-repudiable evidence that the attesting system was in the configuration recorded in the attestation at the time the attestation was generated.

The non-repudiable evidence provided by the attestation chain may enable formal liability attribution by establishing which party was responsible for system configuration at each point in time. When a violation or incident occurs, the attestation chain may be examined to determine the system configuration at the time of the violation or incident. The cryptographic signatures on the attestations may establish which party controlled the system at that time. If the attestation chain shows that a party modified the system configuration in a way that caused or contributed to the violation or incident, the attestation chain may provide evidence attributing liability to that party. The formal nature of the liability attribution may derive from the cryptographic properties of the attestation chain, which provide mathematical proof of the recorded configurations and the parties responsible for those configurations.

The hardware-enforced trust system may implement TPM attestation at 10-second intervals for quote generation and freshness verification. A TPM quote may be a cryptographic attestation generated by a Trusted Platform Module that reports the current values of Platform Configuration Registers (PCRs) along with a cryptographic signature proving that the quote was generated by the TPM. The 10-second attestation interval may ensure that fresh attestations are available at regular intervals, enabling timely detection of configuration changes and providing recent evidence of system state for verification purposes.

The 10-second attestation interval may be implemented by a periodic process that requests TPM quotes at 10-second intervals. Each quote may include the current PCR values, a timestamp, and a nonce that ensures freshness. The TPM may sign the quote using an attestation key that is protected by the TPM and that cannot be extracted or used by software. The signed quotes may be stored in the attestation chain, providing a continuous record of system configuration at 10-second granularity.

The 10-second attestation interval may enable freshness verification by providing recent attestations that reflect current system state. When a verifier requests attestation of system configuration, the system may provide the most recent TPM quote, which may be at most 10 seconds old. The verifier may check the timestamp on the quote to confirm that the quote is recent, and may verify the TPM signature to confirm that the quote was generated by the TPM. The combination of recent timestamp and valid signature may provide assurance that the system was in the attested configuration within the past 10 seconds.

The hardware-enforced trust system may implement a post-quantum cryptographic migration path to address the potential threat of quantum computers to current cryptographic algorithms. Quantum computers may be capable of breaking certain cryptographic algorithms that are currently considered secure, including RSA and elliptic curve cryptography that are used for digital signatures and key exchange. The post-quantum migration path may provide a plan for transitioning to cryptographic algorithms that are believed to be resistant to attacks by quantum computers, ensuring that the hardware-enforced trust system maintains its security properties even after large-scale quantum computers become available.

The post-quantum cryptographic migration path may include CRYSTALS-Dilithium as the target post-quantum signature algorithm. CRYSTALS-Dilithium may be a lattice-based digital signature algorithm that has been selected by the National Institute of Standards and Technology (NIST) for standardization as a post-quantum cryptographic algorithm. Lattice-based cryptographic algorithms may derive their security from the hardness of lattice problems that are believed to be resistant to attacks by both classical and quantum computers. CRYSTALS-Dilithium may provide digital signature functionality that may replace current signature algorithms such as RSA and ECDSA in the hardware-enforced trust system.

The post-quantum migration may be planned for 2030-2035, providing a timeline for transitioning to post-quantum cryptographic algorithms before large-scale quantum computers are expected to become available. The 2030-2035 timeline may allow sufficient time for standardization of post-quantum algorithms, for development of hardware implementations, for testing and validation of the migrated system, and for coordinated migration across deployed systems. The timeline may be adjusted based on developments in quantum computing and post-quantum cryptography, with earlier migration if quantum computing advances faster than expected or later migration if post-quantum algorithms require additional development.

The post-quantum migration path may include migration of signature algorithms used for attestation, commitment, and authorization within the hardware-enforced trust system. TPM attestation signatures may be migrated from current algorithms to CRYSTALS-Dilithium. Commitment signatures in the commitment-revealed execution protocol may be migrated to CRYSTALS-Dilithium. Authorization signatures for exposure bound modifications may be migrated to CRYSTALS-Dilithium. The migration may be performed in a coordinated manner that maintains interoperability during the transition period, with systems supporting both current and post-quantum algorithms until migration is complete.

The hardware-enforced trust system may implement AES-256-XTS memory encryption for enhanced security. AES-256-XTS may be an encryption mode that uses the Advanced Encryption Standard (AES) with 256-bit keys in XTS (XEX-based tweaked-codebook mode with ciphertext stealing) mode. AES-256-XTS may provide encryption of memory contents that protects against unauthorized access to data stored in memory. The 256-bit key length may provide enhanced security compared to AES-128-XTS, which uses 128-bit keys, by increasing the computational effort required for brute-force attacks against the encryption.

The AES-256-XTS memory encryption may be implemented within trusted execution environments such as Intel TDX enclaves. Memory used by trust metric computation, exposure tracking, and other sensitive operations may be encrypted using AES-256-XTS such that the memory contents are protected against observation by software executing outside the trusted execution environment. The encryption may be performed by hardware encryption engines that encrypt data as the data is written to memory and decrypt data as the data is read from memory, providing transparent encryption that does not require changes to software executing within the trusted execution environment.

The migration from AES-128-XTS to AES-256-XTS may provide enhanced security margins against advances in cryptanalysis and computational capabilities. While AES-128 is currently considered secure against known attacks, the larger key size of AES-256 may provide additional security margin that extends the useful lifetime of the encryption against potential future advances. The AES-256-XTS memory encryption may be implemented in hardware-enforced trust systems deployed in high-security environments where the additional security margin is warranted by the sensitivity of the protected data and the sophistication of potential adversaries.

In some embodiments, the hardware-enforced trust system may implement a Governable Secure Super-Platform (GSSP) that provides a comprehensive platform architecture for hardware-enforced trust operations. The GSSP may comprise multiple integrated components that cooperate to provide secure execution, cryptographic operations, and data path isolation for the hardware-enforced trust system. The GSSP architecture may enable the hardware-enforced trust system to maintain security guarantees through hardware-enforced mechanisms that operate independently of software executing at any privilege level.

The GSSP may comprise a Trusted Runtime Environment with TPM integration. The Trusted Runtime Environment may provide a secure execution context for trust-sensitive operations within the hardware-enforced trust system. The TPM integration may enable the Trusted Runtime Environment to leverage TPM capabilities including sealed storage, Platform Configuration Register (PCR) measurement and extension, attestation quote generation, and cryptographic key operations. The Trusted Runtime Environment may execute trust metric computation, exposure tracking, constraint enforcement, and other operations that require protection against observation and modification by software executing outside the Trusted Runtime Environment. The TPM integration may provide hardware-rooted security for the Trusted Runtime Environment by binding the execution context to specific hardware and software configurations through PCR-based sealing and attestation.

The GSSP may comprise physically isolated signature terminals. The physically isolated signature terminals may provide dedicated hardware interfaces for cryptographic signature operations that are separated from general-purpose computing resources. The physical isolation may ensure that signature operations occur in a protected context where signing keys and signature computations are not accessible to software executing on general-purpose processors. The physically isolated signature terminals may be implemented using dedicated hardware modules that perform signature generation and verification using keys stored within the modules. The physical isolation may prevent side-channel attacks, timing attacks, and other attacks that could compromise signature operations if the operations were performed on shared computing resources.

The GSSP may comprise cryptographic key hardware with a key-never-leaves-chip policy. The key-never-leaves-chip policy may specify that cryptographic keys used for signing, encryption, and other security-sensitive operations are generated within hardware security modules and never leave the hardware security modules in plaintext form. The cryptographic key hardware may perform all operations using the keys within the hardware security module, with only the results of cryptographic operations being provided to external components. The key-never-leaves-chip policy may ensure that cryptographic keys cannot be extracted by software, cannot be copied to other systems, and cannot be compromised through software-based attacks. The policy may be enforced by hardware mechanisms within the cryptographic key hardware that prevent key export and that perform cryptographic operations using keys stored in protected memory within the hardware.

The GSSP may comprise data path isolation through eBPF-based access controls. The eBPF-based access controls may enforce isolation between data paths within the hardware-enforced trust system, ensuring that data flows only through authorized channels and that unauthorized access to data is prevented. The eBPF programs may be attached to kernel interfaces that control data flow, including syscall entry points, network interfaces, and device interfaces. The eBPF programs may evaluate each data access against access control policies and may permit or deny the access based on the evaluation result. The data path isolation may ensure that only authorized components may access sensitive data such as trust metrics, exposure values, and cryptographic keys, and that data flows between components occur only through authorized paths.

The data path isolation through eBPF-based access controls may ensure that only the constraint enforcement subsystem accesses actuators. The eBPF programs may enforce access controls that permit actuator access only from the constraint enforcement subsystem and that deny actuator access from other components. The access control enforcement may ensure that commands reach actuators only after passing through the constraint enforcement subsystem, where the commands are validated against governance rules and exposure bounds. The eBPF-based enforcement of actuator access controls may prevent bypass of the constraint enforcement subsystem by components that attempt to access actuators directly.

In some embodiments, the hardware-enforced trust system may include a hardware accelerator subsystem that provides dedicated hardware for accelerating trust computation, exposure calculation, cryptographic operations, and rule enforcement. The hardware accelerator subsystem may comprise multiple specialized processing units that perform specific functions with deterministic timing guarantees. The dedicated hardware implementation of the accelerator subsystem may enable the hardware-enforced trust system to achieve latencies that would not be achievable through software execution on general-purpose processors. The hardware accelerator subsystem may operate in parallel with other system components, enabling concurrent execution of trust computation, exposure calculation, cryptographic operations, and rule enforcement.

The hardware accelerator subsystem may comprise a Trust Computation Unit with less than 10 microseconds per-node latency. The Trust Computation Unit may perform trust metric computation for individual nodes within the hardware-enforced trust system. The per-node latency of less than 10 microseconds may enable the Trust Computation Unit to compute trust metrics for multiple nodes within tight timing constraints. The Trust Computation Unit may implement the trust metric computation logic in dedicated hardware that executes the computation with deterministic timing. The hardware implementation may ensure that trust metric computation completes within the specified latency bound regardless of input values and system load.

The hardware accelerator subsystem may comprise an Exposure Calculation Unit with less than 50 microseconds for 16-domain composition. The Exposure Calculation Unit may perform exposure bound computation using the composition operator to combine component exposure bounds into composite exposure bounds. The 16-domain composition capability may enable the Exposure Calculation Unit to compute composite exposure bounds for systems with up to 16 independent security domains. The latency of less than 50 microseconds for 16-domain composition may enable real-time exposure bound computation even for complex multi-domain systems. The Exposure Calculation Unit may implement the composition operator logic in dedicated hardware that executes the composition with deterministic timing.

The hardware accelerator subsystem may comprise a Cryptographic Engine with less than 1 millisecond Ed25519 verification. The Cryptographic Engine may perform cryptographic operations including signature generation, signature verification, hashing, and key derivation. The Ed25519 verification latency of less than 1 millisecond may enable rapid verification of cryptographic signatures on commands, attestations, and other signed data. Ed25519 may be an elliptic curve digital signature algorithm that provides efficient signature generation and verification with strong security properties. The Cryptographic Engine may implement Ed25519 and other cryptographic algorithms in dedicated hardware that executes the algorithms with deterministic timing.

The hardware accelerator subsystem may comprise a Rule Engine Accelerator with less than 100 microseconds worst-case execution. The Rule Engine Accelerator may perform rule evaluation for the constraint enforcement subsystem, evaluating commands against governance rules to determine compliance. The worst-case execution latency of less than 100 microseconds may ensure that rule evaluation completes within a bounded time regardless of the complexity of the rules and the characteristics of the command being evaluated. The Rule Engine Accelerator may implement rule evaluation logic in dedicated hardware that executes the evaluation with deterministic timing. The worst-case latency bound may enable the hardware-enforced trust system to provide timing guarantees for constraint enforcement operations.

The hardware accelerator subsystem may achieve end-to-end command validation in less than 1 millisecond. End-to-end command validation may comprise the complete sequence of operations required to validate a command before execution, including trust metric computation, exposure bound checking, cryptographic signature verification, and rule evaluation. The less than 1 millisecond latency for end-to-end command validation may enable real-time validation of commands at high rates. The end-to-end latency may be achieved through parallel execution of validation operations on the specialized processing units of the hardware accelerator subsystem, with the total latency dominated by the longest individual operation rather than the sum of all operation latencies.

In some embodiments, the hardware-enforced trust system may implement eBPF syscall interception with latency of approximately 10 microseconds and overhead of 0.01%. The eBPF syscall interception may capture commands as syscalls before the syscalls execute, enabling the constraint enforcement subsystem to validate commands before execution. The latency of approximately 10 microseconds may represent the time required for the eBPF program to intercept the syscall, evaluate the command against constraints, and return a result permitting or denying the syscall. The overhead of 0.01% may represent the fraction of total system execution time consumed by the eBPF interception, indicating that the interception imposes minimal performance impact on system operation. The low latency and low overhead of eBPF syscall interception may enable the hardware-enforced trust system to validate commands in real-time without significantly affecting system performance.

In some embodiments, the hardware-enforced trust system may implement TPM seal/unseal operations with latency of approximately 130 milliseconds. TPM seal operations may bind data to specific hardware and software configurations by encrypting the data such that the data may only be decrypted when the system is in the specified configuration. TPM unseal operations may decrypt sealed data when the system configuration matches the configuration to which the data was sealed. The latency of approximately 130 milliseconds for seal/unseal operations may reflect the time required for the TPM to perform the cryptographic operations involved in sealing and unsealing. The 130 millisecond latency may be acceptable for operations that do not occur on the critical path of command validation, such as initial loading of exposure ceilings during system startup and periodic attestation operations.

In some embodiments, the hardware-enforced trust system may implement partition detection latency of 135 seconds using 3 consecutive 45-second timeouts with hysteresis. The partition detection may determine when the hardware-enforced trust system has lost network connectivity and should enter partition mode with reduced exposure ceilings. The 135 second detection latency may result from requiring 3 consecutive timeout periods of 45 seconds each before confirming a partition condition. The hysteresis provided by requiring 3 consecutive timeouts may reduce false positive detections that could occur due to transient network disruptions. The 135 second detection latency may represent a tradeoff between rapid detection of actual partitions and avoidance of false positive detections due to temporary connectivity issues.

In some embodiments, the hardware-enforced trust system may implement online operation at 4-6 Hz for multi-agent systems or up to 16 Hz for single-agent systems. The operation rate may represent the frequency at which the hardware-enforced trust system performs complete validation cycles including trust metric computation, exposure bound checking, and constraint enforcement. The 4-6 Hz operation rate for multi-agent systems may reflect the additional computation required for multi-agent interaction estimation and consensus operations. The up to 16 Hz operation rate for single-agent systems may reflect the reduced computation when interaction estimation and consensus are not required. The operation rates may be sufficient for real-time control of autonomous systems operating at typical control frequencies.

In some embodiments, the hardware-enforced trust system may implement offline/online architecture separation with expensive computation occurring offline once per model and lightweight inference occurring online at runtime. The offline/online separation may enable the hardware-enforced trust system to perform thorough analysis and calibration during an offline phase while maintaining real-time operation during the online phase. The offline phase may include feature identification for learned feature bounds, conformal calibration for probabilistic bounds, and other computationally expensive operations that require hours, days, or weeks to complete. The online phase may include feature extraction, uncertainty quantification, interaction estimation, and constraint enforcement operations that complete within milliseconds.

The offline phase may occur once per model update or periodically to account for distributional shift. When a new model is deployed or when an existing model is updated, the offline phase may be performed to identify safety-critical features, calibrate uncertainty quantification, and characterize component exposure bounds. The offline phase may also be performed periodically to recalibrate uncertainty quantification when coverage monitoring detects that the current calibration no longer accurately represents the operating environment. The offline phase may require computational resources such as GPU clusters for activation patching and may require human annotation for creating contrastive datasets.

The online phase may perform lightweight inference at runtime using the results of the offline phase. Feature extraction may use pre-computed feature specifications to extract activation levels from identified neurons with a single forward pass through the network. Uncertainty quantification may use pre-computed quantile thresholds to derive uncertainty scores from model predictions. Interaction estimation may use physics-based analytical formulas that do not require offline training. The lightweight nature of online operations may enable the hardware-enforced trust system to perform complete validation cycles at the 4-16 Hz operation rates described above.

The offline/online architecture separation may enable the hardware-enforced trust system to achieve both analytical depth and real-time performance. The offline phase may perform thorough analysis that would not be feasible under real-time constraints, including mechanistic interpretability analysis requiring thousands of forward passes, statistical calibration requiring large datasets with ground truth labels, and formal verification of system properties. The online phase may apply the results of the offline analysis in real-time, enabling the hardware-enforced trust system to enforce learned feature bounds, uncertainty-adaptive ceilings, and compositional exposure bounds with latencies measured in milliseconds. The separation may enable deployment of hardware-enforced trust systems that provide both rigorous safety analysis and real-time operational capability.

In some embodiments, the hardware-enforced trust system may implement a Tier 1 premium hardware configuration costing approximately $68,829 per node. The Tier 1 premium hardware configuration may be suitable for high-security deployments where the highest levels of assurance are required, such as financial trading systems, defense applications, and critical infrastructure control. The Tier 1 premium hardware configuration may provide the lowest latencies, the highest security margins, and the most comprehensive hardware protection among available configuration options.

The Tier 1 premium hardware configuration may include Intel TDX (Trust Domain Extensions) support through Intel Xeon Sapphire Rapids processors or newer processors that implement TDX capabilities. The Intel TDX support may provide hardware-enforced memory encryption using AES encryption that is implemented in hardware, isolation from kernel and hypervisor such that software executing outside the Trust Domain cannot observe or modify Trust Domain memory, and attestation capabilities that enable remote verification of Trust Domain configuration and integrity. The Intel TDX implementation may enable trust metric computation, exposure tracking, and other sensitive operations to execute within hardware-isolated Trust Domains where the operations are protected against observation and modification by software executing at any privilege level, including software with root access, kernel access, and hypervisor access.

The Tier 1 premium hardware configuration may include a triple CSAC (chip-scale atomic clock) arrangement configured for Byzantine fault tolerant time consensus. The triple CSAC arrangement may comprise three independent Microsemi SA.45s chip-scale atomic clocks or equivalent devices, each providing an independent time reference with drift bounded to approximately 4.3 microseconds per day. The three independent CSACs may be configured in a Byzantine voting arrangement wherein the consensus time value is computed as the median of the three CSAC timestamps. The median-based consensus may tolerate a single faulty or compromised CSAC while maintaining accurate time consensus, providing fault tolerance for the time source that is not achievable with a single CSAC. The triple CSAC arrangement may enable the Tier 1 premium hardware configuration to detect and tolerate time manipulation attacks against individual CSAC units, providing enhanced assurance for timing-sensitive operations.

The Tier 1 premium hardware configuration may include an EAL6+(Evaluation Assurance Level 6+) secure element such as an Infineon SLI37 or equivalent device. The EAL6+ certification may represent a high level of assurance according to the Common Criteria evaluation framework, indicating that the secure element has been evaluated using semiformal design verification and testing methods. The EAL6+secure element may provide a level of assurance suitable for government and defense applications where adversaries may include nation-state actors with substantial resources for attacking hardware security mechanisms. The EAL6+secure element may serve as a hardware trust anchor that provides cryptographic key storage, cryptographic operations, sealed storage, and attestation capabilities with the high assurance level required for the most security-sensitive deployments.

The Tier 1 premium hardware configuration may include additional components such as a quantum random number generator for high-quality entropy, high-speed network interfaces for low-latency communication, ECC (error-correcting code) memory for reliability, and redundant power supplies for availability. The combination of Intel TDX, triple CSAC, EAL6+secure element, and additional premium components may provide a comprehensive hardware platform that supports the full capabilities of the hardware-enforced trust system with the highest levels of security, reliability, and performance.

In some embodiments, the hardware-enforced trust system may implement a Tier 2 commodity hardware configuration costing approximately $4,702 per node. The Tier 2 commodity hardware configuration may be suitable for deployments where cost constraints are significant, such as research and development environments, small and medium business applications, and deployments requiring large numbers of nodes. The Tier 2 commodity hardware configuration may provide hardware-enforced trust capabilities at a substantially lower cost than the Tier 1 premium hardware configuration while accepting reduced security margins and reduced fault tolerance for certain components.

The Tier 2 commodity hardware configuration may include an AMD Ryzen processor such as an AMD Ryzen 9 7950X or equivalent device. The AMD Ryzen processor may provide general-purpose computing capabilities suitable for executing the software components of the hardware-enforced trust system. While the AMD Ryzen processor may not include hardware-based trusted execution environment capabilities equivalent to Intel TDX, the Tier 2 commodity hardware configuration may rely on other hardware security mechanisms such as the firmware TPM and secure boot to provide hardware-rooted trust. The AMD Ryzen processor may provide sufficient computational performance for trust metric computation, exposure tracking, and constraint enforcement operations at the operation rates supported by the Tier 2 configuration.

The Tier 2 commodity hardware configuration may include a firmware TPM (fTPM) rather than a discrete TPM chip. A firmware TPM may implement TPM functionality in firmware executing within a protected execution environment on the processor, rather than in a separate discrete hardware chip. The firmware TPM may provide TPM capabilities including sealed storage, Platform Configuration Register measurement and extension, attestation quote generation, and cryptographic key operations. While a firmware TPM may provide a lower level of hardware isolation than a discrete TPM chip, the firmware TPM may provide sufficient security for deployments where the threat model does not include adversaries with physical access to hardware or adversaries capable of exploiting firmware vulnerabilities. The firmware TPM may be included as a standard feature of the AMD Ryzen processor platform, reducing the cost of the Tier 2 configuration compared to configurations requiring discrete TPM chips.

The Tier 2 commodity hardware configuration may include a single CSAC rather than the triple CSAC arrangement of the Tier 1 configuration. The single CSAC may provide a hardware-attested time source with drift bounded to approximately 4.3 microseconds per day, enabling accurate timekeeping for timing-sensitive operations. The single CSAC configuration may not provide the Byzantine fault tolerance of the triple CSAC arrangement, meaning that failure or compromise of the single CSAC may affect the availability or accuracy of the time source. The single CSAC configuration may be acceptable for deployments where the threat model does not include adversaries capable of compromising the CSAC or where the consequences of time source failure are acceptable. The single CSAC may be supplemented with GPS synchronization to maintain accuracy and to provide a backup time reference when GPS signals are available.

The Tier 2 commodity hardware configuration may achieve a bypass probability of approximately $10^{-6}$, which may be lower than the approximately $10^{-19}$ bypass probability achievable with the Tier 1 premium hardware configuration. The reduced bypass probability may result from the use of firmware TPM rather than discrete TPM, the use of single CSAC rather than triple CSAC, and the absence of EAL6+secure element and Intel TDX capabilities. The $10^{-6}$ bypass probability may be acceptable for deployments where the threat model includes insider threats and criminal organizations but does not include nation-state adversaries with physical access to hardware. The Tier 2 commodity hardware configuration may provide hardware-enforced trust capabilities that substantially exceed software-only approaches while remaining accessible for cost-sensitive deployments.

The approximately 14:1 cost ratio between the Tier 1 premium hardware configuration at approximately $68,829 per node and the Tier 2 commodity hardware configuration at approximately $4,702 per node may enable deployment strategies that match hardware configuration to security requirements and budget constraints. Deployments requiring the highest security levels may use the Tier 1 premium hardware configuration for all nodes. Deployments with mixed security requirements may use the Tier 1 premium hardware configuration for high-security nodes and the Tier 2 commodity hardware configuration for lower-security nodes. Deployments with significant cost constraints may use the Tier 2 commodity hardware configuration throughout while accepting the reduced security margins. The availability of multiple hardware configuration tiers may enable the hardware-enforced trust system to address a range of deployment scenarios with varying security requirements and budget constraints.

In some embodiments, the hardware-enforced trust system may implement formal verification using a Coq proof assistant for 8 core primitives. The Coq proof assistant may be a formal proof management system that enables construction of machine-checked proofs of mathematical theorems and program properties. The formal verification using Coq may establish that the core primitives of the hardware-enforced trust system satisfy specified properties for all possible inputs and execution scenarios, rather than relying on testing that may only cover a finite subset of possible scenarios. The machine-checked nature of Coq proofs may ensure that the proofs are mathematically rigorous and free from errors that could occur in informal reasoning.

The 8 core primitives verified using Coq may include primitives for exposure tracking, constraint enforcement, trust metric computation, revocation triggering, and other functions that are foundational to the operation of the hardware-enforced trust system. Each primitive may be specified formally in Coq, with the specification defining the expected behavior of the primitive in terms of preconditions, postconditions, and invariants. The Coq proofs may establish that implementations of the primitives satisfy their specifications, providing assurance that the primitives behave correctly under all conditions.

The formal verification using Coq may include an exposure bound invariant theorem. The exposure bound invariant theorem may establish that cumulative exposure never exceeds the total exposure bound during system operation. The theorem may be stated formally as: for all reachable system states, the cumulative exposure value is less than or equal to the total exposure bound. The Coq proof of the exposure bound invariant may proceed by induction over system execution traces, establishing that the invariant holds in the initial state and that each state transition preserves the invariant. The machine-checked proof may provide mathematical certainty that cumulative exposure cannot exceed the total exposure bound, regardless of the sequence of commands executed by the system.

The formal verification using Coq may include a prohibited unreachable theorem. The prohibited unreachable theorem may establish that certain prohibited states are unreachable from any initial state through any sequence of valid state transitions. Prohibited states may include states where the system has violated its safety properties, states where unauthorized exposure has occurred, and/or states where enforcement mechanisms have been bypassed. The Coq proof of the prohibited unreachable theorem may establish that no sequence of valid state transitions may lead from an initial state to a prohibited state, providing assurance that the system cannot enter unsafe states during normal operation.

The formal verification using Coq may include a policy non-bypass theorem. The policy non-bypass theorem may establish that the constraint enforcement subsystem cannot be circumvented by any sequence of operations available to software executing at any privilege level. The theorem may be stated formally as: for all commands that reach execution targets, the commands have been validated by the constraint enforcement subsystem against governance rules. The Coq proof of the policy non-bypass theorem may establish that the architecture of the hardware-enforced trust system ensures that all command paths pass through the constraint enforcement subsystem, and that no alternative paths exist that could bypass constraint enforcement. The machine-checked proof may provide assurance that policy enforcement is comprehensive and cannot be circumvented.

The formal verification using Coq may include additional theorems beyond the exposure bound invariant, prohibited unreachable, and policy non-bypass theorems. Additional theorems may address properties such as compositional bounded execution establishing that composite system exposure is bounded by the composition of component exposure bounds, negligible bypass establishing that the combined probability of bypassing all enforcement layers is below a specified threshold, trust metric monotonicity establishing that the trust metric decreases monotonically with behavioral divergence, and/or revocation completeness establishing that revocation is triggered whenever triggering conditions are met. The 8 core primitives and their associated theorems may together provide a formal foundation for the security properties of the hardware-enforced trust system.

The Coq proofs for the 8 core primitives may compile successfully with Coq version 8.18 or compatible versions, with the compilation returning exit code 0 indicating successful verification. The successful compilation may confirm that the proofs are complete, that all proof obligations have been discharged, and that the theorems have been established according to the rules of the Coq proof system. The proof code may comprise approximately 500 lines of Coq code that defines the primitives, states the theorems, and constructs the proofs. The proof code may be maintained as part of the hardware-enforced trust system specification and may be re-verified when the system specification is updated.

In some embodiments, the hardware-enforced trust system may implement TLA+model checking with a state space of approximately $10^9$ states for exhaustive verification of state machine properties. TLA+ may be a formal specification language for describing and reasoning about concurrent and distributed systems. Model checking may be a verification technique that exhaustively explores the state space of a system to verify that specified properties hold in all reachable states. The combination of TLA+specification and model checking may enable verification of state machine properties through exhaustive exploration of the approximately $10^9$ states reachable by the hardware-enforced trust system.

The TLA+specification may define the state machine of the hardware-enforced trust system, including the set of possible states, the state variables that characterize each state, the initial state conditions, and the transition relations that define how the system may move between states. The TLA+specification may also define safety properties that specify conditions that may hold in all reachable states and liveness properties that specify conditions that may eventually hold during system execution. The TLA+specification may serve as a formal model of the hardware-enforced trust system that may be analyzed using model checking tools.

The TLA+model checking may be performed using the TLC model checker, which may exhaustively explore the state space defined by the TLA+specification. The TLC model checker may enumerate all reachable states, may verify that safety properties hold in each reachable state, and may verify that liveness properties are satisfiable along all execution paths. The state space of approximately 10" states may be explored exhaustively, with the model checker visiting each state and verifying the specified properties. The exhaustive exploration may provide assurance that the verified properties hold in all reachable states, not merely in states that happen to be visited during testing.

The TLA+model checking may require approximately 2 hours of computation on a 32-core server to complete the exhaustive exploration of the approximately $10^9$ state space. The computation time may depend on the complexity of the state machine, the number of state variables, the branching factor of the transition relation, and the computational resources available for model checking. The 2-hour computation time may be acceptable for verification that is performed during system development and certification, enabling thorough verification of state machine properties without imposing impractical computational requirements.

The TLA+model checking may verify that no counterexamples exist for the specified safety and liveness properties. A counterexample may be a sequence of states and transitions that demonstrates a violation of a specified property. The absence of counterexamples after exhaustive state space exploration may provide assurance that the specified properties hold in all reachable states. The model checking results may be recorded as part of the verification evidence for the hardware-enforced trust system, documenting that the state machine properties have been verified through exhaustive exploration.

In some embodiments, the hardware-enforced trust system may implement a state machine with states including Initialized, Active, Degraded, Partition, Critical, and Deregistered. The state machine may define the operational modes of the hardware-enforced trust system and the conditions under which the system transitions between modes. Each state may correspond to a distinct operational configuration with specific capabilities, constraints, and behaviors. The formally verified state machine may ensure that the hardware-enforced trust system operates according to well-defined rules and that state transitions occur only under specified conditions.

The Initialized state may represent the state of the hardware-enforced trust system after initial configuration but before the system has been activated for operation. In the Initialized state, the system may have completed hardware initialization, may have loaded configuration parameters including exposure bounds and trust thresholds, and may be ready to transition to the Active state upon receiving an activation command. The Initialized state may serve as a starting point from which the system may transition to operational states.

The Active state may represent the normal operational state of the hardware-enforced trust system. In the Active state, the system may accept and validate commands, may track cumulative exposure, may compute trust metrics, and may enforce constraints according to governance rules. The Active state may be the primary operational mode in which the hardware-enforced trust system performs its intended functions. The system may remain in the Active state as long as the trust metric remains above the degraded threshold, cumulative exposure remains below the total exposure bound, and network connectivity is maintained.

The Degraded state may represent an operational state with reduced capabilities due to trust metric degradation. The system may transition from the Active state to the Degraded state when the trust metric falls below a degraded threshold but remains above a critical threshold. In the Degraded state, the system may continue to operate but with a reduced exposure ceiling that is proportional to the current trust metric. The Degraded state may provide graduated response to trust degradation, permitting continued operation at reduced capability rather than immediately terminating operation. The system may transition from the Degraded state back to the Active state if the trust metric recovers above the degraded threshold, or may transition to the Critical state if the trust metric falls below the critical threshold.

The Partition state may represent an operational state during network partition when the hardware-enforced trust system has lost connectivity to external systems. The system may transition from the Active state or the Degraded state to the Partition state when network partition is detected through multi-source detection requiring agreement of multiple independent connectivity indicators. In the Partition state, the system may continue to operate with a reduced partition ceiling and may maintain a partition log recording actions taken during the partition. The system may transition from the Partition state back to the Active state or the Degraded state when network connectivity is restored and the partition log is successfully validated.

The Critical state may represent a state in which the hardware-enforced trust system has triggered revocation due to the trust metric falling below the critical threshold or cumulative exposure reaching the total exposure bound. In the Critical state, the system may have terminated operational capability through the hardware-enforced revocation paths. The Critical state may be an absorbing state from which the system cannot transition to operational states through normal operation. The system may remain in the Critical state until a trust recovery ceremony is performed.

The Deregistered state may represent a state in which the hardware-enforced trust system has been removed from active service. The system may transition to the Deregistered state through an administrative deregistration process that removes the system from the set of active participants. In the Deregistered state, the system may not accept commands, may not participate in consensus, and may not contribute to system-level exposure bounds. The Deregistered state may be a terminal state from which the system does not transition to other states without re-registration.

In some embodiments, the hardware-enforced trust system may implement prohibited state unreachability such that the Critical state cannot transition back to the Active state without a trust recovery ceremony. The prohibited state unreachability may ensure that once the system has entered the Critical state due to revocation, the system cannot resume normal operation through software action alone. The prohibition on direct transition from Critical to Active may ensure that revocation is durable and cannot be circumvented by software manipulation.

The prohibited state invariant may be formally specified in the TLA+specification as a safety property that may hold in all reachable states. The safety property may state that if the system is in the Critical state, the system may not transition directly to the Active state. The TLA+model checking may verify that this safety property holds in all approximately $10^9$ reachable states, confirming that no sequence of valid state transitions may lead from the Critical state to the Active state without passing through a trust recovery ceremony.

The trust recovery ceremony may be the mechanism through which the system may transition from the Critical state to an operational state. The trust recovery ceremony may require physical presence of multiple authorized principals, each providing cryptographic authorization through hardware security tokens. The multi-party authorization requirement may ensure that recovery from the Critical state requires coordination among multiple trusted parties and cannot be accomplished by a single compromised party. The physical presence requirement may ensure that recovery cannot be accomplished remotely through software alone. The trust recovery ceremony may reset the trust metric, may restore operational capability, and may transition the system from the Critical state to the Initialized state or the Active state.

The prohibited state unreachability may be verified through both Coq formal verification and TLA+model checking. The Coq proof of the prohibited unreachable theorem may establish that the Critical state cannot transition to the Active state without the trust recovery ceremony. The TLA+model checking may verify that no counterexample exists demonstrating a transition from Critical to Active without the recovery ceremony. The dual verification through both Coq and TLA+ may provide defense-in-depth for the verification of the prohibited state unreachability property.

In some embodiments, the hardware-enforced trust system may achieve 89% TRUE classification of 40 out of 45 invariants after hardening with explicit preconditions and residual risk assessments. The invariant classification may represent an evaluation of the system invariants according to whether each invariant holds unconditionally (TRUE), holds under specified conditions (CONDITIONAL), or does not hold (FALSE). The 89% TRUE classification may indicate that 40 of the 45 evaluated invariants hold unconditionally after the hardening process has been applied.

The hardening process may involve identifying invariants that were initially classified as CONDITIONAL or FALSE, analyzing the conditions under which the invariants fail to hold, and implementing modifications to the hardware-enforced trust system that cause the invariants to hold unconditionally or under explicitly stated preconditions. The hardening process may include hardware additions such as tamper-evident enclosures and GPS synchronization, software modifications such as IMA/EVM integrity verification and multi-source partition detection, and architectural changes such as M-of-N threshold signature ceremonies for trust recovery.

The explicit preconditions for invariants that remain CONDITIONAL after hardening may specify the conditions under which the invariants hold. For example, an invariant related to Byzantine fault tolerance may hold under the precondition that more than two-thirds of validators are honest. An invariant related to cryptographic security may hold under the precondition that quantum computers capable of breaking current cryptographic algorithms are not available. The explicit preconditions may enable users of the hardware-enforced trust system to understand the assumptions under which the system provides its guarantees.

The residual risk assessments for invariants that remain CONDITIONAL after hardening may quantify the risk associated with the conditions under which the invariants may fail to hold. For example, the residual risk for an invariant that depends on Byzantine fault tolerance may be assessed based on the probability that more than one-third of validators may be compromised. The residual risk for an invariant that depends on cryptographic security may be assessed based on the timeline for development of quantum computers capable of breaking current algorithms. The residual risk assessments may enable users of the hardware-enforced trust system to make informed decisions about deployment based on the risk profile of the system.

The 3 invariants that remain CONDITIONAL after hardening may include invariants related to Byzantine consensus assumptions and post-quantum cryptographic migration. The Byzantine consensus invariants may require the assumption that more than two-thirds of validators are honest, which may be a standard assumption for Byzantine fault tolerant systems. The cryptographic invariants may require migration to post-quantum algorithms by 2030-2035, before large-scale quantum computers are expected to become available. The CONDITIONAL classification of these invariants may reflect fundamental limitations that cannot be eliminated through system hardening but that may be addressed through appropriate deployment practices and migration planning.

In some embodiments, the hardware-enforced trust system may implement 50-node testnet deployment with 6-month validation achieving 100% constraint enforcement during induced partitions. The 50-node testnet may comprise a network of 50 nodes implementing the hardware-enforced trust system, configured to operate as a distributed system with consensus, exposure tracking, and constraint enforcement capabilities. The testnet may include a mix of Tier 1 premium hardware configurations and Tier 2 commodity hardware configurations to validate operation across different hardware platforms.

The 6-month validation period may provide extended operational testing of the hardware-enforced trust system under realistic conditions. During the 6-month validation period, the testnet may process operational workloads including command validation, exposure tracking, trust metric computation, and consensus operations. The extended validation period may enable detection of issues that may not manifest during shorter testing periods, such as issues related to long-term drift, resource exhaustion, or rare event sequences.

The induced partitions during the 6-month validation may comprise deliberate network disruptions that simulate network partition conditions. The induced partitions may vary in duration from seconds to hours, may affect different subsets of nodes, and may occur at various times during the validation period. The induced partitions may test the ability of the hardware-enforced trust system to maintain constraint enforcement during network unavailability and to properly reconcile partition logs upon reconnection.

The 100% constraint enforcement during induced partitions may indicate that all constraints were enforced correctly during all induced partition events throughout the 6-month validation period. The 100% enforcement rate may confirm that the hardware-enforced trust system maintains its exposure bounds and trust thresholds during network partitions, that partition logs are maintained correctly during partitions, and that partition log validation correctly identifies any violations that may have occurred during partitions. The 100% enforcement rate may provide empirical validation that the hardware-enforced trust system achieves its design goals for partition-duration independence.

The 50-node testnet validation may also measure other operational metrics including uptime, false positive rates for partition detection, and incident counts. The testnet may achieve uptime of approximately 99.9% over the 6-month validation period. The false positive rate for partition detection may be approximately 0.001%, indicating that the multi-source partition detection correctly distinguishes actual partitions from transient connectivity issues. The incident count may include a small number of non-security incidents such as software bugs that are identified and corrected during the validation period, with zero security breaches indicating that the hardware-enforced trust system maintains its security properties throughout the validation.

The combination of Coq formal verification for 8 core primitives, TLA+model checking with approximately $10^9$ state space exploration, formally verified state machine with prohibited state unreachability, 89% TRUE invariant classification after hardening, and 50-node testnet validation with 100% constraint enforcement may provide comprehensive verification and validation of the hardware-enforced trust system. The formal verification may establish mathematical properties of the system design. The model checking may verify state machine properties through exhaustive exploration. The invariant classification may document the conditions under which system guarantees hold. The testnet validation may provide empirical confirmation that the system operates correctly under realistic conditions. Together, these verification and validation activities may provide assurance that the hardware-enforced trust system achieves its design goals for hardware-enforced behavioral bounding with partition-duration independence.

In some embodiments, the hardware-enforced trust system may implement a formal certification regime wherein certification as satisfying the compositional exposure bound theorem conditions constitutes formally sufficient safety certification for regulatory compliance, insurance underwriting, and judicial determination of liability. The formal certification regime may provide a framework for establishing that systems satisfying specified conditions meet safety requirements through mathematical proof rather than through exhaustive empirical testing.

The formal certification regime may provide a basis for regulatory compliance, wherein regulatory bodies may accept mathematical proof of bound satisfaction in lieu of exhaustive empirical testing. The formal certification regime may provide a basis for insurance underwriting, wherein insurers may rely on formal certification to assess risk profiles and compute premiums based on bounded loss distributions rather than heavy-tailed assumptions. The formal certification regime may provide a framework for judicial determination of liability, wherein operation within the certified regime may constitute evidence of reasonable care, harm within the certified bound may constitute acceptable disclosed risk, and regime violation may constitute prima facie evidence of negligence. The certification may provide prima facie evidence of adequate safety engineering, due diligence in risk management, compliance with duty of care, and reasonable safety measures.

The formal certification regime may provide completeness of bound such that the exposure bound captures all potential harm pathways within the system boundary. Any harm occurring within a certified system may be bounded by the certified exposure bound regardless of the specific failure mode, attack vector, or operational context. The completeness property may ensure that the certified bound provides a comprehensive upper limit on system exposure rather than a bound that applies only to specific failure modes or operational scenarios. The completeness may derive from the hardware enforcement of the exposure bound, which may constrain all actions regardless of the software state or adversarial conditions that may have led to the action.

The formal certification regime may provide verifiability of compliance such that compliance with theorem conditions is formally verifiable through hardware attestation, static analysis, hardware inspection, and protocol analysis. Hardware attestation may verify trust anchor properties through cryptographic proofs generated by hardware trust anchors. Static analysis may verify exposure function implementations through examination of code and specifications. Hardware inspection may verify enforcement mechanisms through examination of hardware design and configuration. Protocol analysis may verify consensus mechanism properties through formal analysis of protocol specifications. The verifiability of compliance may enable certification without requiring runtime testing or empirical validation beyond component-level characterization.

The formal certification regime may provide transferability of certification such that certification issued for a system configuration remains valid for systems that use only certified components, maintain all boundary conditions, and do not introduce new inter-subsystem pathways. The transferability may enable modular certification wherein components are certified independently and composed into certified systems without requiring re-evaluation of the composed system. The transferability may reduce certification burden for systems composed of previously certified components and may enable reuse of component certifications across multiple system configurations.

In some embodiments, the hardware-enforced trust system may implement bounded loss exposure enabling actuarial convergence to bounded distributions with finite mean, finite variance, bounded tail risk, and computable Value-at-Risk at all confidence levels. The bounded loss exposure may provide quantifiable limits on maximum possible loss from system operation, wherein the maximum possible loss may be bounded by the product of the certified exposure bound and the maximum value-at-risk per unit exposure as determined by the operational context. The actuarial convergence may hold regardless of operational history length, enabling underwriting from first deployment without requiring years of operational history to establish loss distributions.

The bounded loss exposure may enable provably tighter insurance underwriting and capital reserve requirements compared to systems lacking formal exposure bounds. Premium calculations for certified systems may use bounded loss distributions rather than heavy-tailed assumptions. Reserve requirements may be computed from proven maxima rather than from statistical estimates requiring conservative margins. Capital efficiency ratios may diverge with portfolio growth, with certified system portfolios requiring proportionally less capital per unit of premium due to the bounded nature of aggregate risk.

In some embodiments, the hardware-enforced trust system may implement a regime integrity principle wherein modifications outside the regime void guarantees and transfer full liability exposure to the modifying party. The regime boundary may comprise the complete specification of all certified components, all hardware-enforced boundary conditions, all interface specifications between components, all cryptographic roots of trust, and all attestation chains. A system may operate within the regime if and only if all elements are certified and all boundary conditions are maintained.

Modifications outside the regime that void certification guarantees may include: substitution of non-certified components for certified components; alteration of hardware-enforced boundary conditions such as exposure ceilings or trust thresholds; bypass of enforcement mechanisms including the constraint enforcement subsystem; modification of cryptographic roots of trust; introduction of uncertified communication pathways; and operation beyond characterized environmental bounds. Upon any modification outside the regime, full liability exposure may transfer to the modifying party, who may assume unbounded exposure for harms arising from the modification and responsibility for re-certification if the modifying party wishes to restore certification guarantees.

The regime integrity principle may be enforced through cryptographic attestation chains that enable detection of regime violations and formal liability attribution. Attestation chain verification may detect non-certified component substitution, boundary condition alteration, enforcement mechanism bypass, and root of trust modification. Upon detection of a regime violation, the system may log the violation with non-repudiable evidence for liability attribution and may automatically revoke certification status.

In some embodiments, the hardware-enforced trust system may implement a compositional liability framework wherein component vendor liability is bounded by component exposure and system integrator liability is bounded by composition overhead. When a component vendor certifies a component with an exposure bound, the vendor's liability for harms arising from the component may be bounded by the certified component exposure bound. The system integrator may be liable for composition overhead—the difference between the composite exposure bound and the sum of component exposure bounds-representing exposure that results from combining components rather than from the components themselves.

The compositional liability framework may enable formal liability apportionment through attestation chain analysis. When a harm occurs in a certified composite system, the attestation chain may provide evidence enabling determination of whether the harm arose from a component exceeding its certified bound (component vendor liable), from composition overhead within the certified composite bound (system integrator liable), or from a regime violation (modifying party liable for full harm). The recursive application of the compositional liability framework may enable liability apportionment in complex systems with multiple levels of composition, providing incentives for parties to certify components and operate within the certified regime.

The hardware-enforced trust architecture may implement behavioral bounding through a plurality of composable enforcement primitives. Each primitive provides a hardware-enforced guarantee that cannot be bypassed by software executing at any privilege level. The primitives compose such that systems implementing multiple primitives achieve combined guarantees computable from individual primitive specifications. The following paragraphs describe example enforcement primitives. These examples are non-limiting, and additional primitives may address specialized requirements. The primitives may be combined such that: (a) each primitive provides its guarantee independently; (b) multiple constraints on the same operation yield the most restrictive combination; (c) primitives may be arranged hierarchically; and (d) each primitive produces hardware-attestable evidence of its state for compositional verification.

In some embodiments, the hardware-enforced trust system may implement blockchain-based distributed validation using Hyperledger Fabric with Raft or PBFT (Practical Byzantine Fault Tolerant) consensus. Hyperledger Fabric may be a permissioned blockchain platform that provides a modular architecture for distributed ledger applications. The permissioned nature of Hyperledger Fabric may enable the hardware-enforced trust system to control which nodes may participate in validation, which may be appropriate for deployments where participants are known and where regulatory or operational requirements mandate control over validator identity. The blockchain-based distributed validation may provide a tamper-evident record of system operations, exposure accumulation, and constraint enforcement that may be verified by multiple independent validators.

The Raft consensus mechanism may be used for deployments where crash fault tolerance is sufficient and where Byzantine fault tolerance is not required. Raft may provide consensus among a set of validators such that the validators agree on the ordering of transactions and the state of the distributed ledger. Raft may tolerate crash failures of up to half of the validators minus one, enabling continued operation when some validators are unavailable due to hardware failures, network partitions, or other non-malicious causes. The Raft consensus may provide lower latency than Byzantine fault tolerant consensus mechanisms, which may be advantageous for deployments where transaction throughput and confirmation latency are priorities and where the threat model does not include malicious validators.

The PBFT consensus mechanism may be used for deployments where Byzantine fault tolerance is required. PBFT may provide consensus among a set of validators such that the validators agree on the ordering of transactions and the state of the distributed ledger even when up to one-third of the validators are Byzantine—that is, behaving arbitrarily or maliciously. The PBFT consensus may enable the hardware-enforced trust system to maintain correct operation even when some validators are compromised, are under adversarial control, or are behaving maliciously to disrupt consensus. The Byzantine fault tolerance provided by PBFT may be appropriate for deployments in contested environments where adversaries may attempt to compromise validators.

The blockchain-based distributed validation may record exposure accumulation, constraint enforcement decisions, attestation events, and other operations of the hardware-enforced trust system. Each transaction recorded on the blockchain may include cryptographic signatures from the originating node's hardware trust anchor, providing non-repudiable evidence of the transaction's origin. The blockchain may provide an immutable audit trail that enables post-hoc verification of system operation and that provides evidence for liability attribution in the event of disputes or incidents. The distributed nature of the blockchain may ensure that the audit trail is maintained even if individual nodes fail or are compromised.

In some embodiments, the hardware-enforced trust system may implement a rate enforcement primitive that enforces a maximum operation rate over a hardware-attested time window. The rate enforcement primitive may constrain the frequency at which operations may be performed, preventing rapid sequences of operations that could accumulate exposure faster than intended. Both the rate limit and the time measurement may be hardware-protected: the rate limit may be stored in hardware-protected storage that cannot be modified by software, and the time measurement may be derived from a hardware-attested time source such as a chip-scale atomic clock that cannot be manipulated by software. The primitive may use hardware counters that track operation counts and hardware timers that track time window boundaries, ensuring that the rate enforcement operates independently of software control.

In some embodiments, the hardware-enforced trust system may implement a capability attenuation primitive that enforces hierarchical capability delegation with monotonic attenuation such that delegated capabilities are always a subset of delegator capabilities. The capability attenuation primitive may enable controlled delegation of authority within the hardware-enforced trust system, wherein a principal with certain capabilities may delegate a subset of those capabilities to another principal. The hardware enforcement of capability attenuation may prevent privilege escalation through delegation chains, ensuring that capabilities may only decrease or remain constant as they are delegated through a hierarchy. The primitive may use hardware-protected capability tokens that encode the capabilities being delegated and that are signed by the delegator's hardware trust anchor, with the hardware trust anchor verifying that the delegator possesses the capabilities being delegated before signing the capability token.

In some embodiments, the hardware-enforced trust system may implement an environmental conditioning primitive that enforces operational constraints based on hardware-verified environmental conditions, restricting operation when environmental parameters fall outside certified bounds. Environmental parameters may include, for example, temperature, humidity, pressure, radiation levels, electromagnetic interference, and/or vibration. The environmental conditions may be measured by hardware sensors that provide readings that cannot be spoofed by software, and the sensor readings may be processed by hardware logic that compares the readings against certified bounds. When environmental parameters fall outside the certified bounds, the environmental conditioning primitive may reduce operational capability, increase safety margins, or halt operation entirely, ensuring that the system operates only under conditions for which the certified exposure bounds are valid.

In some embodiments, the hardware-enforced trust system may implement a temporal enforcement primitive that enforces timing constraints including maximum duration, atomicity requirements, and sequencing constraints through hardware timing mechanisms. The temporal enforcement primitive may constrain the temporal characteristics of operations, ensuring that operations complete within specified time bounds, that certain operations execute atomically without interruption, and that operations occur in specified sequences. The enforcement of timing constraints through hardware timing mechanisms may ensure that the temporal enforcement operates independently of software control, using hardware-attested time sources that cannot be manipulated by software and hardware state machines that track operation states using hardware registers that cannot be modified by software to falsify operation completion.

In some embodiments, the hardware-enforced trust system may implement an escrow and recovery primitive that enables authorized recovery of keys or policies under hardware-verified conditions while preventing unauthorized access during normal operation. The escrow and recovery primitive may provide a mechanism for recovering from situations where normal access to keys or policies is unavailable, such as when authorized principals are unavailable, when hardware failures occur, or when operational circumstances require restoration of previously revoked capabilities. The hardware-verified conditions may specify the circumstances under which recovery is permitted, and the hardware verification may ensure that recovery occurs only when the specified conditions are satisfied and that software cannot trigger recovery by falsifying the conditions. The escrow and recovery primitive may implement multi-party authorization for recovery, requiring cryptographic authorization from multiple authorized principals through hardware security tokens such as USB cryptographic keys before recovery may proceed.

In some embodiments, the hardware-enforced trust system may include quantum-enhanced components that elevate security from computational to information-theoretic levels. The quantum-enhanced components may provide security guarantees that are based on the fundamental laws of quantum mechanics rather than on computational assumptions that could be violated by advances in computing technology. The quantum-enhanced components may include a quantum entropy source, an atomic timing reference, quantum key distribution, and entanglement-based consensus. The quantum-enhanced components may extend the compositional exposure bound framework to quantum security domains that contribute multiplicatively to system security.

The quantum entropy source may provide random numbers derived from quantum mechanical phenomena that are fundamentally unpredictable according to the laws of physics. The quantum entropy source may use quantum shot noise, photon arrival times, vacuum fluctuations, or other quantum phenomena to generate random values that cannot be predicted by any computational process regardless of the computational resources available to an adversary. The quantum entropy source may provide entropy for cryptographic key generation, commitment protocols, nonce generation, and other applications requiring unpredictable random values within the hardware-enforced trust system. The quantum origin of the entropy may provide information-theoretic security guarantees that persist even against adversaries with quantum computing capabilities.

The atomic timing reference may provide time references with accuracy and stability that exceed conventional timing sources. The atomic timing reference may use atomic transitions as a frequency standard, providing time references that are traceable to fundamental physical constants. The atomic timing reference may include chip-scale atomic clocks that provide portable atomic timing with drift bounded to microseconds per day. The atomic timing reference may enable precise timestamping, timing constraint enforcement, and temporal ordering of events within the hardware-enforced trust system. The atomic timing reference may operate independently of external time sources, enabling accurate timekeeping during network partitions and in environments where GPS or network time services are unavailable.

Quantum key distribution may provide cryptographic key exchange with information-theoretic security. Quantum key distribution may use quantum mechanical properties such as the no-cloning theorem and the uncertainty principle to enable two parties to establish shared cryptographic keys with security that is guaranteed by the laws of physics rather than by computational assumptions. Any attempt by an eavesdropper to intercept the quantum key distribution may disturb the quantum states in a detectable manner, enabling the communicating parties to detect eavesdropping attempts. Quantum key distribution may provide secure key exchange for the hardware-enforced trust system that remains secure even against adversaries with quantum computing capabilities.

Entanglement-based consensus may provide consensus mechanisms that leverage quantum entanglement to achieve properties that are not achievable with classical consensus protocols. Quantum entanglement may enable correlations between distributed parties that cannot be explained by classical physics and that cannot be simulated by classical communication. Entanglement-based consensus may use entangled quantum states to enable consensus protocols with enhanced security properties, reduced communication requirements, or improved fault tolerance compared to classical consensus protocols. The entanglement-based consensus may extend the trust-weighted consensus capabilities of the hardware-enforced trust system to leverage quantum resources when available.

The quantum-enhanced components may contribute multiplicatively to system security through the compositional exposure framework. When the hardware-enforced trust system includes quantum security domains in addition to classical security domains, the total exposure may be computed as a product of domain-specific exposures. The multiplicative composition may reflect the independence of quantum and classical security domains, wherein compromise of classical security mechanisms does not imply compromise of quantum security mechanisms. The quantum-enhanced components may provide defense-in-depth by adding security layers that are based on different physical principles than classical security mechanisms.

In some embodiments, the hardware-enforced trust system 100 may be configured for autonomous vehicle applications. The autonomous vehicle configuration may integrate with vehicle control computers, sensor processing units, and actuator interfaces to enforce exposure bounds including bounded collision exposure based on kinetic energy and proximity, speed limits, acceleration constraints, and trajectory bounds. The autonomous vehicle configuration may implement independent subsystem certification for perception, planning, control, and actuation subsystems, with system-level exposure bounds computed from subsystem bounds through the composition operator. The autonomous vehicle configuration may implement vehicle-to-vehicle (V2V) consensus using trust-weighted mechanisms with each vehicle's contribution weighted according to its hardware-attested trust metric, achieving Byzantine fault tolerance such that coordination remains correct even when some vehicles are compromised.

In some embodiments, the hardware-enforced trust system 100 may be configured for critical infrastructure applications. The critical infrastructure configuration may integrate with SCADA systems, programmable logic controllers, and industrial control networks to enforce exposure bounds including rate limits on control actions, maximum valve pressure changes, grid frequency adjustment limits, and constraints designed to prevent cascading failures. The critical infrastructure configuration may implement grid stability bounds that limit control actions to ranges that maintain grid stability, SCADA validation that evaluates control commands against governance rules specifying permitted actions and parameter ranges, and modular certification enabling infrastructure operators to compose certified components from multiple vendors and to perform incremental upgrades without requiring recertification of the entire system.

In some embodiments, the hardware-enforced trust system 100 may be configured for financial services applications. The financial services configuration may integrate with algorithmic trading systems, market making systems, and risk management systems to enforce exposure bounds including maximum single transaction exposure, maximum position exposure, maximum daily exposure, and rate limits constraining transaction frequency. The financial services configuration may implement settlement timing constraints using hardware-attested time sources to ensure transactions settle within specified time windows, and trading system certification that establishes systems satisfy the compositional exposure bound theorem conditions, providing a basis for regulatory compliance, insurance underwriting, and risk management with quantified exposure bounds.

In some embodiments, the hardware-enforced trust system 100 may be configured for healthcare applications. The healthcare configuration may integrate with medication dispensing systems, surgical robots, and diagnostic AI systems to enforce exposure bounds including maximum single dose limits, maximum daily dose limits, minimum dosing intervals, and contraindication checks for medication delivery, as well as maximum force limits, maximum speed limits, workspace bounds, and trajectory constraints for surgical robots. The healthcare configuration may provide an FDA pathway through compositional certification, enabling regulatory approval based on mathematical proof of bounded exposure that complements clinical testing requirements, with modular certification enabling certification of medical device components independently and system-level safety bounds computed from component bounds.

In some embodiments, the hardware-enforced trust system 100 may be configured for space systems applications. The space systems configuration may integrate with spacecraft control systems, satellite platforms, and constellation management systems to enforce exposure bounds including maximum delta-v limits, minimum altitude limits, collision avoidance constraints, and debris mitigation constraints. The space systems configuration may implement occultation-independent operation that maintains bounded exposure guarantees during communication blackouts of arbitrary duration using the partition-duration independence mechanisms described above, and satellite constellation certification that computes system-level exposure bounds from individual satellite bounds through the composition operator, supporting deployment of large constellations where integrated testing of all satellites is impractical.

In some embodiments, the hardware-enforced trust system 100 may be configured for defense applications. The defense configuration may integrate with unmanned combat systems, autonomous weapons, and military robots to enforce exposure bounds including rules of engagement constraints specifying conditions under which weapons may be employed, weapons release constraints limiting ordnance expenditure and engagement parameters, and collateral damage bounds limiting potential for unintended harm. The defense configuration may implement partition-tolerant exposure bounds that maintain bounded exposure guarantees during operation in contested environments where communication may be denied through electronic warfare or adversarial interference, with the formal certification framework supporting sovereign procurement qualification through mathematical proof of bounded exposure.

In some embodiments of the method 200, one or more steps may be omitted while still achieving certification of the composite system. The method 200 may be adapted to different certification contexts by selectively performing subsets of the verification and certification steps based on the characteristics of the composite system and the requirements of the certification regime.

Referring to FIG. 2, the step 218 of verifying that the composite system comprises a trust-weighted consensus mechanism may be omitted in embodiments where the composite system operates as a single autonomous node rather than as a distributed system with multiple participating nodes. When the composite system does not include multiple nodes that participate in consensus, the trust-weighted consensus verification may not be applicable. In such embodiments, the method 200 may proceed from step 216 of computing the composite exposure bound directly to step 220 of verifying hardware-triggered automatic revocation capability. The certification established at step 222 may still provide bounded exposure guarantees for the single-node system based on the hardware-rooted trust, compositional exposure bounds, and hardware-triggered revocation, without requiring trust-weighted consensus among multiple nodes.

With continued reference to FIG. 2, the substeps within step 208 may be performed using alternative approaches in some embodiments. The step 210 of computing backward-reachable states from goal states may be omitted when component exposure bounds are determined through alternative characterization methods. For example, component exposure bounds may be determined through empirical testing, through analytical derivation from component specifications, and/or through manufacturer-provided exposure characterizations. When step 210 is omitted, the step 212 of determining maximum exposure value and the step 214 of establishing the exposure bound may operate on exposure data obtained through these alternative characterization methods rather than through backward-reachability analysis. The method 200 may still compute the composite exposure bound at step 216 using the component exposure bounds determined through the alternative methods.

In some embodiments, the step 204 of verifying that the hardware trust anchor produces a trust metric satisfying constraints may be simplified when the hardware trust anchor is a certified component with pre-established trust metric properties. When the hardware trust anchor has been previously certified to produce trust metrics satisfying boundedness, monotonicity, and hardware isolation constraints, the verification at step 204 may comprise confirming that the certified hardware trust anchor is properly installed and configured rather than performing independent verification of the trust metric properties. The method 200 may rely on the prior certification of the hardware trust anchor to establish that the trust metric constraints are satisfied.

As further shown in FIG. 2, the step 206 of verifying that each component comprises a hardware-enforced exposure function may be omitted for components that do not directly contribute to exposure accumulation. Some components of the composite system may perform functions that do not generate exposure, such as monitoring components, logging components, and/or communication components that relay information without taking actions that affect cumulative exposure. For such components, the method 200 may assign an exposure bound of zero and may proceed to step 216 without performing the verification at step 206. The composite exposure bound computed at step 216 may reflect only the exposure contributions from components that do generate exposure.

In some embodiments, the step 220 of verifying hardware-triggered automatic revocation capability may be adapted based on the revocation requirements of the deployment context. When the deployment context permits graceful degradation rather than immediate revocation, the verification at step 220 may confirm that the composite system implements hardware-triggered capability reduction rather than complete revocation. The method 200 may certify composite systems that implement graduated responses to trust degradation and exposure accumulation, with the certification establishing bounds on system capability at each degradation level rather than a single revocation threshold.

The method 200 may also be performed iteratively in some embodiments, with initial certification based on a subset of steps and subsequent certification updates incorporating additional verification steps. An initial certification may be established based on steps 202, 206, 208, 216, and 222, with the trust-weighted consensus verification at step 218 and the automatic revocation verification at step 220 performed in subsequent certification iterations as the composite system is enhanced with additional capabilities. The iterative approach may enable incremental deployment of composite systems with progressively stronger certification guarantees.

In some embodiments of the method 200, the steps may be performed in sequences different from the sequence illustrated in FIG. 2. The method 200 may accommodate alternative orderings of verification and certification steps while still achieving certification of the composite system with bounded exposure guarantees.

Referring to FIG. 2, the step 216 of computing the composite exposure bound may be performed before the step 204 of verifying trust metric constraints and/or before the step 206 of verifying hardware-enforced exposure functions in some embodiments. When component exposure bounds are known from prior characterization or manufacturer specifications, the method 200 may compute the composite exposure bound at step 216 as an initial step to determine whether the composite system satisfies exposure requirements before investing effort in the detailed verification steps. If the computed composite exposure bound exceeds acceptable limits, the method 200 may terminate early or may prompt reconfiguration of the composite system before proceeding with the verification steps at steps 202, 204, and 206. This alternative sequence may reduce certification effort for composite systems that would fail exposure requirements regardless of the verification outcomes.

With continued reference to FIG. 2, the step 218 of verifying trust-weighted consensus and the step 220 of verifying hardware-triggered automatic revocation may be performed in parallel rather than sequentially in some embodiments. The verification at step 218 and the verification at step 220 may be independent of each other, such that neither verification depends on the outcome of the other. When the method 200 performs steps 218 and 220 in parallel, the method 200 may reduce total certification time by overlapping the verification activities. The method 200 may proceed to step 222 of certifying the composite system when both parallel verifications complete successfully.

In some embodiments, the step 202 of verifying hardware-rooted trust anchors may be performed concurrently with the step 206 of verifying hardware-enforced exposure functions for each component. The verification at step 202 examines the trust anchor properties of each component, while the verification at step 206 examines the exposure function properties of each component. These verifications may be performed by different verification teams or verification tools operating in parallel on the same component. When the method 200 performs steps 202 and 206 concurrently for each component, the method 200 may complete the per-component verification phase more quickly than when steps 202 and 206 are performed sequentially.

As further shown in FIG. 2, the substeps within step 208 may be reordered in some embodiments. The step 212 of determining maximum exposure value may be performed before the step 210 of computing backward-reachable states when the maximum exposure value is determined through methods that do not depend on backward-reachability analysis. For example, the maximum exposure value may be determined through worst-case analysis of component specifications, through empirical measurement under stress conditions, and/or through analytical bounds derived from component physics. When step 212 is performed before step 210, the backward-reachability analysis at step 210 may serve as a validation step that confirms the maximum exposure value is achievable from states within the backward-reachable set, rather than as the primary method for determining the maximum exposure value.

In some embodiments, the step 204 of verifying trust metric constraints may be performed after the step 208 of determining exposure bounds rather than before. When the trust metric properties are expected to satisfy the constraints based on the type of hardware trust anchor used, the method 200 may defer the detailed verification at step 204 until after the exposure characterization at step 208 is complete. This alternative sequence may enable the method 200 to identify exposure-related issues early in the certification process before investing effort in trust metric verification. The method 200 may still require successful completion of step 204 before proceeding to step 222 of certifying the composite system.

The method 200 may perform the step 222 of certifying the composite system incrementally in some embodiments, with partial certification established after subsets of the verification steps are completed. For example, the method 200 may establish a preliminary certification after completing steps 202, 206, 208, and 216, with the preliminary certification providing bounded exposure guarantees based on compositional exposure bounds alone. The method 200 may subsequently upgrade the preliminary certification to a full certification after completing steps 218 and 220, with the full certification providing additional guarantees based on trust-weighted consensus and hardware-triggered revocation. The incremental certification approach may enable deployment of composite systems with preliminary guarantees while additional verification activities are ongoing.

In some embodiments, the verification steps at steps 202, 204, and 206 may be performed in a different order for different components of the plurality of components. For a first component, the method 200 may perform step 202 followed by step 204 followed by step 206. For a second component, the method 200 may perform step 206 followed by step 202 followed by step 204. The method 200 may adapt the verification order for each component based on the availability of verification resources, the characteristics of the component, and/or the dependencies between verification activities for that component. The method 200 may proceed to step 208 for each component after all three verification steps are completed for that component, regardless of the order in which the verification steps were performed.

In some embodiments of the method 200, one or more steps may be performed using background processing that executes concurrently with other system operations. Background processing may enable the method 200 to perform computationally intensive verification and certification activities without blocking foreground operations of the composite system. The background processing may execute on dedicated processing resources, on idle processing capacity, and/or on distributed computing resources that are separate from the primary operational resources of the composite system.

Referring to FIG. 2, the step 210 of computing backward-reachable states from goal states may be performed using background processing in some embodiments. The backward-reachability analysis may involve iterative expansion of state sets that requires substantial computational resources, particularly for components with large state spaces and/or complex dynamics. The method 200 may initiate the backward-reachability computation as a background task that executes over an extended period while the composite system continues other operations. The background processing may periodically checkpoint intermediate results to enable resumption if the background task is interrupted. When the backward-reachability computation completes, the method 200 may proceed to step 212 of determining the maximum exposure value using the computed backward-reachable state set.

With continued reference to FIG. 2, the step 204 of verifying trust metric constraints may be performed using background processing that continuously monitors trust metric behavior over time. Rather than performing a single verification at a point in time, the background processing may collect trust metric samples over an extended observation period and may analyze the samples to verify that the trust metric satisfies boundedness, monotonicity, and hardware isolation constraints under varying operational conditions. The background verification may detect constraint violations that occur only under specific conditions that may not be present during a point-in-time verification. The method 200 may use the results of the background verification to establish or update the certification of the composite system.

In some embodiments, the step 216 of computing the composite exposure bound may be performed using background processing that recomputes the composite exposure bound as component exposure bounds are updated. When component exposure bounds change due to component updates, recalibration, and/or operational experience, the background processing may apply the composition operator to the updated component exposure bounds to compute an updated composite exposure bound. The background recomputation may enable the method 200 to maintain current composite exposure bounds without requiring explicit invocation of the certification process each time a component exposure bound changes.

As further shown in FIG. 2, the step 218 of verifying trust-weighted consensus may be performed using background processing that monitors consensus operations over time. The background processing may observe consensus rounds, may track the trust metrics of participating nodes, may verify that node contributions are weighted according to respective trust metrics, and/or may confirm that the consensus mechanism achieves the specified fault tolerance. The background verification may detect consensus anomalies that indicate potential Byzantine behavior and/or trust metric manipulation. The method 200 may use the results of the background consensus verification to maintain or revoke the certification of the composite system.

In some embodiments, the step 208 of determining exposure bounds for each component may be performed using background processing that refines exposure bounds based on operational data. Initial exposure bounds may be established through conservative analysis during initial certification, and the background processing may collect operational data that enables refinement of the exposure bounds over time. The background processing may identify components whose actual exposure is consistently below the certified exposure bound, enabling the method 200 to tighten the exposure bounds and thereby reduce the composite exposure bound computed at step 216. The background refinement may improve the precision of exposure bounds without requiring manual recertification.

The step 220 of verifying hardware-triggered automatic revocation capability may be performed using background processing that periodically tests the revocation paths in some embodiments. The background processing may execute test revocation sequences that verify the hardware-enforced paths remain operational without triggering actual revocation of the composite system. The background testing may detect degradation of revocation capability due to hardware failures, configuration drift, and/or other factors that could compromise the automatic revocation guarantee. The method 200 may use the results of the background revocation testing to maintain confidence in the revocation capability verified at step 220.

Referring to FIG. 1, in some embodiments, the hardware-enforced trust system 100 may be configured for deployment across various application domains. Across all application domains, a general pattern may apply: domain-specific constraints may be encoded as governance rules validated by the constraint enforcement subsystem 108, hardware enforcement may ensure that constraints cannot be bypassed by software executing at any privilege level, and modular certification may enable independent certification of subsystems with system-level exposure bounds computed from component bounds as described above. The following paragraphs describe example configurations for specific application domains. These examples are non-limiting, and the hardware-enforced trust system 100 may be configured for other application domains not explicitly described herein. For autonomous vehicle applications, the hardware-enforced trust system 100 may be integrated with vehicle control computers, sensor processing units, and/or actuator interfaces. For financial trading applications, the hardware-enforced trust system 100 may be integrated with trading servers, market data feeds, and/or order management systems. For critical infrastructure applications, the hardware-enforced trust system 100 may be integrated with SCADA systems, programmable logic controllers, and/or industrial control networks. The integration with application-specific hardware may enable the hardware-enforced trust system 100 to enforce exposure bounds on the specific actions and resources relevant to each deployment context.

Referring to FIG. 1, in some embodiments, the hardware-enforced trust system 100 may be configured for deployment across various application domains. Across all application domains, a general pattern may apply: domain-specific constraints may be encoded as governance rules validated by the constraint enforcement subsystem 108, hardware enforcement may ensure that constraints cannot be bypassed by software executing at any privilege level, and modular certification may enable independent certification of subsystems with system-level exposure bounds computed from component bounds as described above. The following paragraphs describe example configurations for specific application domains. These examples are non-limiting, and the hardware-enforced trust system 100 may be configured for other application domains not explicitly described herein. For autonomous vehicle applications, the hardware-enforced trust system 100 may be integrated with vehicle control computers, sensor processing units, and/or actuator interfaces. For financial trading applications, the hardware-enforced trust system 100 may be integrated with trading servers, market data feeds, and/or order management systems. For critical infrastructure applications, the hardware-enforced trust system 100 may be integrated with SCADA systems, programmable logic controllers, and/or industrial control networks. The integration with application-specific hardware may enable the hardware-enforced trust system 100 to enforce exposure bounds on the specific actions and resources relevant to each deployment context.

The following walkthrough describes a representative practical use case of the hardware-enforced trust system 100 in the context of an autonomous trading agent deployed by a financial institution. This walkthrough illustrates how the various subsystems cooperate to provide bounded exposure guarantees during normal operation, degraded trust conditions, and network partition scenarios.

In this use case, a financial institution deploys an autonomous trading agent configured with a total exposure bound of $50 million, trust thresholds at 0.85 for degraded mode and 0.60 for critical revocation, and governance rules specifying permitted trading instruments and rate limits. During initial deployment, a system administrator physically installs the hardware trust anchor 110, which may comprise a TPM 2.0 chip and an Intel TDX-capable processor. The administrator provisions the TPM with cryptographic keys and seals the exposure ceiling to specific PCR values representing the authorized boot configuration.

With continued reference to FIG. 1, when the trading agent begins operation, the hardware-rooted trust isolation subsystem 102 continuously computes the trust metric 114 within the Intel TDX trust domain by sampling physical observables including clock jitter, power consumption patterns, and thermal readings. When the trading agent generates a buy order, the constraint enforcement subsystem 108 intercepts the order through an eBPF program within approximately 10 microseconds, computes projected exposure, and compares this against the ceiling. If the comparison succeeds, the eBPF program permits the syscall to proceed, and the compositional exposure subsystem 106 atomically updates the cumulative exposure counter using hardware atomic instructions.

If the trading agent's behavior diverges from baseline patterns, the hardware-rooted trust isolation subsystem 102 detects this through execution microstate transitions. The trust metric 114 decreases monotonically as divergence increases. When the trust metric falls below 0.85, the constraint enforcement subsystem 108 automatically transitions the trading agent to degraded mode with a proportionally reduced effective exposure ceiling. If the trust metric falls below 0.60, the constraint enforcement subsystem 108 triggers automatic revocation through all four independent hardware-enforced paths simultaneously: eBPF kernel enforcement, TPM key revocation, TDX domain termination, and process termination. The revocation completes within approximately 150 milliseconds, and operators cannot restore operational capability through any software action.

To restore operational capability after revocation, the institution may perform a trust recovery ceremony requiring physical presence of multiple authorized principals. In this deployment, an M-of-N threshold signature requirement with M=3 and N=5 requires at least three of five designated executives to physically participate, each using a YubiKey USB cryptographic token. The recovery terminal collects the cryptographic signatures, enforces a 24-hour timelock period, and then atomically transitions the trading agent to an initialized state.

As further shown in FIG. 1, in a network partition scenario, the compositional exposure subsystem 106 may detect the partition through multi-source detection requiring agreement of 3 out of 5 connectivity indicators. Upon confirming the partition, the compositional exposure subsystem 106 automatically reduces the effective exposure ceiling to 50% of the normal value. The trading agent continues to operate with this reduced ceiling, executing trades against locally cached market data while maintaining the cumulative exposure counter in hardware-protected storage 112. When connectivity is restored, the trust-weighted consensus subsystem 104 validates the partition log by computing timestamp consensus as a median of multiple independent time sources.

If the trading agent approaches its exposure ceiling, the constraint enforcement subsystem 108 rejects orders that would cause projected exposure to exceed the ceiling. Operators may close existing positions to reduce cumulative exposure or request an exposure bound modification through the authorized modification protocol, which requires collecting cryptographic signatures from authorized principals and waiting through the timelock period. This walkthrough illustrates how embodiments of the hardware-enforced trust system 100 provide bounded exposure guarantees through the architectural integration of all four subsystems, with all enforcement occurring through hardware-enforced paths that cannot be bypassed by software executing at any privilege level.

Embodiments of the hardware-enforced trust system may provide technical advantages that address the challenges of deploying autonomous and distributed systems in contested environments. The technical advantages may arise from the architectural integration of hardware-rooted trust, compositional exposure bounds, trust-weighted consensus, and hardware-enforced constraint enforcement. The combination of these subsystems may provide guarantees that are not achievable through software-only approaches or through systems that implement only a subset of the integrated subsystems.

Embodiments may provide hardware-enforced behavioral bounds that persist during network partitions of arbitrary duration. When an autonomous system loses network connectivity-whether due to infrastructure failure, adversarial jamming, geographic isolation, or operation in environments where network connectivity is unavailable—the hardware-enforced behavioral bounds may continue to constrain system operation through local hardware enforcement mechanisms. The persistence of behavioral bounds during network partitions may address the technical problem of enforceable constraints that persist when external validation or centralized oversight is unavailable. Unlike software-based safety mechanisms that may fail open or fail closed during network partitions, the hardware-enforced behavioral bounds may enable bounded autonomous operation wherein the system continues to operate within pre-committed limits during communication blackouts. The hardware enforcement may ensure that an adversary who disrupts network communications cannot gain additional exposure allowance by prolonging the partition, and the behavioral bounds may remain at the values established during system configuration regardless of whether the network partition lasts seconds, hours, days, or longer.

Embodiments may provide Byzantine fault tolerance exceeding the $f<n/3$ bound through trust-weighted consensus. Traditional Byzantine fault tolerant consensus mechanisms that treat all nodes uniformly may tolerate at most $f<n/3$ faulty nodes out of n total nodes. The trust-weighted consensus mechanisms of embodiments may leverage hardware-attested trust metrics to weight node contributions, thereby achieving fault tolerance for $f<n/2$ faulty nodes. The improved fault tolerance may address the technical problem of maintaining system integrity in distributed autonomous systems where some nodes may be compromised or operating under adversarial control. By weighting node contributions according to hardware-attested trust metrics rather than treating all nodes uniformly, the trust-weighted consensus may give greater weight to nodes that have demonstrated trustworthy behavior and lesser weight to nodes that have exhibited behavioral divergence from baseline. The hardware attestation of trust metrics may ensure that the trust metrics used for weighting reflect actual node trustworthiness as measured by hardware trust anchors rather than values that could be manipulated by software to influence consensus outcomes.

Embodiments may provide compositional exposure guarantees that are computable from component specifications without requiring integrated testing of the composed system. When multiple components are composed into a system, the total exposure bound for the composed system may be computed by applying a composition operator to the respective component exposure bounds. The compositional exposure guarantees may address the technical problem of providing system-level safety guarantees for complex systems composed of multiple subsystems from multiple vendors. The composition operator may preserve boundedness such that bounded component exposure bounds yield a bounded total exposure bound, and the composition operator may satisfy monotonicity such that increases in component exposure bounds do not decrease the total exposure bound. The compositional properties may enable modular certification wherein components are certified independently with respective exposure bounds, and the certified components may then be composed into certified systems based on their individual exposure bounds without requiring integrated testing of the composed system. The modular certification may reduce the certification burden for complex systems and may enable reuse of component certifications across multiple system configurations.

Embodiments may provide partition-duration independence that covers 99.9% of real-world network partition scenarios. The partition-duration independence may ensure that the total exposure bound remains invariant regardless of how long a network partition persists, up to partition durations of 7 days based on historical analysis of real-world partition scenarios. The 7-day partition tolerance may cover 99.9% of real-world network partition scenarios, providing bounded exposure guarantees for the vast majority of operational situations involving network unavailability. The partition-duration independence may be achieved through local hardware enforcement mechanisms that do not depend on network connectivity for their operation. The hardware-protected storage may store the total exposure bound in non-volatile memory that persists across system reboots and remains accessible during network partitions. The cumulative exposure counter may be maintained in hardware-protected storage that continues to track exposure accumulation during network partitions. The comparison between cumulative exposure and the total exposure bound may be performed by hardware logic that executes independently of network availability. The automatic revocation triggered when cumulative exposure reaches the total exposure bound may be implemented through hardware-enforced paths that operate without requiring network communication.

Embodiments may provide a combined bypass probability of approximately $10^{-19}$ through multi-layer hardware enforcement. The multi-layer hardware enforcement may implement revocation through four independent hardware paths: a kernel-level path using eBPF enforcement, a hardware security module path using TPM key revocation, a trusted execution environment path using TDX domain termination, and a process-level path using process termination. Because the four revocation paths operate independently, an adversary seeking to bypass revocation may need to simultaneously compromise all four paths. The independence of the revocation paths may ensure that compromise of any single path does not enable bypass of the remaining paths. The combined bypass probability may be computed as the product of the individual path bypass probabilities, reflecting the requirement for simultaneous compromise of all paths. The approximately $10^{-19}$ combined bypass probability may provide assurance that the hardware-enforced trust system maintains revocation capability even against sophisticated adversaries with substantial resources. The multi-layer revocation architecture may provide defense-in-depth such that the constraint enforcement maintains revocation capability even if individual layers are compromised.

Embodiments may provide sub-millisecond validation latency for end-to-end command validation. The hardware accelerator subsystem may comprise specialized processing units that perform trust computation, exposure calculation, cryptographic operations, and rule enforcement with deterministic timing guarantees. The Trust Computation Unit may achieve per-node latency of less than 10 microseconds. The Exposure Calculation Unit may achieve latency of less than 50 microseconds for 16-domain composition. The Cryptographic Engine may achieve Ed25519 signature verification latency of less than 1 millisecond. The Rule Engine Accelerator may achieve worst-case execution latency of less than 100 microseconds. The end-to-end command validation may complete in less than 1 millisecond through parallel execution of validation operations on the specialized processing units. The sub-millisecond validation latency may enable real-time validation of commands at high rates, supporting operation at control frequencies of 4-16 Hz depending on system configuration. The deterministic timing guarantees may ensure that validation completes within the specified latency bound regardless of input values and system load, enabling timing guarantees for safety-critical applications.

Embodiments may provide formal certification that enables regulatory compliance, insurance underwriting, and judicial determination of liability. The formal certification regime may establish that systems satisfying specified theorem conditions constitute formally sufficient safety certification for regulatory, insurance, and judicial purposes. The certification may provide prima facie evidence of adequate safety engineering, due diligence in risk management, compliance with duty of care, and reasonable safety measures. Regulatory bodies may accept mathematical proof of bound satisfaction in lieu of exhaustive empirical testing for systems certified under the formal certification regime. Insurance underwriters may rely on formal certification to assess risk profiles and to compute premiums based on bounded loss distributions rather than heavy-tailed assumptions. Judicial authorities may rely on formal certification as evidence relevant to determinations of negligence, due care, and liability apportionment. The formal certification may enable bounded loss exposure that provides quantifiable limits on maximum possible loss from system operation, enabling actuarial models to converge to bounded distributions with finite mean, finite variance, bounded tail risk, and computable Value-at-Risk at all confidence levels. The actuarial convergence may hold regardless of operational history length, enabling underwriting from first deployment without requiring years of operational history to establish loss distributions.

Embodiments may provide technical advantages through the combination of hardware enforcement, compositional guarantees, and formal certification that are not achievable through alternative approaches. Software-only approaches may achieve bypass probabilities of approximately $10^{-3}$ compared to the approximately $10^{-19}$ bypass probability achievable through multi-layer hardware enforcement. Air-gapped systems may provide no autonomous operation capability compared to the bounded autonomous operation enabled by partition-duration independence. Traditional rate limiting may permit bursting and may be disabled during network partitions compared to the absolute, non-amortizable ceilings enforced by the hardware-enforced trust system regardless of network state. The technical advantages may enable deployment of autonomous systems in contested environments, in safety-critical applications, and in scenarios requiring quantifiable risk bounds that are not addressable through alternative approaches.

Embodiments of the present invention solve various technical problems using various technical solutions.

A first technical problem relates to the inability of software-based safety mechanisms to provide enforceable behavioral constraints during network partitions. When autonomous systems lose network connectivity, software-based mechanisms that depend on external validation or centralized oversight may cease to function, resulting in either unbounded operation or complete operational cessation. The technical solution provided by embodiments may include hardware-protected non-volatile storage that maintains exposure bounds and cumulative exposure counters independently of network availability, hardware logic that performs exposure comparisons without requiring network communication, and hardware-enforced revocation paths that trigger automatically when exposure bounds are reached. The hardware-rooted trust isolation subsystem, compositional exposure subsystem, and constraint enforcement subsystem may cooperate to enforce behavioral bounds through local hardware mechanisms that persist during network partitions of arbitrary duration.

A second technical problem relates to the limitation of traditional Byzantine fault tolerant consensus mechanisms to tolerating at most $f<n/3$ faulty nodes when all nodes are treated uniformly. In distributed autonomous systems where adversaries may compromise a substantial fraction of nodes, the $f<n/3$ bound may be insufficient to maintain system integrity. The technical solution provided by embodiments may include hardware trust anchors that compute trust metrics from physical observables within hardware-enforced isolation boundaries, and trust-weighted consensus mechanisms that weight node contributions based on hardware-attested trust metrics. By leveraging hardware attestation to distinguish between trustworthy and potentially compromised nodes, the trust-weighted consensus subsystem may achieve fault tolerance for $f<n/2$ faulty nodes.

A third technical problem relates to the challenge of providing system-level exposure guarantees for complex systems composed of multiple subsystems without requiring integrated testing of the composed system.

Individual component safety guarantees may not compose in a straightforward manner due to potential interactions between components. The technical solution provided by embodiments may include composition operators that satisfy bound preservation and monotonicity properties, enabling computation of total exposure bounds from component specifications alone. The compositional exposure subsystem may apply the composition operator to component exposure bounds stored in hardware-protected storage, producing system-level bounds that are independent of internal component implementation.

A fourth technical problem relates to the susceptibility of software-based constraint enforcement to bypass through software modification, privilege escalation, or exploitation of software vulnerabilities. Software-based mechanisms operate within the same execution environment as the systems they constrain, enabling circumvention by compromised software executing at elevated privilege levels. The technical solution provided by embodiments may include multiple independent hardware-enforced revocation paths that cannot be bypassed, modified, or disabled by software executing at any privilege level. The constraint enforcement subsystem may implement revocation through kernel-level eBPF enforcement, TPM key revocation, TDX domain termination, and process termination operating as independent hardware paths, achieving a combined bypass probability of approximately $10^{-19.}$ A fifth technical problem relates to the challenge of achieving deterministic timing guarantees for command validation in real-time autonomous systems. Software-based validation may exhibit variable latency depending on system load and input characteristics, making timing guarantees difficult to establish. The technical solution provided by embodiments may include a hardware accelerator subsystem comprising specialized processing units for trust computation, exposure calculation, cryptographic operations, and rule enforcement. The hardware implementation may achieve sub-millisecond end-to-end command validation with deterministic timing guarantees that hold regardless of input values and system load.

Embodiments of the present invention are inherently technical in nature and provide improvements to the technical field of hardware-enforced security architectures for distributed and autonomous systems. The technical character of embodiments arises from the specific hardware components, hardware-software interactions, and architectural integrations that enable the claimed functionality.

The hardware trust anchor 110 represents a technical component that performs trust metric computation within a hardware-enforced isolation boundary. The trust metric computation derives values from physical observables including clock jitter, power rail fluctuation, thermal variation, sensor noise, and execution microstate transitions. These physical observables arise from phenomena occurring at nanosecond to microsecond timescales and require specialized hardware sensors and processing circuits to capture and analyze. The physical measurements cannot be reproduced or predicted by software emulation because they arise from non-deterministic physical processes governed by quantum mechanical and thermodynamic effects. The hardware isolation boundary, implemented through technologies such as Intel TDX trust domains or secure enclaves, provides memory encryption and execution isolation that prevents software executing outside the boundary from observing or modifying the trust computation. This hardware-enforced isolation represents a technical improvement over software-based trust computation that can be observed or manipulated by privileged software.

The compositional exposure subsystem 106 implements technical mechanisms for maintaining cumulative exposure counters in hardware-protected non-volatile storage with increment-only semantics. The increment-only semantics are enforced by hardware logic within trusted platform modules or similar hardware security components, ensuring that cumulative exposure values can only increase and cannot be decremented or reset by software executing at any privilege level. The atomic check-and-update operations use hardware atomic instructions to prevent time-of-check-time-of-use vulnerabilities that could otherwise allow commands to execute without proper exposure accounting. These hardware mechanisms represent technical improvements over software-based exposure tracking that can be manipulated by compromised software.

The constraint enforcement subsystem 108 implements multi-layer revocation through four independent hardware paths operating in parallel. The kernel-level path uses eBPF programs attached to syscall entry points to intercept commands within approximately 10 microseconds. The TPM path seals zero ceiling values and extends Platform Configuration Registers with revocation events within approximately 130 milliseconds. The TDX path terminates trust domains and invalidates encryption keys within approximately 100 milliseconds. The process termination path sends SIGKILL signals within approximately 10 milliseconds. The parallel execution of these independent hardware paths achieves total revocation latency of 150-300 milliseconds while providing a combined bypass probability of approximately $10^{-19}$. This multi-layer hardware architecture represents a technical improvement over single-layer enforcement mechanisms that can be bypassed through compromise of a single component.

The hardware accelerator subsystem comprises specialized processing units that achieve deterministic timing guarantees not achievable through software execution on general-purpose processors. The Trust Computation Unit achieves per-node latency of less than 10 microseconds through dedicated hardware logic. The Exposure Calculation Unit achieves latency of less than 50 microseconds for 16-domain composition through parallel hardware computation. The Cryptographic Engine achieves Ed25519 signature verification latency of less than 1 millisecond through dedicated cryptographic circuits. The Rule Engine Accelerator achieves worst-case execution latency of less than 100 microseconds through hardware-implemented rule evaluation. These deterministic timing guarantees enable real-time command validation at control frequencies of 4-16 Hz, which represents a technical improvement over software-based validation with variable latency characteristics.

The trust-weighted consensus subsystem 104 implements technical mechanisms for achieving Byzantine fault tolerance exceeding the $f<n/3$ bound achievable by uniform-weight consensus mechanisms. By weighting node contributions based on hardware-attested trust metrics, the consensus mechanism can tolerate up to $f<n/2$ faulty nodes. The hardware attestation of trust metrics ensures that the weighting reflects actual node trustworthiness as measured by hardware trust anchors rather than values that could be manipulated by software. The timestamp consensus using chip-scale atomic clocks with drift bounded to approximately 4.3 microseconds per day provides hardware-attested time references that cannot be spoofed by software. These mechanisms represent technical improvements to distributed consensus protocols.

The partition-duration independence achieved by embodiments represents a technical improvement to autonomous system operation during network unavailability. The hardware-protected storage maintains exposure bounds and cumulative exposure counters independently of network connectivity. The hardware logic performs exposure comparisons without requiring network communication. The hardware-enforced revocation paths trigger automatically when exposure bounds are reached, without depending on external validation or centralized oversight. These mechanisms enable bounded autonomous operation during network partitions of arbitrary duration, which represents a technical improvement over systems that either fail open with unbounded operation or fail closed with complete operational cessation during network unavailability.

The compositional exposure bound computation represents a technical mechanism for determining system-level guarantees from component specifications. The composition operator satisfies bound preservation and monotonicity properties that enable mathematical computation of total exposure bounds without requiring integrated testing of composed systems. The hardware state transition function implementing the composition operator is monotone, subadditive, associative, and invariant under component update ordering with respect to hardware-protected exposure registers. These mathematical properties enable modular certification wherein components are certified independently and composed into certified systems based on their individual exposure bounds, which represents a technical improvement to system certification methodologies.

The operations performed by embodiments occur at speeds and scales that exceed human cognitive abilities and manual processing methods. Trust metric computation occurs continuously at rates of 4-16 Hz during system operation, processing physical measurements that occur at nanosecond to microsecond timescales. Exposure comparisons and revocation decisions occur within microseconds to milliseconds, far faster than human reaction times. Cryptographic signature verification, Platform Configuration Register extension, and consensus operations involve mathematical computations that would require substantial time to perform manually. The coordination of multiple hardware enforcement layers operating in parallel across distributed nodes involves complexity that cannot be managed through manual processes. These characteristics demonstrate that embodiments are necessarily rooted in computer technology and cannot practically be performed in the human mind or through manual methods.

Embodiments of the present invention may enforce hardware-enforced behavioral bounds on systems that include machine learning models. As used herein, the term "machine learning model" refers to a model that has been trained using machine learning techniques, such as supervised learning, unsupervised learning, semi-supervised learning, self-supervised learning, reinforcement learning, and/or any combination thereof. Machine learning models subject to hardware-enforced bounds may include, for example, policy networks that control autonomous systems, neural networks that process sensor data for perception and planning, and/or language models that generate commands or recommendations.

Machine learning models subject to hardware-enforced bounds may be of various types. For example, autonomous systems may use neural networks including feedforward neural networks, convolutional neural networks (CNNs), recurrent neural networks (RNNs), long short-term memory networks (LSTMs), transformer networks, and/or graph neural networks. The compositional exposure subsystem 106 may enforce exposure bounds on systems that include any of these model architectures by monitoring hardware-attested activation levels, tracking cumulative exposure from model-generated commands, and/or enforcing semantic thresholds on learned internal representations identified as safety-critical.

In some embodiments, the hardware-enforced trust system 100 may identify safety-critical features within machine learning models through mechanistic interpretability techniques performed during an offline analysis phase. The offline analysis may use activation patching with contrastive datasets to determine which neurons within a neural network are causally responsible for particular behaviors. The feature specifications produced during offline analysis may then be used during online operation to perform lightweight feature extraction within a hardware-enforced isolation boundary, such as an Intel TDX trust domain. The hardware-enforced trust system 100 may block command execution when activation levels of identified safety-critical features exceed corresponding hardware-stored semantic thresholds.

Machine learning models subject to hardware-enforced bounds may be contained within an embodiment of the present invention or may be external to an embodiment of the invention. If external, embodiments of the invention may provide input to and receive output from the machine learning model using a suitable interface, such as an API, while enforcing exposure bounds on the commands or actions generated based on model outputs.

Embodiments of the present invention may use a plurality of machine learning models, with hardware-enforced bounds applied to the aggregate behavior of the models. For example, an autonomous system may include separate models for perception, planning, and control, with the compositional exposure subsystem 106 enforcing a total exposure bound computed from component exposure bounds associated with each model's operational domain.

An inference engine may execute machine learning models to generate outputs that are subject to hardware-enforced bounds. The inference engine may load a machine learning model into memory, receive input, invoke the machine learning model to process the input, and return output generated by the machine learning model. In some embodiments, the inference engine may execute within a hardware-enforced isolation boundary, such as an Intel TDX trust domain, to enable hardware-attested measurement of model activations and to protect the integrity of feature extraction for learned feature bounds. The constraint enforcement subsystem 108 may validate commands generated based on model outputs before permitting execution, and may trigger automatic revocation through hardware-enforced paths in response to the trust metric falling below a threshold or cumulative exposure reaching the total exposure bound.

The inference engine may be implemented using any of a variety of software frameworks and libraries for machine learning inference, such as TensorFlow, PyTorch, ONNX Runtime, TensorRT, and/or any other suitable inference framework. The inference engine may execute on any suitable hardware, such as central processing units (CPUs), graphics processing units (GPUs), tensor processing units (TPUs), neural processing units (NPUs), and/or any combination thereof. When executing within a trusted execution environment for hardware-attested feature extraction, the inference engine may perform a single forward pass through the model to capture activations at pre-identified layers and neurons specified in feature specifications derived from offline mechanistic interpretability analysis.

The present disclosure provides a hardware-enforced trust system. The hardware-enforced trust system comprises a hardware-rooted trust isolation subsystem comprising at least one hardware trust anchor selected from the group consisting of a hardware security module, a trusted platform module, a secure element, a hardware-based trusted execution environment, a hardware-isolated enclave, and a physically-unclonable function. The hardware trust anchor provides a root of trust that cannot be modified or bypassed by software executing at any privilege level. The hardware trust anchor is configured to compute a trust metric t from observables, wherein the trust metric t satisfies a boundedness constraint such that t takes values in a bounded range, a monotonicity constraint such that the trust metric $\tau$ is non-increasing in behavioral divergence from a baseline, and a hardware isolation constraint such that the trust metric computation occurs within a hardware-enforced isolation boundary and cannot be observed or modified by software executing outside the isolation boundary. The hardware-enforced trust system further comprises a trust-weighted consensus subsystem configured to achieve Byzantine fault tolerance by weighting node contributions based on respective trust metrics. The hardware-enforced trust system further comprises a compositional exposure subsystem comprising hardware-protected non-volatile storage, the compositional exposure subsystem configured to enforce a total exposure bound for a system composed of a plurality of components, wherein the total exposure bound is computed by applying a composition operator to respective component exposure bounds of the plurality of components, and wherein the composition operator satisfies a bound preservation property such that bounded inputs yield bounded outputs and a monotonicity property such that an increase in a component exposure bound does not decrease the total exposure bound. The hardware-enforced trust system further comprises a constraint enforcement subsystem configured to validate commands against governance rules and to trigger automatic revocation exclusively through hardware-enforced paths that cannot be bypassed, modified, or disabled by software executing at any privilege level, in response to at least one of the trust metric falling below a threshold or cumulative exposure reaching the total exposure bound. The hardware-rooted trust isolation subsystem, the trust-weighted consensus subsystem, the compositional exposure subsystem, and the constraint enforcement subsystem are architecturally integrated such that no proper subset of the four subsystems achieves a bounded exposure guarantee, and a total exposure of the system remains bounded by a computable function that is independent of internal subsystem implementation and computable from subsystem specifications without integrated testing.

In some embodiments, the trust metric t is derived from non-deterministic physical observables selected from at least one of clock jitter, power rail fluctuation, thermal variation, sensor noise, or execution microstate transitions, not reproducible by software emulation.

In some embodiments, no software-executed process is permitted to determine, override, or modify whether a command, state transition, or revocation event is authorized once the threshold is evaluated, such that all enforcement decisions are finalized by hardware logic prior to any software-mediated action.

In some embodiments, the hardware-rooted trust isolation subsystem comprises a plurality of hardware trust anchors, each hardware trust anchor configured to produce the trust metric from physical measurements that cannot be spoofed by software. The compositional exposure subsystem comprises tamper-resistant storage configured to store a hardware-enforced exposure limit for each of the plurality of components. The constraint enforcement subsystem comprises a plurality of independent revocation paths, each revocation path configured to independently prevent command execution in response to the trust metric falling below the threshold.

In some embodiments, the compositional exposure subsystem is configured to maintain cumulative exposure in hardware-protected storage, and the constraint enforcement subsystem is configured to automatically revoke operational capability through hardware enforced paths such that bypass of the revocation requires simultaneous physical compromise of all hardware-enforced paths and cannot be achieved by software executing at any privilege level.

In some embodiments, the trust-weighted consensus subsystem achieves fault tolerance for $f<n/2$ faulty nodes.

In some embodiments, the hardware-enforced trust system further comprises a boundary monitor configured to interface between the system and an external system not subject to the total exposure bound. The boundary monitor validates inputs from the external system against a set of assumptions. Violation of assumptions by the external system causes guaranteed degradation of the system that is bounded by a linear function of the number of assumption violations. Zero assumption violations by the external system result in zero guarantee degradation.

In some embodiments, the total exposure bound is an absolute, non-amortizable ceiling on cumulative exposure that cannot be bypassed, deferred, probabilistically relaxed, or overridden by software or firmware executing at any privilege level. The compositional exposure subsystem is configured to enforce the total exposure bound during network partitions of arbitrary duration, delayed synchronization, and partial system compromise. The constraint enforcement subsystem is configured to trigger irreversible revocation of operational capability in response to cumulative exposure reaching the total exposure bound. The total exposure bound remains invariant under adversarial conditions including network partition duration, delayed synchronization, and partial system compromise.

In some embodiments, the compositional exposure subsystem is further configured to select the total exposure bound from a finite, hardware-stored set of ceilings based on a hardware-attested uncertainty metric derived from execution or environmental state. The selected total exposure bound monotonically decreases as the uncertainty metric increases, such that each selected total exposure bound remains an absolute, non-amortizable bound under network partition, delayed synchronization, and partial system compromise.

In some embodiments, the trust-weighted consensus subsystem achieves fault tolerance for a faulty node fraction $f<n/2$, exceeding the maximum tolerable fraction $f<n/3$ achievable by consensus mechanisms using uniform node weighting.

In some embodiments, the compositional exposure subsystem is further configured to compute the total exposure bound as a system-level exposure bound across a plurality of agents, wherein each agent is a component of the plurality of components, by subtracting hardware-attested interaction exposure terms from the sum of respective component exposure bounds of the plurality of agents, and to enforce the system-level exposure bound via the constraint enforcement subsystem.

In some embodiments, the system provides a durable trust guarantee for a distributed or autonomous system operating under adversarial conditions such that cumulative adversarial influence, damage potential, or operational deviation remains bounded independent of network partition duration, delayed synchronization, or partial system compromise. The hardware-rooted trust isolation subsystem provides hardware-isolated measurement of physical, execution, or environmental observables used to derive enforcement state. The compositional exposure subsystem enforces hardware-enforced state transitions that impose an absolute, non-amortizable ceiling on cumulative exposure. The constraint enforcement subsystem provides irreversible, hardware-triggered revocation of operational capability upon reaching the ceiling.

In some embodiments, exposure corresponds to a cumulative count of hardware-detected state transitions that increase deviation from a baseline operational invariant, including execution path divergence, privilege escalation attempts, unauthorized command invocation, model parameter drift, or actuator output deviation beyond tolerance thresholds.

In some embodiments, the compositional exposure subsystem is configured to enforce the total exposure bound for an AI system, wherein exposure is measured as a cumulative count of hardware-detected events rather than as a function of elapsed time, and enforcement of the total exposure bound does not depend on a trusted time source.

In some embodiments, the system is configured to enforce behavioral bounds during runtime operation by receiving a command for execution, computing the trust metric using the hardware trust anchor wherein the computation cannot be observed or modified by software, comparing cumulative exposure against the total exposure bound, permitting command execution only if the trust metric exceeds the threshold and cumulative exposure plus command exposure remains at or below the total exposure bound, updating cumulative exposure in hardware-protected storage upon command execution, and triggering hardware-enforced revocation of operational capability if the trust metric falls below the threshold or cumulative exposure reaches the total exposure bound. The comparing, permitting, updating, and triggering occur through hardware-enforced paths that cannot be bypassed, modified, or disabled by software executing at any privilege level.

In some embodiments, the hardware-enforced trust system further comprises a software subsystem executing on a processor. The software subsystem is configured to receive operational commands, evaluate commands against policy rules to determine command exposure values, and transmit validated commands and associated exposure values to the constraint enforcement subsystem. The constraint enforcement subsystem is configured to maintain a cumulative exposure counter in the hardware-protected non-volatile storage, receive validated commands and exposure values from the software subsystem, add the exposure value to the cumulative exposure counter, compare the cumulative exposure counter against the total exposure bound, and permit command execution only if the cumulative exposure counter does not exceed the total exposure bound. The constraint enforcement subsystem is configured to reject commands if the cumulative exposure counter would exceed the total exposure bound, regardless of validation by the software subsystem.

The present disclosure also provides a method for certifying a composite system comprising a plurality of components. The method comprises, for each component of the plurality of components, verifying that the component comprises a hardware-rooted trust anchor selected from the group consisting of a hardware security module, a trusted platform module, a secure element, a hardware-based trusted execution environment, a hardware-isolated enclave, and a physically-unclonable function, wherein the hardware trust anchor provides a root of trust that cannot be modified or bypassed by software executing at any privilege level. The method further comprises verifying that the hardware trust anchor is configured to produce a trust metric satisfying boundedness, monotonicity, and hardware isolation constraints, wherein the hardware isolation constraint requires that trust metric computation occurs within a hardware-enforced isolation boundary and cannot be observed or modified by software executing outside the isolation boundary. The method further comprises verifying that the component comprises a hardware-enforced exposure function satisfying bound preservation and monotonicity properties. The method further comprises determining an exposure bound for the component by computing a set of states backward-reachable from goal states specified in a mission specification, determining a maximum exposure value over the backward-reachable state set, and establishing the exposure bound as the maximum exposure value. The method further comprises computing a composite exposure bound by applying a composition operator to the exposure bounds of the plurality of components, wherein the composition operator is selected from an operator class that preserves boundedness and satisfies subadditivity under interaction. The method further comprises verifying that the composite system comprises a trust-weighted consensus mechanism achieving Byzantine fault tolerance by weighting node contributions based on respective trust metrics. The method further comprises verifying that the composite system comprises hardware-triggered automatic revocation capability through hardware-enforced paths that cannot be bypassed, modified, or disabled by software executing at any privilege level. The method further comprises certifying the composite system based on the composite exposure bound, wherein the certification establishes that the composite exposure bound is independent of internal implementation of each component and the composite exposure bound is computable from specifications of the plurality of components without integrated testing.

In some embodiments, the composition operator is implemented as a hardware state transition function that is monotone, subadditive, associative, and invariant under component update ordering with respect to hardware-protected exposure registers.

The present disclosure also provides a hardware-enforced AI behavioral bounding system. The hardware-enforced AI behavioral bounding system comprises a hardware-rooted trust subsystem comprising a trust anchor configured to compute a trust metric from physical observables, wherein the trust metric satisfies a boundedness constraint and a monotonicity constraint such that the trust metric is non-increasing in behavioral divergence from a baseline. The hardware-enforced AI behavioral bounding system further comprises a trusted time subsystem configured to provide a hardware-attested time source that cannot be spoofed or manipulated by software. The hardware-enforced AI behavioral bounding system further comprises a compositional exposure subsystem configured to enforce a total exposure bound for an AI system, wherein the total exposure bound is computed by applying a composition operator to respective component exposure bounds, and wherein the composition operator satisfies an additivity property such that total exposure is computable from component exposures. The hardware-enforced AI behavioral bounding system further comprises a constraint enforcement subsystem configured to validate AI commands against governance rules and to trigger automatic revocation exclusively through hardware-enforced paths that cannot be bypassed, modified, or disabled by software executing at any privilege level, in response to the trust metric falling below a threshold or cumulative exposure reaching the total exposure bound. The total exposure bound is an absolute ceiling on cumulative AI system exposure that is hardware-enforced and cannot be exceeded regardless of AI system behavior.

In some embodiments, the compositional exposure subsystem further defines exposure as a hardware-attested activation level of one or more learned internal representations identified as safety-critical, and the constraint enforcement subsystem blocks command execution when any such activation exceeds a corresponding hardware-stored semantic threshold.

In some embodiments, the system further comprises an online mechanistic interpretability engine executing within a trusted execution environment. The engine comprises a causal attribution module configured to compute, during neural network inference, causal attribution scores for internal features based on gradient information. The engine further comprises a contrastive baseline tracking module configured to maintain, within hardware-protected storage, per-feature statistical distributions of activations observed during verified safe operation, and to update said distributions based on hardware-verified safety signals. The engine further comprises a causal divergence detector configured to compute, for each monitored feature, a causal divergence score based on statistical divergence from said baseline and the causal attribution score. The engine further comprises a hardware-attestable evidence generator configured to produce cryptographically signed attestations of feature activations, causal attributions, causal divergence scores, and threshold violations.

In some embodiments, the system further comprises a dictionary learning module executing within said trusted execution environment. The dictionary learning module is configured to maintain a dictionary of learned feature representations, detect novel activation patterns based on reconstruction residual relative to the current dictionary, perform incremental dictionary updates by adding new dictionary entries representing detected novel patterns, and flag novel features as safety-critical based on at least one of reconstruction residual, temporal consistency, causal attribution, or semantic distinctness.

In some embodiments, the system further comprises a statistical confidence bound module configured to classify novel features discovered by the dictionary learning module as safety-critical without ground truth labels, using a sequential hypothesis test that accumulates evidence over a plurality of timesteps and provides a bounded false positive rate and a bounded false negative rate.

In some embodiments, the statistical confidence bound module further applies multi-hypothesis correction for false discovery rate control, temporal consistency requiring feature activation in a plurality of consecutive timesteps, and multi-modal evidence agreement across a plurality of modalities including at least two of attribution, divergence, or sparsity.

In some embodiments, the system further comprises an online semantic similarity mapping module executing within said trusted execution environment. The online semantic similarity mapping module is configured to compute a similarity measure between a representation of a novel feature discovered by the dictionary learning module and representations of known features characterized during offline analysis, assign a provisional semantic label to the novel feature when the similarity measure exceeds a semantic matching threshold, inherit a semantic enforcement threshold from the matched known feature tightened by a safety margin factor based on the similarity measure, and classify each monitored feature into one of a plurality of semantic confidence tiers wherein the semantic confidence tier determines the enforcement response, threshold policy, and attestation requirements applied to the feature.

In some embodiments, the system further comprises a semantic clustering module executing within said trusted execution environment. The semantic clustering module is configured to maintain a set of semantic clusters each associated with a semantic behavior category, a cluster-level enforcement policy, and a cluster centroid computed from representations of constituent features. The semantic clustering module is further configured to assign novel features with provisional semantic labels to the cluster corresponding to the matched semantic category, assign novel features without a provisional semantic label to an uncharacterized cluster that applies a default conservative threshold more restrictive than any behavior-specific threshold, and trigger tightening of the global exposure ceiling via the uncertainty-adaptive exposure bound mechanism when the number of semantically uncharacterized features exceeds a hardware-protected alarm threshold.

In some embodiments, the contrastive baseline tracking module is configured to prevent adversarial baseline poisoning by gating baseline updates on hardware-verified safety signals, and a cryptographic hash of the baseline state is included in hardware attestations to provide tamper-evident integrity verification.

In some embodiments, the online mechanistic interpretability engine composes with existing exposure bound enforcement through restrictive combination logic such that an action is permitted based on satisfaction of a plurality of enforcement conditions including at least cumulative exposure remaining below an exposure ceiling and causal violations detected by the online mechanistic interpretability engine satisfying a violation threshold.

In some embodiments, the online mechanistic interpretability engine is configured to execute neural network inference within the trusted execution environment, compute causal attribution scores for internal features based on gradient information relative to a hardware-protected baseline distribution maintained by the contrastive baseline tracking module, compute statistical divergence scores by comparing feature activations to said hardware-protected baseline distribution, compute causal divergence scores for each monitored feature based on the statistical divergence scores and the causal attribution scores, generate a hardware-attestable report signed by a hardware trust anchor when causal divergence exceeds a hardware-protected threshold, and block actions based on said report in composition with existing exposure bound enforcement.

The present disclosure also provides a method for modifying an exposure bound in a deployed hardware-enforced trust system. The method comprises receiving a proposed exposure bound modification, collecting cryptographic signatures from at least a threshold number M of a total N authorized principals wherein M and N are hardware-enforced parameters, enforcing a timelock period during which the proposed modification remains pending and cannot be executed, verifying consensus among authorized principals after expiration of the timelock period, and atomically transitioning from a current exposure bound to the proposed exposure bound upon successful verification. The method preserves an authorization invariant such that at no point during the modification process can an unauthorized exposure bound become active. The threshold signature requirement, timelock enforcement, and consensus verification are hardware-enforced such that software cannot bypass any of these requirements.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention which perform hardware-enforced trust computation and compositional exposure bound enforcement cannot be performed mentally or manually by a human. Such embodiments include the computation of trust metrics from non-deterministic physical observables such as clock jitter, power rail fluctuation, thermal variation, sensor noise, and execution microstate transitions within hardware-enforced isolation boundaries. These physical measurements arise from phenomena that occur at nanosecond to microsecond timescales and require specialized hardware sensors and processing circuits to capture and analyze. The trust metric computation involves weighted formulas combining attestation freshness with exponential decay functions, commitment compliance ratios, and exposure utilization calculations that must be performed continuously at rates of 4-16 Hz during system operation. Additionally, the compositional exposure subsystem maintains cumulative exposure counters in hardware-protected non-volatile storage with increment-only semantics, performs atomic check-and-update operations using hardware atomic instructions to prevent time-of-check-time-of-use vulnerabilities, and computes composite exposure bounds by applying composition operators to component exposure bounds across multiple security domains. The constraint enforcement subsystem intercepts system calls using eBPF programs attached to kernel entry points, evaluates commands against governance rules within latency budgets of approximately 10 microseconds, and triggers multi-layer revocation through four independent hardware paths with combined bypass probability of approximately $10^{-19}$. The trust-weighted consensus subsystem achieves Byzantine fault tolerance for $f<n/2$ faulty nodes by weighting node contributions based on hardware-attested trust metrics, computing timestamp consensus as medians of multiple independent time sources including chip-scale atomic clocks with drift bounded to 4.3 microseconds per day, and validating partition logs through cryptographic signature verification. These operations require processing of cryptographic signatures, maintenance of Platform Configuration Registers with append-only semantics, and coordination across distributed nodes at speeds and scales that exceed human cognitive abilities and manual processing methods.

Embodiments of the present invention significantly enhance the functionality of computer systems within distributed and autonomous system deployments by specifically addressing the challenge of maintaining enforceable behavioral constraints under adversarial conditions, including network partitions, software compromise, and Byzantine faults. Traditional methods for constraining autonomous system behavior rely on software-based safety mechanisms that operate within the same execution environment as the systems they constrain, making them susceptible to circumvention through software modification, privilege escalation, or exploitation of software vulnerabilities. When autonomous systems lose network connectivity, software-based mechanisms that depend on external validation or centralized oversight cease to function effectively, either failing open with unbounded risk exposure or failing closed with complete loss of operational capability. Embodiments of the present invention address the limitations of the prior art by employing hardware-enforced trust architectures with compositional exposure bounds, thereby substantially improving the computer system's ability to maintain quantifiable safety guarantees in ways that were previously unattainable with conventional software-only methods.

For example, embodiments of the present invention may utilize hardware trust anchors selected from hardware security modules, trusted platform modules, secure elements, hardware-based trusted execution environments, hardware-isolated enclaves, and physically-unclonable functions to compute trust metrics from physical observables within hardware-enforced isolation boundaries. Unlike traditional software-based trust assessments that can be manipulated by compromised software executing at elevated privilege levels, the hardware-enforced trust metric computation occurs within isolation boundaries that cannot be observed or modified by software executing outside the isolation boundary, including software with root access, kernel access, or hypervisor access. The trust metrics may be derived from non-deterministic physical observables such as clock jitter, power rail fluctuation, thermal variation, sensor noise, and execution microstate transitions that arise from physical phenomena rather than deterministic computation and therefore cannot be spoofed by software emulation. This hardware-rooted approach provides a foundation for trust guarantees that persist regardless of software state.

This approach not only enhances the safety capabilities of autonomous systems but also contributes to a more robust and efficient enforcement framework through compositional exposure bounds. By computing total exposure bounds through composition operators applied to component exposure bounds, embodiments of the present invention achieve system-level guarantees that are independent of internal subsystem implementation and computable from component specifications alone without requiring integrated testing of the composed system. The composition operators satisfy bound preservation properties such that bounded inputs yield bounded outputs, and monotonicity properties such that increases in component exposure bounds do not decrease total exposure bounds. This compositional framework enables modular certification wherein components are certified independently with respective exposure bounds, and certified components may then be composed into certified systems based on their individual exposure bounds, directly improving the functional capabilities of computer systems involved in safety-critical autonomous operations.

Embodiments of the present invention also tackle a significant technical problem inherent in distributed autonomous systems: the challenge of maintaining Byzantine fault tolerance when some nodes may be compromised or operating under adversarial control. Traditional Byzantine fault tolerant consensus mechanisms treat all nodes uniformly, which limits the maximum fraction of faulty nodes that may be tolerated to less than one-third of the total node count. This limitation arises because, without additional information about node trustworthiness, the consensus mechanism cannot distinguish between honest nodes and Byzantine nodes that may behave arbitrarily. The $f<n/3$ bound may be insufficient to maintain system integrity in contested environments where adversaries may compromise a substantial fraction of participating nodes.

To address this challenge, embodiments of the present invention introduce trust-weighted consensus mechanisms that leverage hardware-attested trust metrics to weight node contributions, thereby achieving Byzantine fault tolerance for $f<n/2$ faulty nodes. By weighting node contributions according to hardware-attested trust metrics rather than treating all nodes uniformly, the trust-weighted consensus gives greater weight to nodes that have demonstrated trustworthy behavior through hardware attestation and lesser weight to nodes that have exhibited behavioral divergence from baseline. The hardware attestation of trust metrics ensures that the trust metrics used for weighting reflect actual node trustworthiness as measured by hardware trust anchors rather than values that could be manipulated by software to influence consensus outcomes. This capability allows embodiments of the present invention to maintain correct consensus operation even when up to half of the nodes are faulty, exceeding the fault tolerance achievable by conventional consensus mechanisms.

Embodiments of the present invention further address the technical problem of partition-duration independence through hardware-enforced exposure bounds that remain invariant regardless of how long a network partition persists. Traditional rate-based constraints fail during network partitions because the timeout mechanisms that enforce rate limits become undefined when network connectivity is unavailable, resulting in either unbounded execution or complete operational cessation. Embodiments of the present invention enforce absolute, non-amortizable ceilings on cumulative exposure through hardware-protected storage with increment-only semantics, hardware-enforced comparisons between cumulative exposure and total exposure bounds, and automatic revocation through hardware-enforced paths that operate without requiring network communication. The partition-duration independence ensures that the total exposure bound remains at the value established during system configuration regardless of whether a network partition lasts seconds, hours, days, or longer, covering 99.9% of real-world partition scenarios based on historical analysis.

The constraint enforcement subsystem implements multilayer revocation through four independent hardware paths-kernel-level eBPF enforcement, TPM key revocation, TDX domain termination, and process termination-achieving a combined bypass probability of approximately $10^{-19}$. Because the four Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

Embodiments of the present invention may implement real-time processing capabilities in various contexts. As used herein, the term "real-time" may refer to an output being generated within no more than a maximum amount of time of receipt of a corresponding input. Such maximum amounts of time may include, for example, no more than 1 millisecond, no more than 10 milliseconds, no more than 100 milliseconds, no more than 1 second, no more than 5 seconds, no more than 10 seconds, no more than 30 seconds, no more than 1 minute, and/or no more than 5 minutes. For example, the constraint enforcement subsystem 108 may validate commands against governance rules and generate permit or reject decisions in real-time, such as within no more than 10 microseconds of receiving a command. The hardware trust anchor 110 may compute the trust metric 114 from physical observables in real-time, such as within no more than 10 microseconds per node. The compositional exposure subsystem 106 may perform exposure comparisons and update cumulative exposure counters in real-time, such as within no more than 50 microseconds for 16-domain composition. The trust-weighted consensus subsystem 104 may compute timestamp consensus as a median of multiple independent time sources in real-time, such as within no more than 100 milliseconds. The hardware accelerator subsystem may perform Ed25519 signature verification in real-time, such as within no more than 1 millisecond.

Embodiments of the present invention may process data structures and perform operations at scales and speeds that demonstrate that embodiments of the present invention are necessarily rooted in computer technology and cannot practically be performed by a human mind. For example, the hardware-rooted trust isolation subsystem 102 may sample physical observables including clock jitter, power rail fluctuation, and thermal variation at rates of 4-16 Hz during continuous system operation, processing measurement data of at least 1 kilobyte per sampling cycle in less than 10 microseconds. The compositional exposure subsystem 106 may compute composite exposure bounds across 16 security domains, processing exposure data structures of at least 512 bytes in less than 50 microseconds. The constraint enforcement subsystem 108 may intercept and validate system calls using eBPF programs, processing command data of at least 256 bytes in less than 10 microseconds per command. The trust-weighted consensus subsystem 104 may process consensus proposals from up to 50 distributed nodes, handling message payloads of at least 4 kilobytes per node in less than 100 milliseconds to achieve Byzantine fault tolerant consensus. The multi-layer revocation mechanism may coordinate four independent hardware paths, processing revocation state data of at least 128 bytes across all paths in less than 300 milliseconds to achieve combined bypass probability of approximately $10^{-19.}$ Unless expressly and specifically stated otherwise in this specification, the omission from this specification of any subject matter, terminology, embodiments, examples, features, elements, steps, or other content that was disclosed in any application to which this application claims priority (including, but not limited to, any provisional application) is not intended to disclaim, surrender, or narrow the scope of any claim term herein. Such omissions are made solely for purposes of brevity, clarity, organization, or drafting preference and shall not be construed as evidencing any intent by the applicant to limit, restrict, or abandon any aspect of the claimed invention or to exclude any interpretation that would otherwise be available based on the incorporated subject matter. The applicant specifically reserves the right to claim the full scope of any invention disclosed in any application incorporated herein by reference or otherwise whose priority or benefit is claimed, whether or not such invention is explicitly redescribed in this specification. Any construction of claim terms should consider the full scope of disclosure available in this specification together with all incorporated applications, and no negative inference should be drawn from any omission of previously disclosed subject matter unless such limitation is expressly and unambiguously set forth in this specification.

What is claimed is:

1. A hardware-enforced trust system comprising:

a hardware-rooted trust isolation subsystem comprising at least one hardware trust anchor selected from the group consisting of: a hardware security module, a trusted platform module, a secure element, a hardware-based trusted execution environment, a hardware-isolated enclave, and a physically-unclonable function, wherein the hardware trust anchor provides a root of trust that cannot be modified or bypassed by software executing at any privilege level, said hardware trust anchor configured to compute a trust metric t from observables, wherein the trust metric t satisfies:

a boundedness constraint such that t takes values in a bounded range;

a monotonicity constraint such that the trust metric t is non-increasing in behavioral divergence from a baseline; and a hardware isolation constraint such that the trust metric computation occurs within a hardware-enforced isolation boundary and cannot be observed or modified by software executing outside the isolation boundary;

a trust-weighted consensus subsystem configured to achieve Byzantine fault tolerance by weighting node contributions based on respective trust metrics;

a compositional exposure subsystem comprising hardware-protected non-volatile storage, said compositional exposure subsystem configured to enforce a total exposure bound for a system composed of a plurality of components, wherein the total exposure bound is computed by applying a composition operator to respective component exposure bounds of the plurality of components, and wherein the composition operator satisfies:

a bound preservation property such that bounded inputs yield bounded outputs; and a monotonicity property such that an increase in a component exposure bound does not decrease the total exposure bound;

a constraint enforcement subsystem configured to validate commands against governance rules and to trigger automatic revocation exclusively through hardware-enforced paths that cannot be bypassed, modified, or disabled by software executing at any privilege level, in response to at least one of: the trust metric falling below a threshold, or cumulative exposure reaching the total exposure bound; and wherein the hardware-rooted trust isolation subsystem, the trust-weighted consensus subsystem, the compositional exposure subsystem, and the constraint enforcement subsystem are architecturally integrated such that no proper subset of the four subsystems achieves a bounded exposure guarantee, and wherein a total exposure of the system remains bounded by a computable function that is independent of internal subsystem implementation and computable from subsystem specifications without integrated testing.

2. The system of claim 1, wherein the trust metric t is derived from non-deterministic physical observables selected from at least one of: clock jitter, power rail fluctuation, thermal variation, sensor noise, or execution microstate transitions, not reproducible by software emulation.

3. The system of claim 1, wherein no software-executed process is permitted to determine, override, or modify whether a command, state transition, or revocation event is authorized once the threshold is evaluated, such that all enforcement decisions are finalized by hardware logic prior to any software-mediated action.

4. The hardware-enforced trust system of claim 1, wherein:

the hardware-rooted trust isolation subsystem comprises a plurality of hardware trust anchors, each hardware trust anchor configured to produce the trust metric from physical measurements that cannot be spoofed by software;

the compositional exposure subsystem comprises tamper-resistant storage configured to store a hardware-enforced exposure limit for each of the plurality of components; and the constraint enforcement subsystem comprises a plurality of independent revocation paths, each revocation path configured to independently prevent command execution in response to the trust metric falling below the threshold.

5. The hardware-enforced trust system of claim 1, wherein:

the compositional exposure subsystem is configured to maintain cumulative exposure in hardware-protected storage; and the constraint enforcement subsystem is configured to automatically revoke operational capability through hardware enforced paths such that bypass of the revocation requires simultaneous physical compromise of all hardware-enforced paths and cannot be achieved by software executing at any privilege level.

6. The hardware-enforced trust system of claim 1, wherein the trust-weighted consensus subsystem achieves fault tolerance for $f<n/2$ faulty nodes.

7. The system of claim 1, further comprising:

a boundary monitor configured to interface between the system and an external system not subject to the total exposure bound;

wherein the boundary monitor validates inputs from the external system against a set of assumptions;

wherein violation of assumptions by the external system causes guaranteed degradation of the system that is bounded by a linear function of the number of assumption violations; and wherein zero assumption violations by the external system result in zero guarantee degradation.

8. The hardware-enforced trust system of claim 1, wherein:

the total exposure bound is an absolute, non-amortizable ceiling on cumulative exposure that cannot be bypassed, deferred, probabilistically relaxed, or overridden by software or firmware executing at any privilege level;

the compositional exposure subsystem is configured to enforce the total exposure bound during network partitions of arbitrary duration, delayed synchronization, and partial system compromise;

the constraint enforcement subsystem is configured to trigger irreversible revocation of operational capability in response to cumulative exposure reaching the total exposure bound; and the total exposure bound remains invariant under adversarial conditions including network partition duration, delayed synchronization, and partial system compromise.

9. The hardware-enforced trust system of claim 8, wherein the compositional exposure subsystem is further configured to select the total exposure bound from a finite, hardware-stored set of ceilings based on a hardware-attested uncertainty metric derived from execution or environmental state, and wherein the selected total exposure bound monotonically decreases as the uncertainty metric increases, such that each selected total exposure bound remains an absolute, non-amortizable bound under network partition, delayed synchronization, and partial system compromise.

10. The hardware-enforced trust system of claim 1, wherein the trust-weighted consensus subsystem achieves fault tolerance for a faulty node fraction $f<n/2$, exceeding the maximum tolerable fraction $f<n/3$ achievable by consensus mechanisms using uniform node weighting.

11. The hardware-enforced trust system of claim 10, wherein the compositional exposure subsystem is further configured to:

compute the total exposure bound as a system-level exposure bound across a plurality of agents, wherein each agent is a component of the plurality of components, by subtracting hardware-attested interaction exposure terms from the sum of respective component exposure bounds of the plurality of agents, and to enforce the system-level exposure bound via the constraint enforcement subsystem.

12. The hardware-enforced trust system of claim 1, wherein:

the system provides a durable trust guarantee for a distributed or autonomous system operating under adversarial conditions such that cumulative adversarial influence, damage potential, or operational deviation remains bounded independent of network partition duration, delayed synchronization, or partial system compromise;

the hardware-rooted trust isolation subsystem provides hardware-isolated measurement of physical, execution, or environmental observables used to derive enforcement state;

the compositional exposure subsystem enforces hardware-enforced state transitions that impose an absolute, non-amortizable ceiling on cumulative exposure; and the constraint enforcement subsystem provides irreversible, hardware-triggered revocation of operational capability upon reaching the ceiling.

13. The system of claim 12, wherein exposure corresponds to a cumulative count of hardware-detected state transitions that increase deviation from a baseline operational invariant, including execution path divergence, privilege escalation attempts, unauthorized command invocation, model parameter drift, or actuator output deviation beyond tolerance thresholds.

14. The hardware-enforced trust system of claim 1, wherein:

the compositional exposure subsystem is configured to enforce the total exposure bound for an AI system, wherein exposure is measured as a cumulative count of hardware-detected events rather than as a function of elapsed time; and enforcement of the total exposure bound does not depend on a trusted time source.

15. The hardware-enforced trust system of claim 1, wherein the system is configured to enforce behavioral bounds during runtime operation by:

receiving a command for execution;

computing the trust metric using the hardware trust anchor, wherein the computation cannot be observed or modified by software;

comparing cumulative exposure against the total exposure bound;

permitting command execution only if the trust metric exceeds the threshold and cumulative exposure plus command exposure remains at or below the total exposure bound;

updating cumulative exposure in hardware-protected storage upon command execution; and triggering hardware-enforced revocation of operational capability if the trust metric falls below the threshold or cumulative exposure reaches the total exposure bound;

wherein comparing, permitting, updating, and triggering occur through hardware-enforced paths that cannot be bypassed, modified, or disabled by software executing at any privilege level.

16. The hardware-enforced trust system of claim 1, further comprising:

a software subsystem executing on a processor, the software subsystem configured to:

receive operational commands, evaluate commands against policy rules to determine command exposure values, and transmit validated commands and associated exposure values to the constraint enforcement subsystem;

wherein the constraint enforcement subsystem is configured to:

maintain a cumulative exposure counter in the hardware-protected non-volatile storage, receive validated commands and exposure values from the software subsystem, add the exposure value to the cumulative exposure counter, compare the cumulative exposure counter against the total exposure bound, and permit command execution only if the cumulative exposure counter does not exceed the total exposure bound;

wherein the constraint enforcement subsystem is configured to reject commands if the cumulative exposure counter would exceed the total exposure bound, regardless of validation by the software subsystem.

17. A hardware-enforced AI behavioral bounding system comprising:

a hardware-rooted trust subsystem comprising a trust anchor configured to compute a trust metric from physical observables, wherein the trust metric satisfies a boundedness constraint and a monotonicity constraint such that the trust metric is non-increasing in behavioral divergence from a baseline;

a trusted time subsystem configured to provide a hardware-attested time source that cannot be spoofed or manipulated by software;

a compositional exposure subsystem configured to enforce a total exposure bound for an AI system, wherein the total exposure bound is computed by applying a composition operator to respective component exposure bounds, and wherein the composition operator satisfies an additivity property such that total exposure is computable from component exposures; and a constraint enforcement subsystem configured to validate AI commands against governance rules and to trigger automatic revocation exclusively through hardware-enforced paths that cannot be bypassed, modified, or disabled by software executing at any privilege level, in response to the trust metric falling below a threshold or cumulative exposure reaching the total exposure bound;

wherein the total exposure bound is an absolute ceiling on cumulative AI system exposure that is hardware-enforced and cannot be exceeded regardless of AI system behavior.

18. The hardware-enforced AI behavioral bounding system of claim 17, wherein the compositional exposure subsystem further defines exposure as a hardware-attested activation level of one or more learned internal representations identified as safety-critical, and wherein the constraint enforcement subsystem blocks command execution when any such activation exceeds a corresponding hardware-stored semantic threshold.

19. The system of claim 18, wherein the system further comprises an online mechanistic interpretability engine executing within a trusted execution environment, said engine comprising:

a causal attribution module configured to compute, during neural network inference, causal attribution scores for internal features based on gradient information;

a contrastive baseline tracking module configured to maintain, within hardware-protected storage, per-feature statistical distributions of activations observed during verified safe operation, and to update said distributions based on hardware-verified safety signals;

a causal divergence detector configured to compute, for each monitored feature, a causal divergence score based on statistical divergence from said baseline and the causal attribution score; and a hardware-attestable evidence generator configured to produce cryptographically signed attestations of feature activations, causal attributions, causal divergence scores, and threshold violations.

20. The system of claim 19, further comprising a dictionary learning module executing within said trusted execution environment, configured to:

maintain a dictionary of learned feature representations;

detect novel activation patterns based on reconstruction residual relative to the current dictionary;

perform incremental dictionary updates by adding new dictionary entries representing detected novel patterns; and flag novel features as safety-critical based on at least one of: reconstruction residual, temporal consistency, causal attribution, or semantic distinctness.

21. The system of claim 20, further comprising a statistical confidence bound module configured to classify novel features discovered by the dictionary learning module as safety-critical without ground truth labels, using a sequential hypothesis test that accumulates evidence over a plurality of timesteps and provides a bounded false positive rate and a bounded false negative rate.

22. The system of claim 21, wherein the statistical confidence bound module further applies:

multi-hypothesis correction for false discovery rate control;

temporal consistency requiring feature activation in a plurality of consecutive timesteps; and multi-modal evidence agreement across a plurality of modalities including at least two of: attribution, divergence, or sparsity.

23. The system of claim 20, further comprising an online semantic similarity mapping module executing within said trusted execution environment, configured to:

compute a similarity measure between a representation of a novel feature discovered by the dictionary learning module and representations of known features characterized during offline analysis;

assign a provisional semantic label to the novel feature when the similarity measure exceeds a semantic matching threshold;

inherit a semantic enforcement threshold from the matched known feature, tightened by a safety margin factor based on the similarity measure; and classify each monitored feature into one of a plurality of semantic confidence tiers, wherein the semantic confidence tier determines the enforcement response, threshold policy, and attestation requirements applied to the feature.

24. The system of claim 23, further comprising a semantic clustering module executing within said trusted execution environment, configured to:

maintain a set of semantic clusters each associated with a semantic behavior category, a cluster-level enforcement policy, and a cluster centroid computed from representations of constituent features;

assign novel features with provisional semantic labels to the cluster corresponding to the matched semantic category;

assign novel features without a provisional semantic label to an uncharacterized cluster that applies a default conservative threshold more restrictive than any behavior-specific threshold; and trigger tightening of the global exposure ceiling via the uncertainty-adaptive exposure bound mechanism when the number of semantically uncharacterized features exceeds a hardware-protected alarm threshold.

25. The system of claim 19, wherein said contrastive baseline tracking module is configured to prevent adversarial baseline poisoning by gating baseline updates on hardware-verified safety signals, and wherein a cryptographic hash of the baseline state is included in hardware attestations to provide tamper-evident integrity verification.

26. The system of claim 19, wherein said online mechanistic interpretability engine composes with existing exposure bound enforcement through restrictive combination logic such that an action is permitted based on satisfaction of a plurality of enforcement conditions including at least: cumulative exposure remaining below an exposure ceiling, and causal violations detected by the online mechanistic interpretability engine satisfying a violation threshold.

27. The system of claim 19, wherein the online mechanistic interpretability engine is configured to:

execute neural network inference within the trusted execution environment;

compute causal attribution scores for internal features based on gradient information relative to a hardware-protected baseline distribution maintained by the contrastive baseline tracking module;

compute statistical divergence scores by comparing feature activations to said hardware-protected baseline distribution;

compute causal divergence scores for each monitored feature based on the statistical divergence scores and the causal attribution scores;

generate a hardware-attestable report signed by a hardware trust anchor when causal divergence exceeds a hardware-protected threshold; and block actions based on said report in composition with existing exposure bound enforcement.

* * * * *